US005180232A

United States Patent [19]

[11] Patent Number: 5,180,232

Chadima, Jr. et al.

[45] Date of Patent: Jan. 19, 1993

[54] MODULAR PRINTER SYSTEM

[75] Inventors: George E. Chadima, Jr., Longboat Key, Fla.; Darald R. Schultz, Cedar Rapids, Iowa

[73] Assignee: Norand Corporation, Cedar Rapids, Iowa

[21] Appl. No.: 549,298

[22] Filed: Jul. 5, 1990

Related U.S. Application Data

[63] Continuation-in-part of Ser. No. 216,868, Jul. 8, 1988, and a continuation-in-part of Ser. No. 227,195, Aug. 2, 1988, abandoned, and a continuation-in-part of Ser. No. 347,602, May 3, 1989, which is a continuation-in-part of Ser. No. 346,771, May 2, 1989, abandoned.

[51] Int. Cl.[5] .......... B41J 3/36; B41J 29/02; B65D 85/28

[52] U.S. Cl. .......... 400/88; 400/691; 346/145; 361/392; 206/371; 206/576

[58] Field of Search .......... 190/109, 115, 116; 206/232, 305, 329, 333, 371, 373, 374, 375, 526, 576; 235/58 CF, 58 P, 60 P; 248/27.1, 145.6, 672; 292/DIG. 4; 400/88, 613, 613.2, 680, 681, 682, 683, 684, 685, 691, 692, 693, 694; 346/33 R, 33 WL, 33 P, 33 F, 33 M, 33 EC, 33 S, 33 HL, 33 A, 33 B, 33 C, 33 ME, 33 D, 33 TP, 145; 307/150, 151; 320/2; 361/331, 332, 334, 380, 390, 391, 392, 393, 394, 428

[56] References Cited

U.S. PATENT DOCUMENTS

| | | | |
|---|---|---|---|
| 2,024,622 | 12/1935 | Bates | 400/685 |
| 2,794,664 | 6/1957 | Kruger | 292/DIG. 4 |
| 3,745,565 | 7/1973 | Daines et al. | 292/DIG. 4 |
| 3,830,554 | 8/1974 | Moussaian et al. | 292/DIG. 4 |
| 3,895,768 | 7/1975 | Scheck | 400/691 |
| 4,084,214 | 4/1978 | Eppich . | |
| 4,208,081 | 6/1980 | Kekas et al. | 400/682 |

(List continued on next page.)

FOREIGN PATENT DOCUMENTS

| | | |
|---|---|---|
| 8438263 | 3/1985 | Fed. Rep. of Germany . |
| 8500180 | 6/1985 | Fed. Rep. of Germany . |
| 3408594 | 9/1985 | Fed. Rep. of Germany . |
| 8801332 | 8/1988 | Fed. Rep. of Germany . |
| 2567304 | 1/1986 | France . |

(List continued on next page.)

OTHER PUBLICATIONS

"Norand Route Commander", brochure #960-382-509 of the Norand Corp., 1985.

"Handle used as Battery Compartment"; *IBM TDB;* vol. 27, No. 11, pp. 6692-6693; Apr. 1985.

"Tray Assy for Mounting Interchangeable Electromagnetic Devices"; *JAMTDB;* vol. 29, No. 8, pp. 3692-3693; Jan. 1987.

(List continued on next page.)

*Primary Examiner*—David A. Wiecking
*Attorney, Agent, or Firm*—McAndrews, Held & Malloy, Ltd.

[57] ABSTRACT

Basic elements of a modular printer system may comprise a rectangular open frame with receptacles for a printer module and computerized terminal module, and with an external configuration for receiving modular components such as a carrying handle, a support foot, an auxiliary terminal module mounting bracket and an AC adaptor module. Respective different paper tray modules may be selectively secured to the open frame to form a bottom closure and to provide a repository for appropriate circuit boards and an on-board battery if needed, as well as containing an appropriate supply of paper for the printer (e.g. 50 sheets or 200 sheets). Respective terminal adaptor modules may secure different generations of computerized terminals in the frame for data transfer to the printer. A terminal module may utilize a spring-urged retainer for retaining a hand-held computerized terminal therewith. Respective printer modules may adapt different printer models to the frame, and each such printer module may be reversible in the frame to accommodate different applications, e.g. as a portable unit, and as a van-mounted unit with inboard, outboard and/or remote mounting of terminal modules.

69 Claims, 11 Drawing Sheets

U.S. PATENT DOCUMENTS

| | | | |
|---|---|---|---|
| 4,345,147 | 8/1982 | Aaron et al. . | |
| 4,403,271 | 9/1983 | Flanigan et al. | 248/27.1 |
| 4,458,813 | 7/1984 | Tushinski et al. . | |
| 4,527,285 | 7/1985 | Kekas et al. | 361/393 |
| 4,590,943 | 5/1986 | Paull et al. | 307/150 |
| 4,620,808 | 11/1986 | Kurtin et al. | 400/691 |
| 4,634,304 | 1/1987 | Narushima et al. | 400/691 |
| 4,645,275 | 2/1987 | Pucci . | |
| 4,739,316 | 4/1988 | Yamaguchi et al. | 400/680 |
| 4,773,032 | 9/1988 | Uehara et al. . | |
| 4,790,431 | 12/1988 | Reel et al. | 400/613.2 |
| 4,846,924 | 7/1989 | Morrison | 400/88 |
| 4,881,839 | 11/1989 | Grimm | 400/692 |
| 4,922,125 | 5/1990 | Casanova et al. | 361/390 |

FOREIGN PATENT DOCUMENTS

| | | | |
|---|---|---|---|
| 34468 | 4/1981 | Japan | 400/613 |
| 198273 | 10/1985 | Japan | 400/692 |
| 7582 | 1/1987 | Japan | 400/691 |
| 8805573 | 7/1988 | PCT Int'l Appl. . | |
| 8805940 | 8/1988 | PCT Int'l Appl. . | |
| 173434 | 2/1935 | Switzerland . | |
| 2045726 | 11/1980 | United Kingdom . | |
| 2153237 | 8/1985 | United Kingdom . | |
| 2175749 | 12/1986 | United Kingdom . | |

OTHER PUBLICATIONS

"Keyboard Equipped w/Two Key Layouts"; *IBMTDB;* vol. 30, No. 7, pp. 428–429; Dec. 1987.

Norand-Route Commander "40-Column Hand-Held Printer" Copyright 1985.

Telxon-Telxon Portable/Mountable Printer System, Form PDS IP-80 Oct. 1986.

Norand-Route Commander "NP207 40-Column Briefcase Printer", Copyright 1987.

Norand-Route Commander "80-Column & 40-Column Van Mount Printers"-Copyright 1987.

MODULAR PRINTER SYSTEM

CROSS REFERENCE TO RELATED APPLICATIONS

The present application is a continuation-in-part of our copending design patent application U.S. Ser. No. 07/216,868 filed Jul. 8, 1988, and our copending patent applications U.S. Ser. No. 07/227,195 filed Aug. 2, 1988, now abandoned and U.S. Ser. No. 07/347,602 filed May 3, 1989. Said application U.S. Ser. No. 07/347,602 is a continuation in part of U.S. Ser. No. 07/346,771 filed May 2, 1989, now abandoned.

The disclosures including the drawings and Appendices of these copending patent applications are incorporated herein by reference.

AUTHORIZATION PURSUANT TO 37 CFR 1.71(d) AND (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention is particularly concerned with printer devices such as are utilized in connection with product delivery e.g. to retail stores. In a field known as route accounting, a computerized terminal maintains price and quantity information concerning various items to be delivered at a series of stores, and a printer unit is utilized to produce a printed record for each customer. The printer may be carried into each store with the terminal, or the printer may be part of the fixed equipment within a delivery vehicle.

In a typical route accounting system, a portable modular printer device may comprise a briefcase containing the printer unit. Preferably such portable systems have a receptacle for plug-in coupling of a computerized terminal.

In the past, systems providing an eighty column printing capacity have utilized portable configurations representing relatively high cost beyond the cost of the basic printer unit, and adding very substantially to the basic weight of the printer.

It is conceived that it would be highly beneficial to create a portable printer system requiring only minimal additions in terms of cost and weight over that of the basic printer. It would be ideal if a modular standardized construction could be applicable also to non-portable printer systems and capable of readily receiving computerized terminals of different configuration.

SUMMARY OF THE INVENTION

Accordingly, it is a basic objective of the invention to provide a portable printer device which adds only minimal cost and weight to a basic printer unit.

A further object is to provide a modular printer device which is of particularly compact and convenient dimensions for portable use and yet which is readily converted to use in non-portable applications such as are common in the route accounting field.

Another related object is to provide a basic standardized frame construction which is readily adapted to the reception of improved printer units and more compact computerized terminal configurations as such become economically feasible.

A particularly advantageous embodiment of the invention utilizes a standardized open frame construction for receiving a modular printer assembly and a modular terminal assembly. The frame may have an external configuration so as to snugly receive a carrying handle and/or other attachment suitable for a portable device, or to receive an auxiliary terminal mounting bracket facilitating use as a non-portable installation. A paper tray module for the printer unit may itself provide the bottom closure for the standard open frame, and serve with the frame as part to a water repellant encasement for the modular printer assembly. The printer housing module may accommodate one hundred and eighty degree reversal of the printer unit to adapt to portable or vehicle mounting. A low cost printer adapter means may adapt a printer housing module to different printer units, and a light weight economical terminal module may serve to adapt the standard frame to different size terminal configurations of a terminal family.

Other objects, features and advantages will be apparent from the following detailed description taken in conjunction with the accompanying sheets of drawings, and from the respective individual features of the appended claims.

BRIEF DESCRIPTION OF THE DRAWINGS

FIG. 15 is a somewhat diagrammatic perspective view of a non-portable version of the printer system which utilizes the frame module, and other components of FIGS. 6–11, rearranged so as to be particularly suited to mounting in a delivery vehicle or the like;

DETAILED DESCRIPTION

Figure 1:
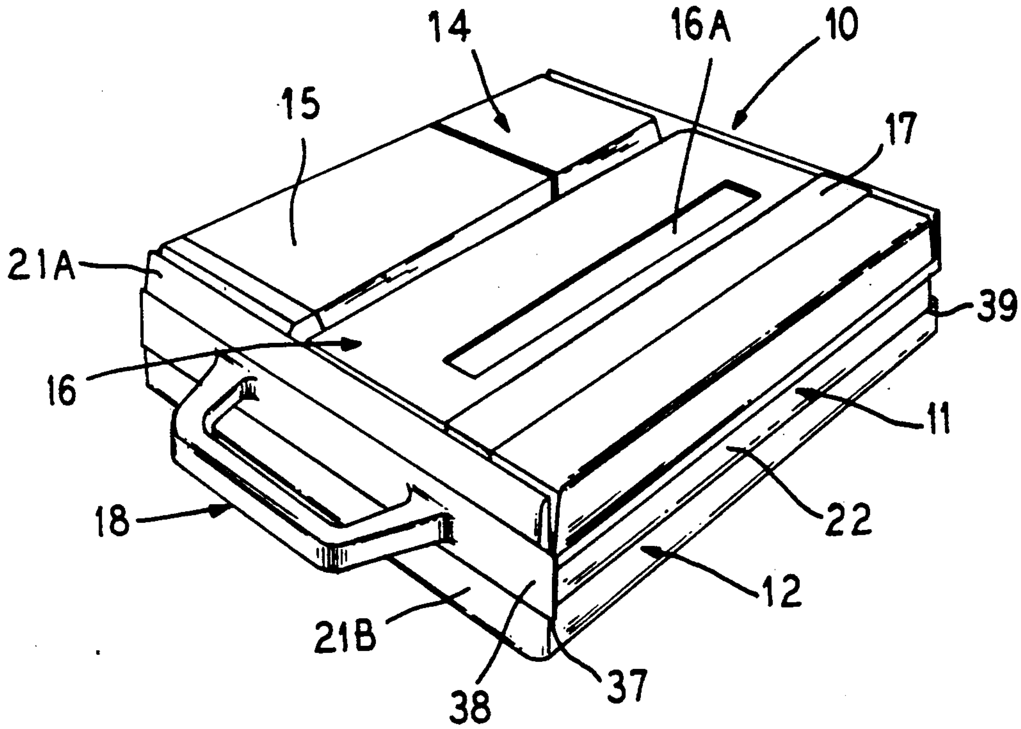
FIG. 1 is a somewhat diagrammatic perspective view showing a modular printer system configured as a unitary portable device and embodying teachings and concepts of the present invention.

In FIG. 1, a unitary modular portable printer device 10 is shown as comprising a standardized open frame module 11 having a paper tray module 12 assembled therewith as bottom closure.

Fitting within the open frame 11 are a terminal module 14 with a hinged cover 15, and a printer module 16 having a paper outlet slot 16A which may be selectively covered by means of a laterally shiftable cover strip 17.

A carrying handle 18 is slidably engaged with an external side of the open frame 11.

Figure 2:
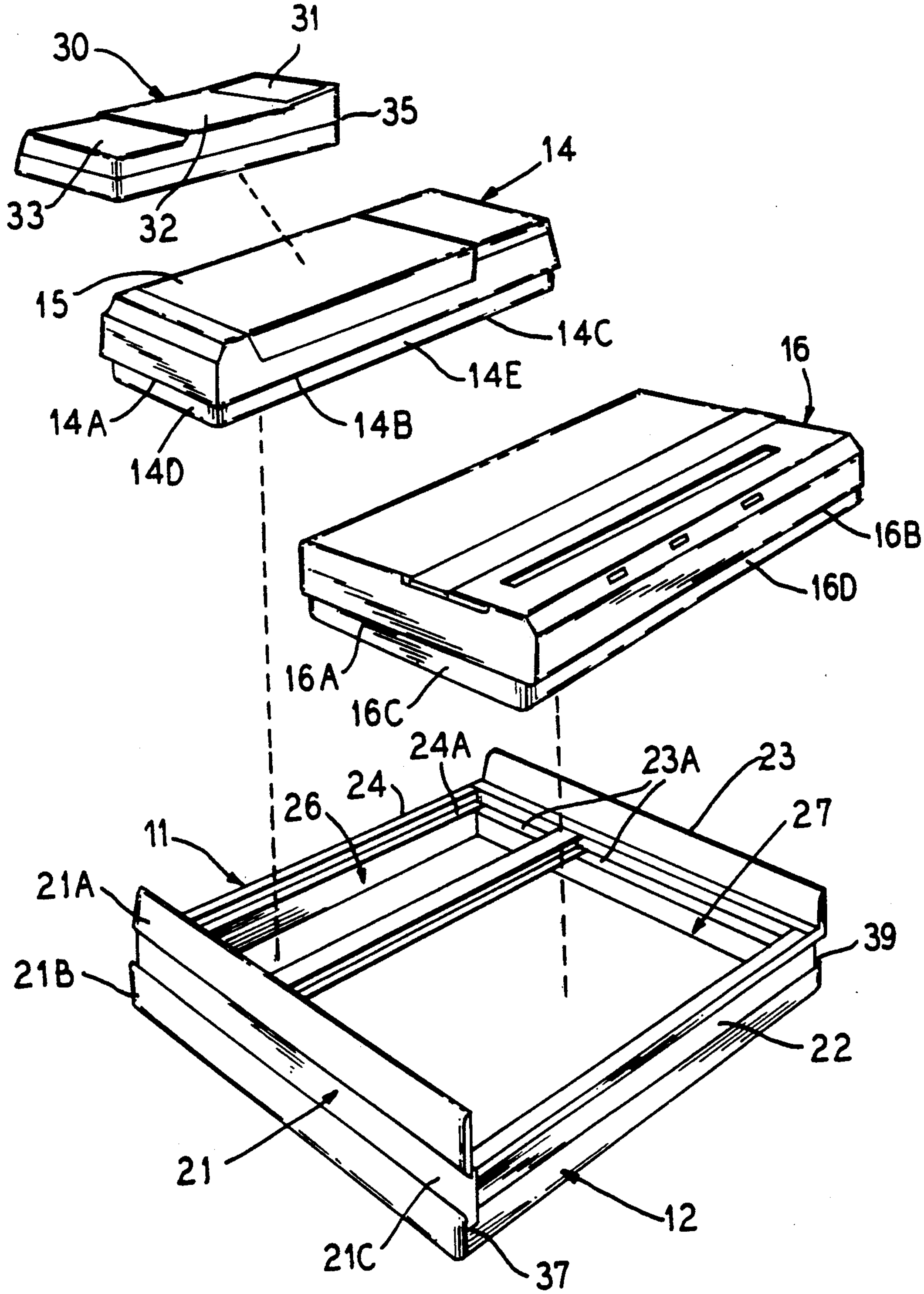
FIG. 2 is in the nature of an exploded view wherein a terminal and its receiving terminal module, and a printer module containing a printer unit, are shown offset from their respective receptacles in a standardized open frame which has a paper tray module assembled as a bottom closure therewith.

As seen in FIG. 2, the open frame 11 is composed of four rectilinearly arranged frame elements 21–24 and a single additional frame element or crosspiece 25 subdividing the open frame to provide a terminal receptacle 26 and a printer receptacle 27.

As shown in FIG. 2, the terminal module 14 has downward directed horizontal surfaces such as 14A and 14B at the four side thereof which are upwardly offset relative to a bottom 14C of the terminal module. Vertically disposed side walls such as 14D and 14E extend from the outer perimeter of the bottom 14C to inner margins of the surfaces such as 14A and 14B. The terminal module 14 fits into receptacle 26 with surfaces such as 14A and 14B resting on four rectilinearly arranged ledge portions such as 23A and 24A which are provided by the frame elements 21, 23, 24 and 25. These ledge portions at their inner edges confront the terminal module side walls such as 14D and 14E when the terminal module is assembled therewith.

Thus the ledge portions such as 23A, 24A of the frame elements 21, 23, 24 and 25 may be taken as principally defining terminal module receptacle 26.

Similarly ledges such as 23A and 25A of frame elements 21, 22, 23 and 25 support upwardly offset surfaces such as 16A and 16B of printer module 16, and confront side walls such as 16C and 16D, and may be taken as essentially defining printer module receptacle 27.

The terminal module 14 releasably receives the computerized terminal 30 upon opening of cover 15. By way of example the terminal module 14 may have an interior space of size to receive terminals known as the model 121XL and model 141XL of the Norand Corporation, Cedar Rapids, Iowa.

Such terminals 30 have a display region 31, a keyboard region 32 and a battery compartment region 33, and may be used for route accounting operations, for example. The terminal 30 may have an electrical interface at its end 35 which may comprise a 15-pin connector which mates with a mating connector within module 14 as the terminal is inserted into its module. A terminal 30 may weigh about one kilogram including batteries, memory and communications adapter. As with present printers of Norand Corporation, the electrical interface at 35 and other constituents of terminal 30 may allow the supply of data to the terminal module interface for printing by means of the printer unit within printer module 16.

By way of example printer module 16 may be of interior configuration to receive a commercially available eighty column printer which can print on three-ply fanfold paper supplied by the paper tray module 12, e.g. paper having a width between 5.0 inches and 10.0 inches. An example of such a printer is the Citizen MPS-20.

Paper tray module 12 may for example, for the portable device have a capacity of fifty sheets of three-ply paper. As an option for a non-portable device as in FIG. 3, a paper tray module may have a capacity of two hundred three-ply sheets.

Figure 5:
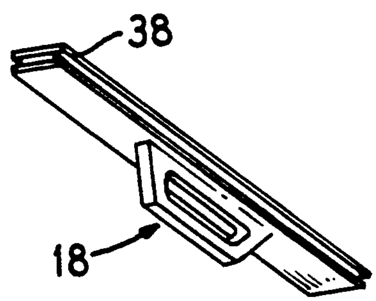
FIG. 5 is a somewhat diagrammatic perspective view of the carrying handle showing the handle as it appears when removed from the remaining parts of FIG. 1.

FIG. 2 shows the frame element 21 as including upper and lower flange portions 21A and 21B which have opposed edges overhanging a central body portion 21C so as to define a guideway 37 for receiving a slider member 38, FIG. 5, integral with the carrying handle 18. A similar guideway 39 is defined by flange portions of the frame element 23.

Figure 3:
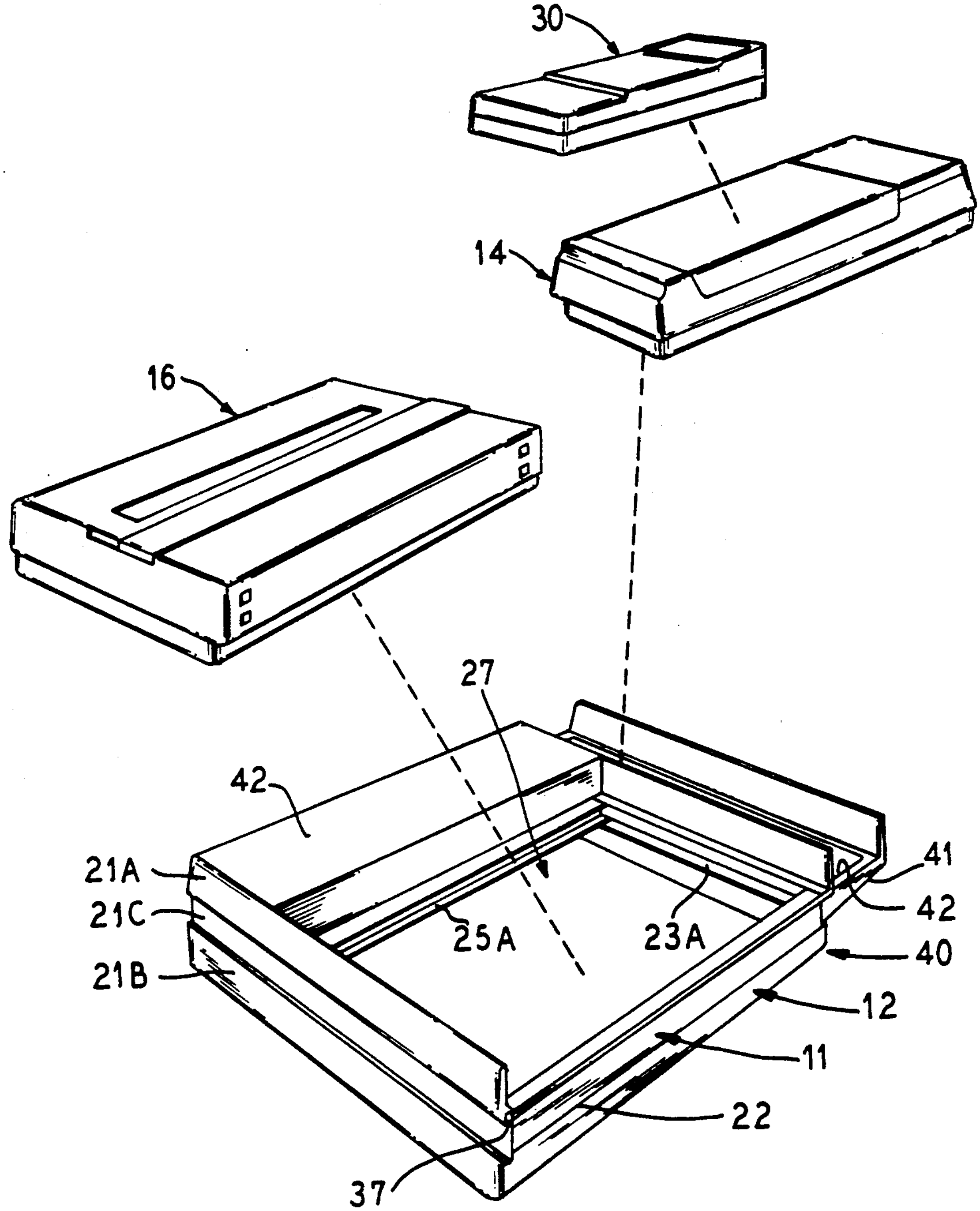
FIG. 3 is a somewhat diagrammatic exploded-type perspective view similar to FIG. 2, but illustrating the case where the standardized open frame with associated paper tray as bottom closure, is further provided with a cradle serving as an auxiliary receptacle for receiving the modular terminal assembly, and showing the modular printer assembly in a reversed orientation in comparison to FIG. 2.

In FIG. 3, the open frame 11 and paper tray 12 may be identical and yet provide a non-portable subassembly 40 which may differ from portable device 10 by the absence of handle 18, and attachment of a side arm bracket 41 to the frame 11. The bracket 41 may form a terminal cradle with a terminal module receptacle 42 receiving a terminal module 14 identical to that received by portable device 10. The printer module receptacle 27 is identical to that of the portable device 10, so as to receive the printer module 16 in the same orientation as in FIG. 1, or reversed as in FIG. 2. A second terminal may be located at 42, FIG. 3, where it may be automatically maintained in a charged condition by means of a charger connected with vehicle power. A lockable lift-up cover of module 14 may retain a terminal 30 similarly to the way shown in a brochure number 960-382-509 of Norand Corporation which has a 1985 copyright notice and which relates to a data system for bakery distribution. The content of this brochure is incorporated herein by reference in its entirety by way of background information as to exemplary functioning of the computerized terminal 30 and of the illustrated printer systems.

Figure 4:
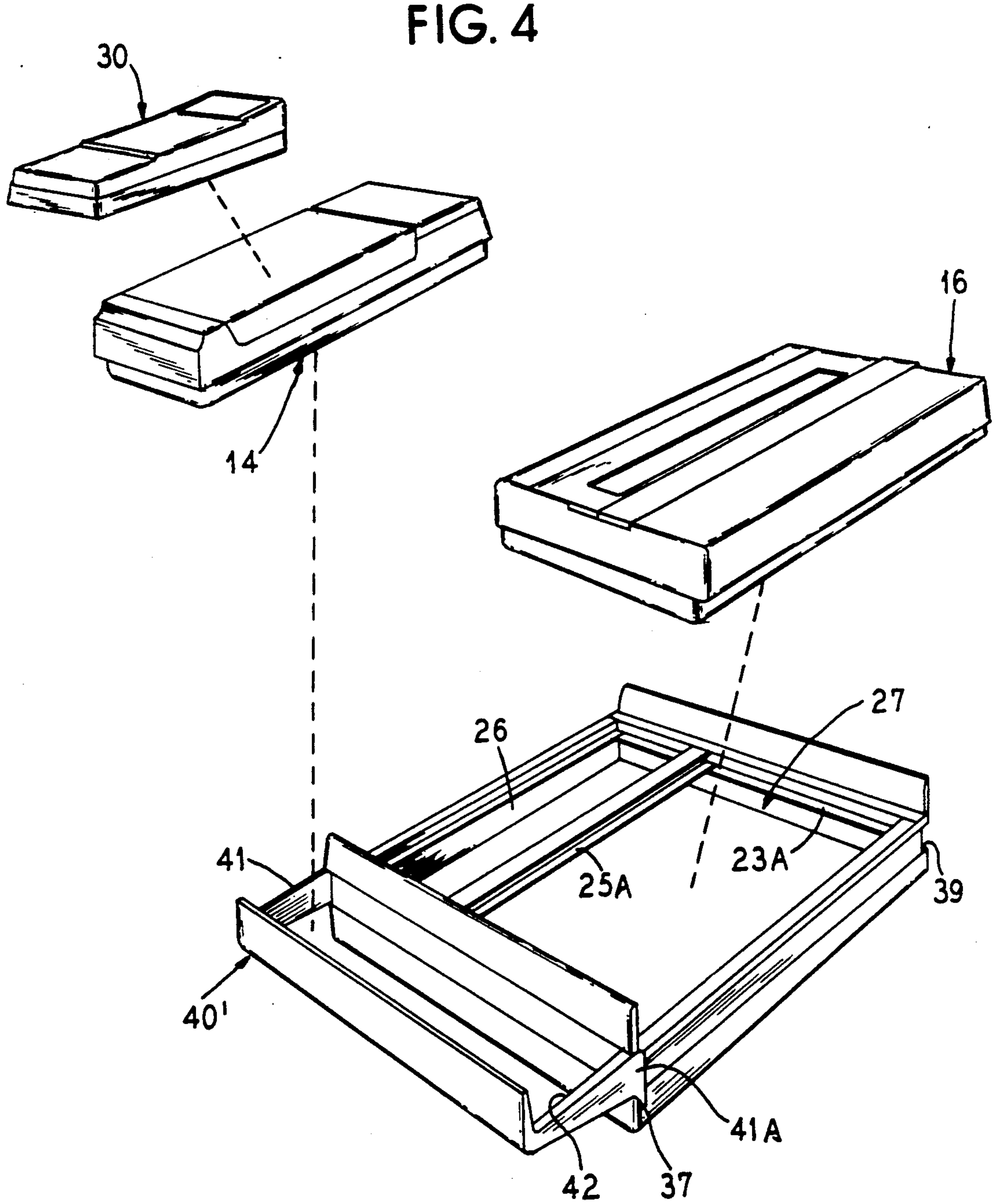
FIG. 4 is a somewhat diagrammatic exploded-type perspective view similar to FIG. 3, but showing the terminal cradle at an opposite side of the open frame.

FIG. 4 shows a non-portable printer subassembly 40' identical to subassembly 40 except that the side arm bracket 41 is mounted on the left side of the printer module receptacle 27 instead of the right side as in FIG. 3. In FIG. 4, the terminal module receptacle 26 is shown ready to receive a second terminal module so that two terminals such as 30 may be present where desired. For example, one terminal at 26 may be recharged while the second terminal 30 is removed from a terminal module 14 secured in receptacle 42 for use during delivery to a retail store or the like.

As best seen in FIG. 4, the side arm bracket 41 may have a slider member 41A integral therewith which is slidably engageable in guideway 37, FIG. 3, or guideway 39, FIG. 4. Suitable means, not shown, may retain the handle or terminal cradle in assembled relationship to the frame, e.g. screws or the like. Similarly, the terminal and printer modules may be fixedly retained with the open frame e.g. by threaded fasteners.

By way of example, the portable printer device 10 of FIG. 1 may consist essentially of open frame 11 with handle 18, tray module 12 secured to the open frame 11, terminal module 14 secured to the open frame 11, and printer module 16 secured to the open frame 11 and containing a printer unit which can be readily removable from module 16 to provide quick access to the paper tray 12. The terminal module 14 may removably receive a computerized terminal such as 30, FIG. 2, essentially as shown in the incorporated brochure number 960-382-509 of 1985 for the case of a van-mounted printer installation or for the case of a multi-terminal charger installation (except that a manually operated latch may be substituted for a lock on the hinged cover 15).

The terminal module for a given terminal configuration is essentially the same for portable and non-portable devices. The terminal module is field replaceable by the customer through the use of simple tools so that the customer has the option of replacing an original terminal module with one for a new terminal, e.g. a physically smaller terminal.

By way of example, a non-portable printer device may consist essentially of a subassembly 40 or 40' formed of the open frame 11 and paper tray 12, together with a side arm terminal cradle 41 and a printer module 16 secured to the frame 10. Module 16 would again contain a printer unit which is readily removable so as to provide quick access to the paper tray module for the replenishing of the paper supply.

In the portable and non-portable devices, the printer and terminal keyboard are preferably operable without removing or lifting a cover. The overall dimensions of each device, exclusive of parts 18 or 41, may be less than 5 ½ inches high, 15 178 inches wide and 14 1/2 ½ deep. The portable device with a self-contained chargeable battery (not shown) for the printer unit may have a weight of less than twelve pounds excluding terminal 30. The battery when fully charged may provide for 10,000 lines of printed output.

A DC/DC battery charger may be an optional source of overnight trickle charging for the printer battery from a route vehicle battery, similarly to the Model NP207 briefcase printer of Norand Corporation.

As in the systems of incorporated brochure 960-382-509 of 1985, the portable and non-portable systems herein provide for data communication from the terminal 30 via the terminal module 14 to the printer unit associated with printer module 16. For example, the printer unit may have a pendant cable for receiving power, data and control signals. The length of the printer cable may be sufficient to plug into a receptacle of the printer module prior to assembly of the printer unit with the printer module.

The portable unit may have an AC/DC battery charger operable from commercial alternating current power for charging the batteries of a terminal 30 which is inserted into the terminal module 14 and for charging the printer battery. By way of example, the battery charger may be located in extra space within the paper tray 12 along with the printer battery. An adjacent electric power receptacle may releasably receive an alternating current power cord for supplying commercial alternating current power to the charger during battery charging operation.

Rain covers may be provided for the portable device and may be snapped on over the terminal module 14 and the printer module 16. Alternatively strips of synthetic materials which adhere when pressed together, and known under the trademark VELCRO, may be applied to mating edges of the open frame 11 and of a top cover therefor.

To facilitate van mounting of the non-portable device, the printer module 16 may be assembled in receptacle 27 in a first orientation with the front of the printer adjacent frame element 22 as shown in FIG. 2, or in a second reverse orientation with the rear of the printer adjacent frame element 22 as shown in FIG. 3. The terminal cradle 40 may be secured at either of two opposite sides of open frame 11 as shown in FIGS. 3 and 4.

Data communication between the terminal module 14 and the printer module 16 or preferably the printer unit therein may take place via optical couplers and fiber optic conduits molded into the open frame 11. Optical couplers may be provided at frame elements 25 and 22, FIG. 2, to accommodate a single optical coupler of the printer unit, or the printer unit may be provided with two optical couplers in parallel each registering with a single optical coupling on the frame 11 for a respective one of two different orientations of the printer module and printer.

A van mounting plate (not shown) may be provided with tilt adjustment so that the angle of the modular printer device may be optimized in a non-portable installation.

As in the system of brochure number 960-382-509 of 1985, operating power for the charging of the terminal and printer batteries may be obtained from the vehicle power system in which the modular printer device is installed.

DESCRIPTION OF FIGS. 6–16

Figure 6:
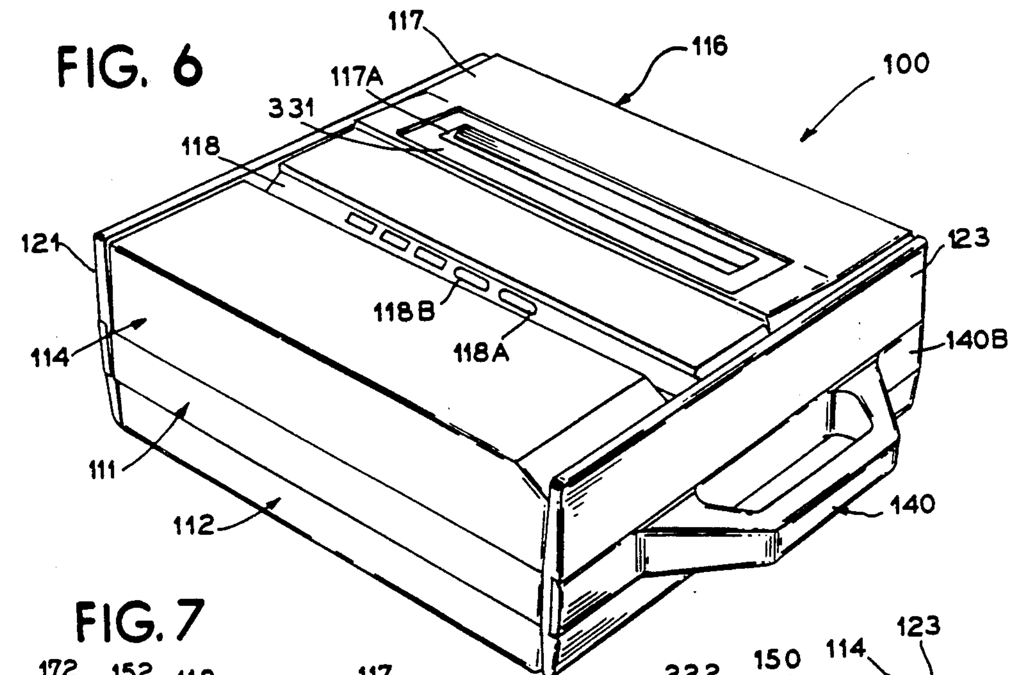
FIG. 6 is a somewhat diagrammatic perspective view of a portable version of the invention as actually constructed.

FIG. 6 is a perspective view illustrating a commercial version of a portable modular printer device 100 in accordance with the present invention. As in the previous embodiment, the device comprises a standardized open frame module 111 which receives a paper tray module 112, a terminal module 114 and a printer module 116. In this embodiment a printer cover 117 has a paper outlet slot 117A. A control panel 118 may include actuating regions such as "Advance Page" actuator 118A and a "Set Top of Page" actuator 118B.

The open frame 111 may have a configuration similar to that of frame 11 of FIG. 2, and in each embodiment the frame may be of integral unitary construction and of structural plastic material (e.g. Noryl FN-215) so as to provide the desired strength and rigidity with a minimum weight of material. Left and right frame elements 121 and 123 have upper and lower flange portions similar to flanges 21A, 21B, FIG. 2, which protectively embrace terminal module 114, printer module 116 and paper tray module 112.

Figure 7:
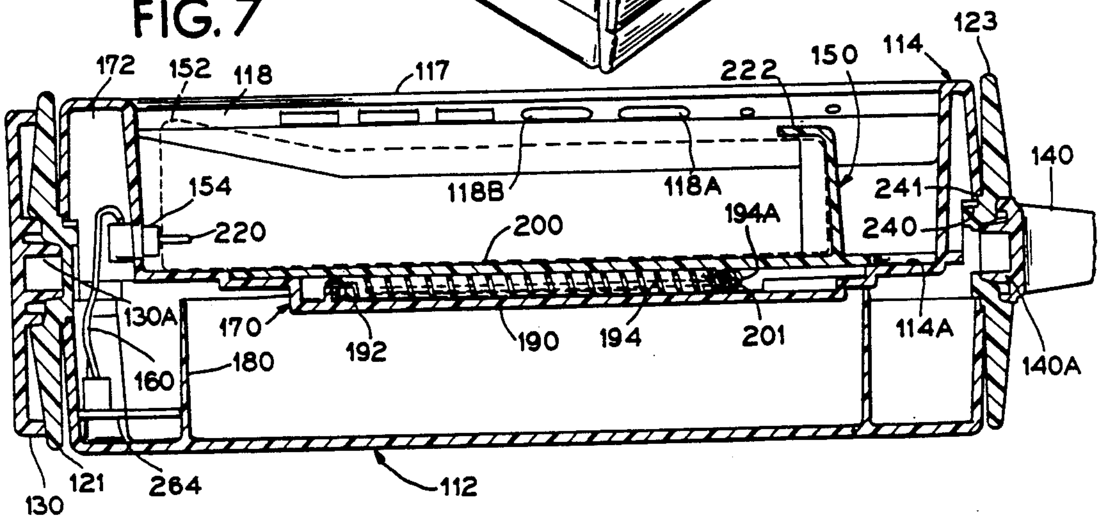
FIG. 7 is a somewhat diagrammatic transverse sectional view of the embodiment of FIG. 6 and showing internal construction at the terminal module of the portable device.

As best seen in FIG. 7, frame elements 121 and 123 have central grooves which are shown as receiving an interior rib structure 130A of a foot member 130 and a base rib structure 140A of a handle member 140. Threaded fastening elements such as indicated at 141 and 142 in FIG. 8 may secure members 130 and 140 with the frame 111. As seen FIG. 6, a base 140B of handle member 140 may extend for the entire length of frame element 123 so as to completely cover the central groove therein.

As shown in FIG. 7, terminal module 114 has an elongated recess 114A accommodating reciprocal movement of a terminal retainer bracket 150. A hand-held terminal corresponding to terminal 30 FIG. 2, is indicated in dash outline at 152, FIG. 7, in coupled relationship to the terminal module 114. The terminal 152 is disengaged from the terminal module by sliding the retainer bracket 150 to the right as seen in FIG. 7, against the action of a spring means located in a bottom portion of the terminal module 114. The spring means acts on the bracket 150 with sufficient force to insure interengagement of a socket of the terminal 152 with a plug type connector 154 associated with the terminal module 114. Connector 154 is connected with the electric circuitry of the printer device 100 by means of a cable indicated at 160. As previously described, connector 154 and cable 160 provide for data communication between the terminal indicated at 152 and a printer unit associated with printer module 116.

As seen in FIG. 7, terminal module 114 is comprised of a terminal holder base 170 of molded plastic construction (e.g. Cycolac KJW, Borg Warner) The base 170 may be threadedly secured to bosses integral with the underlying frame elements corresponding elements 24 and 25, FIG. 2. The base 170 is provided with a double wall configuration at its opposite longitudinal ends such that the cable 160 may extend within an enclosed chamber 172.

Figure 8:
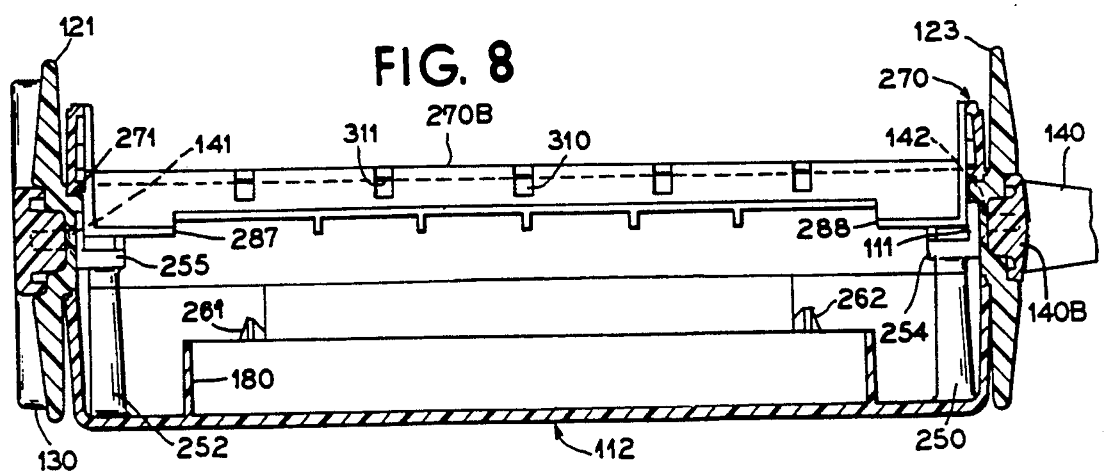
FIG. 8 is a somewhat diagrammatic transverse sectional view of the embodiment of FIG. 6 and showing the printer case and other internal parts at a rear printer module receiving portion of the portable version of FIGS. 6 and 7, the printer cover, and printer module having been removed from the printer case to reveal the rear wall of the printer case.
Figure 15:
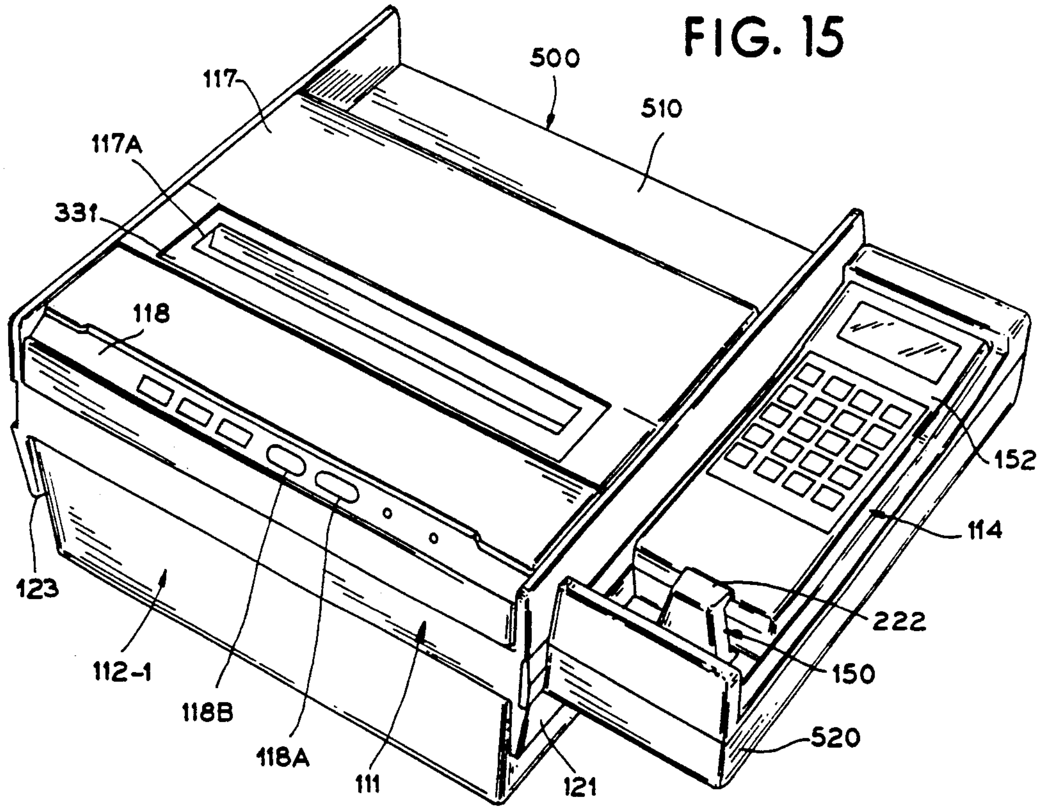
Figure 16:
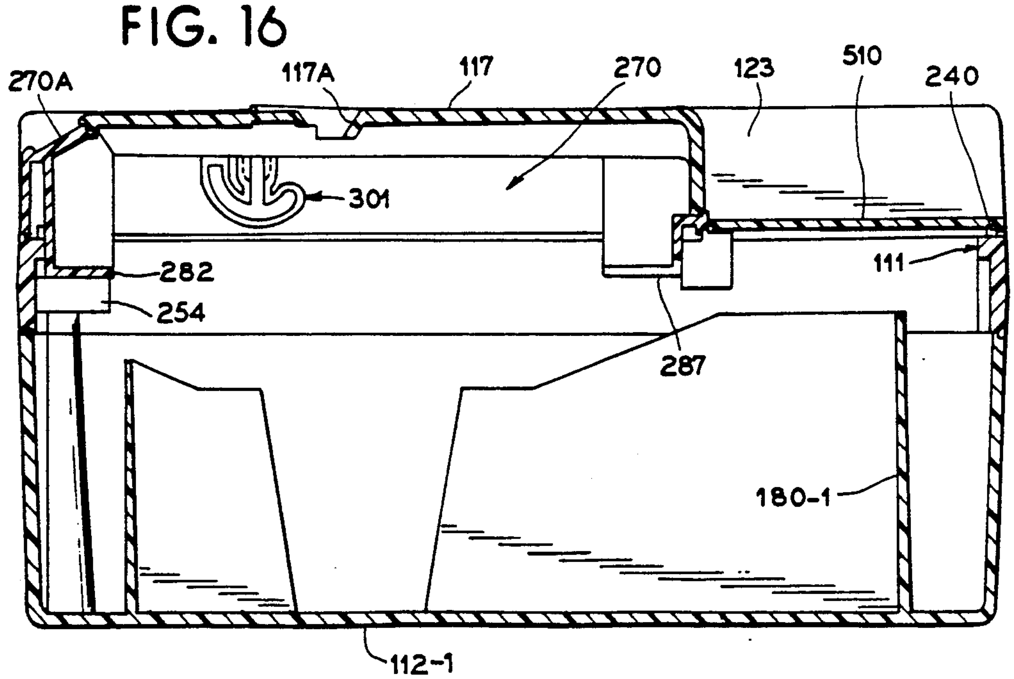
FIG. 16 is a somewhat diagrammatic longitudinal sectional view of the device of FIG. 15, and showing use of a paper tray module of greater capacity than that of FIGS. 6–11.

As shown in FIG. 8, paper tray module 112 of the portable device 100 may be provided with a fifty sheet paper bin 180 for holding a supply of paper which is to be automatically fed into the printer mechanism. The paper tray 112-1 shown in FIG. 16 is equipped with a larger paper bin 180-1 capable of holding 200 sheets for automatic feed into a printer mechanism. The larger capacity paper tray module 112-1 is normally associated with a non-portable device such as shown in FIGS. 15 and 16. The paper tray modules 112 and 112-1 may be identical except for the difference in capacity of the paper bins.

Figure 10:
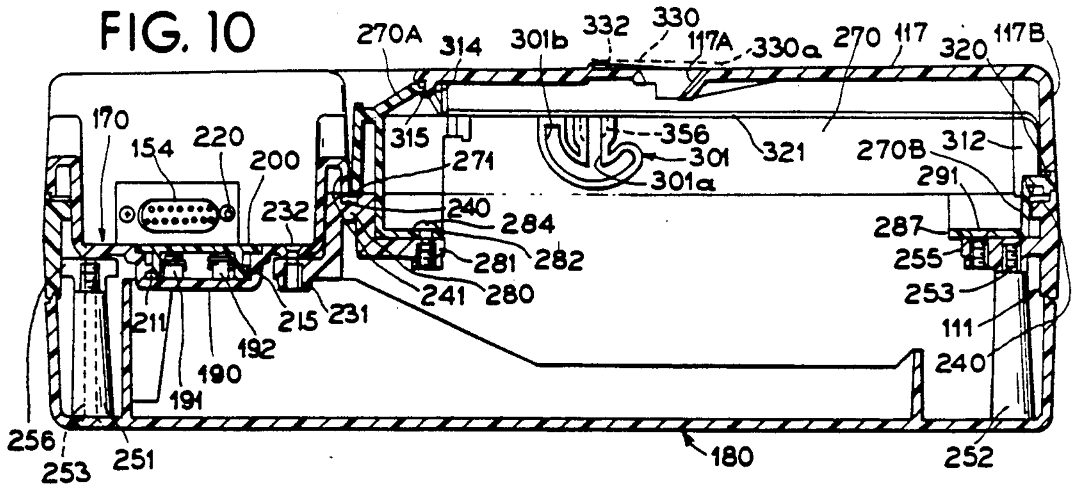
FIG. 10 is a somewhat diagrammatic longitudinal sectional view of the portable embodiment of FIG. 6.
Figure 9:
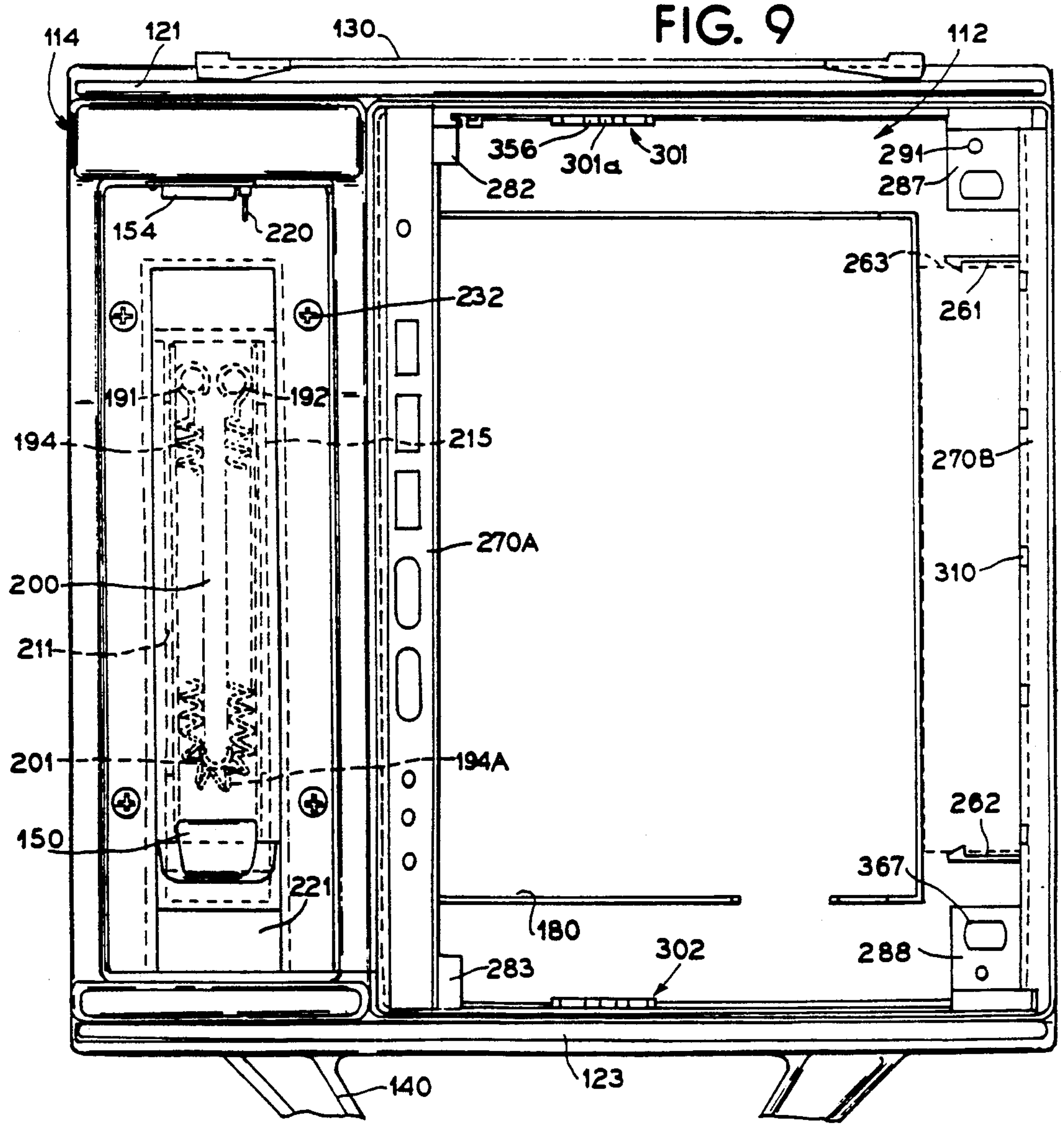
FIG. 9 is a somewhat diagrammatic top plan view of the portable version of the invention, with the printer module, printer cover and instrument panel finish strip removed to show interior construction of the printer case and paper tray module.

As diagrammatically indicated in FIGS. 7, 9 and 10, terminal holder base 170 may have an integral depressed central bottom 190 (FIG. 7) with two integral upstanding bosses 191, 192 (FIG. 9) serving to secure the ends of a tension spring indicated diagrammatically at 194. The bracket 150 includes an integral slider piece 200 with an integral depending lug 201 about which a mid region 194A of spring 194 may extend.

As best seen in FIG. 10, slider piece 200 may have integral depending legs with outturned feet such as 211 which interengage with ledge parts such as 215 which are integral with the terminal holder base 170. The upper edges of the ledge parts such as 215 are chamfered, e.g. over a distance of 0.040 inch at forty-five degrees, at their inner edges so that the feet such as 211 will be cammed inwardly as the sliding retainer bracket 150 is pressed downwardly during assembly with the terminal holder base 170. The legs 211 snap into interengagement with ledges such as 215 to hold the parts in assembled relation while accommodating longitudinal sliding motion of the retainer bracket 150.

As seen in FIGS. 7, 9 and 10, the connector 154 has an associated alignment pin 220 which engages in a receiving socket on the terminal 152 and assures reliable interengagement of the connector pins and sockets in spite of manufacturing tolerances. The depressed bottom 190 of the terminal holder base provides a clearance space 221, FIG. 9, into which the slider piece 200 moves to accommodate insertion of one end of the computer terminal 152, FIG. 7, under lip 222 of the retainer bracket 150, and to allow the opposite end of the terminal 152 to be lowered into engageable alignment with the pin 220, after which the bracket 150 is allowed to move to the left (as viewed in FIG. 7) until the terminal 152 is interengaged with connector 154 in readiness for a data transfer operation.

In an embodiment actually constructed, the ledges such as 215 had a length of about 5.4 inches, and the outturned feet such as 211 had a length of about four inches. The length of the slider piece 200 was about 9.1 inches while its slideway including clearance space 221 was about 10.2 inches, the slider piece 200 being longitudinally shiftable over a distance of about one inch against the action of spring 194.

To fasten the terminal module 114 with the open frame 111, the open frame is provided with four integral tabs such as 231, FIG. 10, having internally threaded sleeves for receiving screws such as 232, FIGS. 9 and 10.

As can be seen in FIGS. 7 and 10, a sealing strip 240 extends about the perimeter of the two openings in the frame 111 with a downturned integral edge 241 of the terminal module 114 being held in sealing relation against the seal strip 240 continuously about the perimeter of the terminal module.

Referring to FIGS. 8 and 10, the paper tray module 180 has bosses such as 250 (FIG. 8), 251 (FIG. 10) and 252 (FIGS. 8 and 10) at respective corners which receive screws such as 253, FIG. 10, threadedly engaged with the frame 111. In particular, the frame has integral corner tabs such as 254 (FIG. 8), 255 (FIGS. 8 and 10)

and 256 (FIG. 10) with internally threaded sleeves for receiving the screws such as 253.

As seen in FIG. 9, the paper tray module includes a pair of integral retaining fingers 261, 262 for receiving a battery pack 263 for use during portable operation. A printed circuit board 264, FIG. 7, occupying a left marginal region of the paper tray 112 may have a plug-in type receptacle thereon adjacent finger 261, FIG. 9, for receiving input direct current operating power from the battery pack.

In the illustrated embodiment the control panel 118 includes an apertured structural member 270A which is an integral part of a one-piece printer case 270 of plastic material (e.g. Cycolac KJW, Borg Warner) The case is of generally open rectangular configuration and overlies four elements of the frame 111 (corresponding to frame elements 21, 22, 23, 25, FIG. 2). The case 270 includes a rectangular perimeter 271, FIG. 10, which continuously sealingly engages the sealing strip 240.

The frame 111 includes an integral crosspiece 280, FIG. 10, with integral tab portions such as 281, FIG. 10, having threaded sleeves to which overlying flanges such as 282 (FIGS. 9 and 10) and 283 (FIG. 9) of the printer case 270 are secured by means of screws such as 284. Corner tabs 254 and 255, FIG. 8, of the frame 111 are threadably engaged with corner flange parts 287 (FIGS. 8–10) and 288 (FIG. 8 and 9) as indicated by screw 291, FIGS. 9 and 10.

The printer case 270 is provided with integral inwardly projecting ribs at opposite sides thereof which define printer module mounting means 301, 302, FIGS. 9 and 10. The purpose of mounting means 301, 302 is explained in detail hereafter in reference to FIG. 11. As seen in FIG. 10, each of the mounting means includes a vertical guide channel such as 301A connecting with an arcuate guide channel such as 301B.

As seen in FIG. 8, a rear wall element 270B of the printer case 270 has a series of five notches leaving exposed ledges such as 311 which interengage with hook parts integral with vertical ribs such as 312, FIG. 10. This provides for a hinged coupling of the rear wall 117B of cover 117 with the rear wall 270B of the printer case, the frontal edge of cover 117 having a series of cam hooks such as 314 which can be snapped into engagement with an edge 315 of the printer case 270. When the cover 117 is opened, it can be completely removed by pulling the integral hooks of ribs 312 forwardly out of the notches 310.

The rear wall element 270B, FIG. 10, has a sealing strip 320 secured thereon which engages with a lower edge of cover wall 117B when the cover 117 is in closed position. The cover 117 has a further sealing strip 321 which together with sealing strip 320 extends along the entire closure perimeter of the cover 117. A clear soft plastic strip 330 may be secured in a recess 331, FIG. 6, e.g by means of adhesive at 332, FIG. 10, so that a flap 330A of strip 330 normally covers the paper outlet slot 117A while still allowing paper to be fed therefrom during printing operation.

Figure 11:
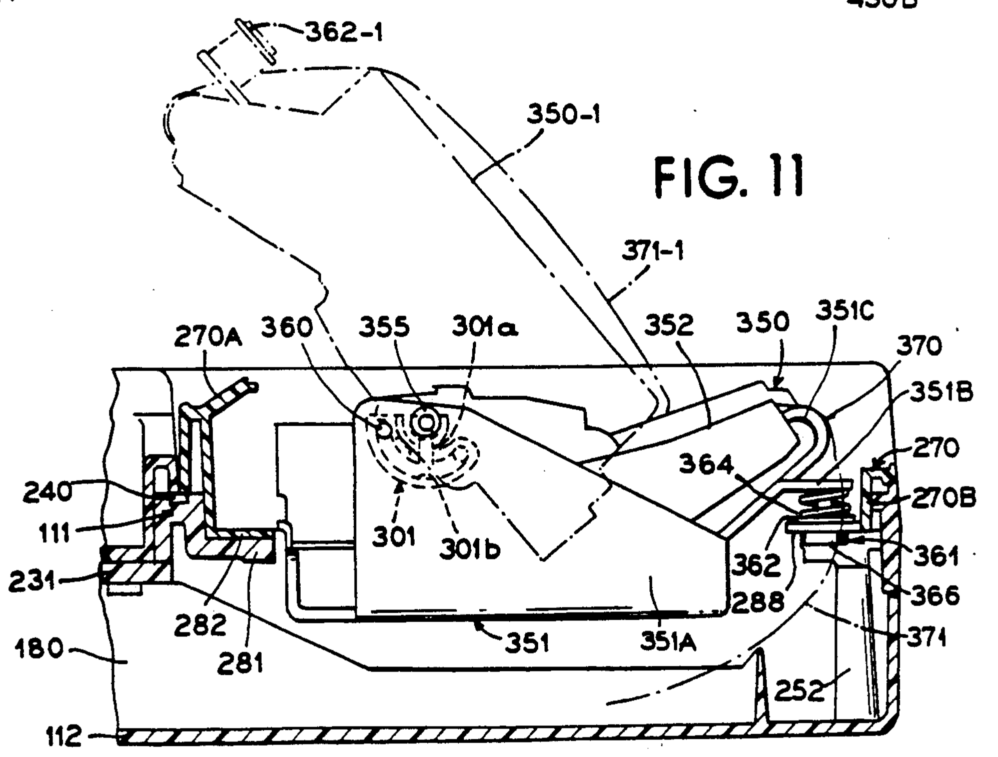
FIG. 11 is an enlarged somewhat diagrammatic partial longitudinal sectional view showing the printer module within the printer case, and indicating a pivoted position of the printer module in dot dash outline wherein access is provided to the paper tray bin of the paper tray module.

FIG. 11 shows a printer module 350 interengaged with the printer case 270. In particular the printer module is provided with a generally U-shaped pivot frame 351 of pressed metal which adapts various commercially available printer mechanisms such as 352 to the printer case 270.

The pivot frame 351 has upstanding lateral flanges such as 351A each of which carries a pivot shaft with a disk 355 which fits into a conforming receiving slot such as indicated at 356, FIG. 10, of the printer module mounting means 301, 302, FIG. 9. A limit pin 360, FIG. 11, of each pivot frame lateral flange is of lesser diameter than disk 355 so as to be freely movable in the vertical channel 301A and in the arcuate channel 301B, FIG. 10.

The pivot frame 351 of the printer module 350 is further provided with a pair of longitudinally extending flanges such as 351B which carry rotary latch mechanisms 361. The latch mechanisms each include a sleeve 362 which has an extended position as indicated in dot dash outline at 362-1 and which is shiftable against the action of a compression spring 364 as the printer module pivots clockwise as shown in FIG. 11 from the inactive position 350-1 to the position shown in solid lines at 350. As the sleeve 362 retracts a bar-shaped lug 366 moves through a conforming elongated slot such as 367 in a tab such as 288, FIG. 9. When lug 366 reaches a position below the tab 288, a camming action may cause the lug 366 to rotate slightly and interlock with the tab. To release the lug 366, the printer module is rocked slightly in the clockwise direction against the action of spring 364, whereupon the lug 366 is realigned with its slot 367 to allow counterclockwise pivotal movement of the printer module to position 350-1. An exemplary push-release arrangement of this type is shown in detail in U.S. Pat. No. 3,862,773 issued Jan. 28, 1975.

The pivot frame 350 further includes a central curved extension 351C disposed between the longitudinal flanges 351B and providing a smooth paper guide face 370 which forms part of a paper feed path 371. When the printer module is pivoted to position 350-1, the paper path may be extended as indicated at 371-1.

Figure 13:
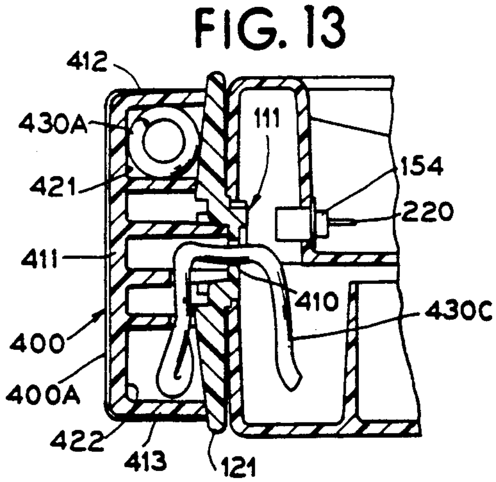
FIG. 13 is a somewhat diagrammatic partial transverse sectional view showing the AC adapter module of FIG. 12 operatively secured with the portable embodiment of FIGS. 6–11 in place of the foot member.
Figure 14:
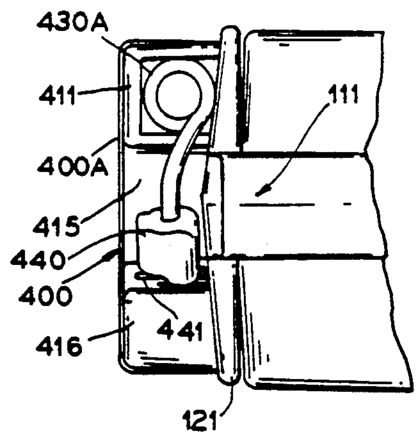
FIG. 14 is a somewhat diagrammatic partial elevational view showing the frontal end of the AC adapter module of FIGS. 12 and 13.
Figure 12:
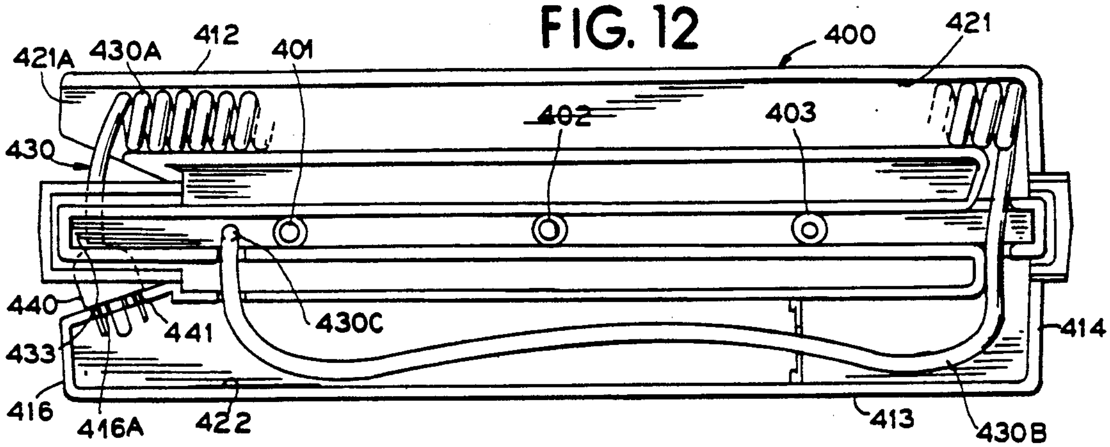
FIG. 12 is a somewhat diagrammatic side elevational view of an AC adapter module which may replace the foot at the left side of the portable version of FIG. 6 so as to provide for operation of the printer system of FIGS. 6–11 from commercial alternating current power.

FIGS. 12–14 show an AC adapter module 400 which is readily applied to the portable version of FIGS. 6–11 in place of foot member 130 For this purpose, the module 400 is provided with internally threaded sleeves at 401–403 so as to be aligned with respective apertures such as that receiving screw 141, FIG. 8. The frame module of FIGS. 13 and 14 may be identical to the frame module 111 of FIGS. 6–11 so that the same reference numeral has been applied in FIGS. 13 and 14, the aperture 410, FIG. 13, being covered by the foot member 130 in FIGS. 6–11.

The adapter module 400 may have a pair of flat raised parts such as 400A, FIG. 13, for resting stably on a flat surface with the handle uppermost. The module 400 has external closure walls 411–416 and butts against frame element 121 so as to provide a first chamber 421 open only at an end 421A, and a second chamber 422 closed at both ends by walls 414 and 416.

A power cord 430 includes a coiled section 430A stored in chamber 421 and fur&her section 430B extending in chamber 422. An inner end portion 430C of the power cord extends from chamber 422 to a central chamber 433 and then through aperture 410, FIG. 13, in frame 111 and into the interior of the portable device. The AC power may be supplied to a suitable power supply circuit within the portable device. Alternatively the power supply circuit may be located within chamber 422, for example.

As shown in FIGS. 12 and 14, a conventional power plug 440 is affixed at the outer end of the power cord and when not in use may be engaged in slots 441 in a closure wall 416A at the adjacent end of chamber 422.

When the power cord 430 is to be connected with commercial AC power, the plug 440 is disengaged from the slots 441 in wall 416A, and the coiled section 430A withdrawn as far as necessary from chamber 421 through the open end 421A.

FIGS. 15 and 16 show a non-portable version 500 which may be constructed primarily from the same components as the portable version of FIGS. 6-11. In FIGS. 15 and 16, the frame module 111 may be identical to frame module 111 of FIGS. 6-14 and receive the same reference numerals. In FIGS. 15 and 16, the printer case is identical to the case 270 of FIGS. 6-11 and has the same reference numeral applied thereto. Since the printer case 270, FIG. 16 has been reversed in its receiving space of frame 111, the frame side walls 121 and 123 are to the right and left relative to the control panel 118 which is considered to be at the front of the device.

In FIG. 15, printer cover 117 and paper outlet slot 117A are identical, but are of reversed orientation along with the printer module and printer case 270.

In FIGS. 15 and 16, the receptacle for the terminal module 114 simply receives a cover plate 510, while in place of foot member 130, FIG. 7, the frame module 111 receives a terminal side bracket 520, which secures to the frame in the same manner as foot member 130, FIG. 8, or AC module 400, FIG. 12. The terminal side bracket 520 receives a terminal module 114 identical to that of FIG. 7. Reference numerals 150, 152 and 222 are applied in FIG. 15 and have been explained in relation to FIGS. 7 and 9.

The aperture 410, FIG. 13, in the frame module 111 is of a size and location to accommodate the cable 160, FIG. 7, optionally for the case of the embodiment of FIGS. 15 and 16.

The paper tray module of FIGS. 15 and 16 may correspond with the paper tray module 112 of FIGS. 7 and 8, but may be of substantially greater depth so that paper bin 180-1 of FIG. 16 may accommodate a substantially greater number of paper sheets, e.g. two hundred paper sheets instead of fifty.

In each of the embodiments of FIGS. 6-11 and 15 and 16, the printer module 350, FIG. 11, may be completely removed from the unit by vertically aligning limit pin 360 under disk 355, FIG. 11, and then lifting module 350 vertically so that pin 360 trave)s upwardly along channel **301*a* as the disk is lifted from its receiving recess 356, FIGS. 9 and 10**. The electrical connections may be of the pin and socket type so as to readily severed, and readily reestablished.

DESCRIPTION OF FIG. 17

Figure 17:
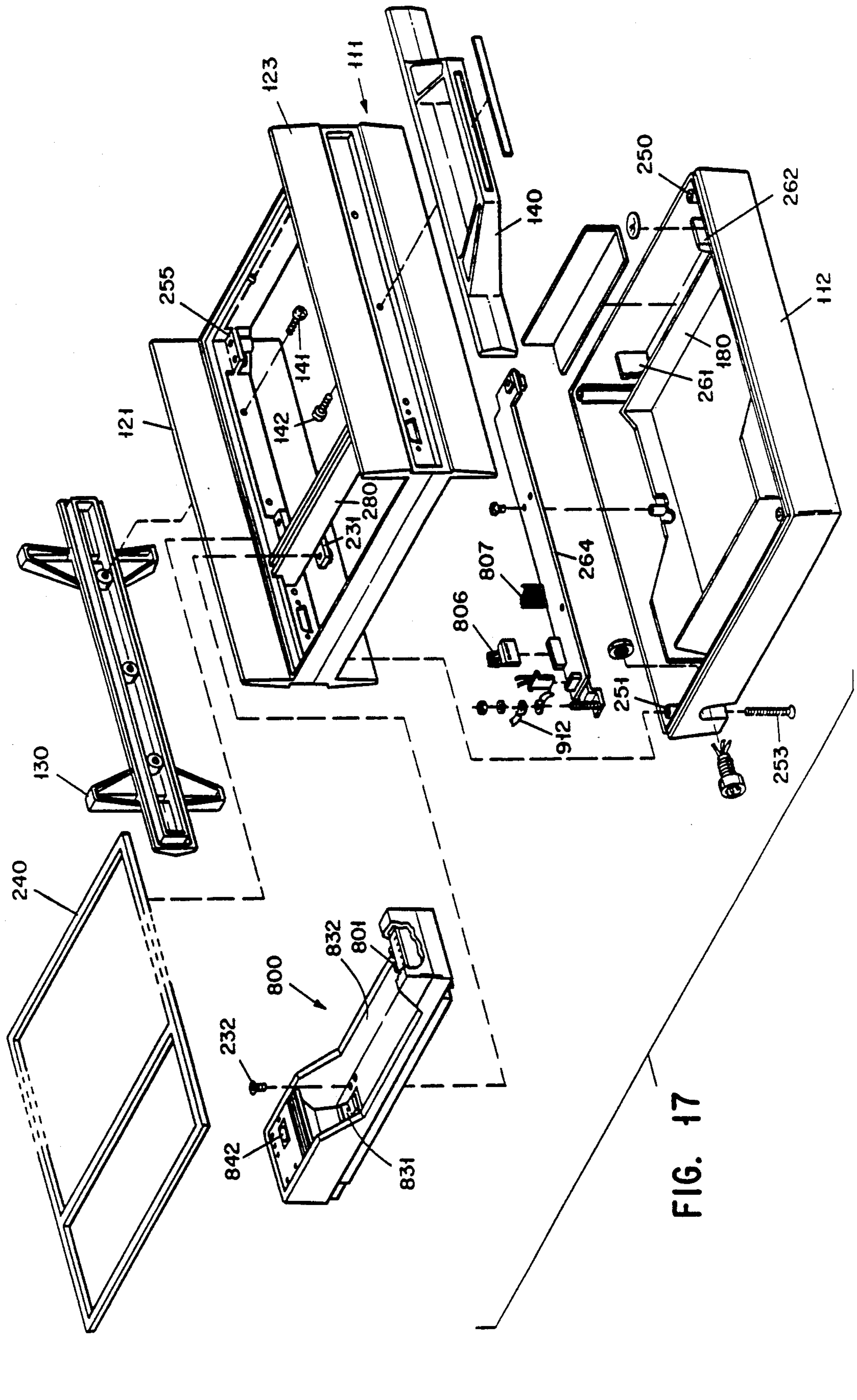
FIG. 17 is a somewhat diagrammatic exploded perspective view showing details of the printer system of FIGS. 6–16, and showing the use of a new type of docking module with the printer system for enhanced ease of loading and accommodating the terminal configuration of the first, fifth and twenty-second figures of incorporated application U.S. Ser. No. 07/347,602 for example.

FIG. 17 is an exploded view showing anew snap lock type docking module 800 for association with the remaining parts of the modular printer system of FIGS. 6-16.

FIG. 17 shows the following parts identical to those of FIGS. 6-16:

| Element of FIG. 17 | Location in FIGS. 6-16 |
|---|---|
| frame 111 | FIGS. 7 and 15 |
| paper tray module 112 | FIG. 6 |
| frame elements 121, 123 | FIG. 6 |
| foot member 130 | FIG. 7 |
| handle member 140 | FIG. 6 |
| fastening elements 141, 142 | FIG. 8 |
| paper bin 180 | FIG. 8 |
| tabs 231 | FIG. 10 |
| screws 232 | FIG. 10 |
| bosses 250, 251 | FIG. 8 and 10 |
| screws 253 | FIG. 10 |
| corner tabs 255 | FIG. 8 |

-continued

| Element of FIG. 17 | Location in FIGS. 6-16 |
|---|---|
| retaining fingers 261, 262 | FIG. 9 |
| printed circuit board 264 | FIG. 7 |
| crosspiece 280 | FIG. 10 |

Figure 18:
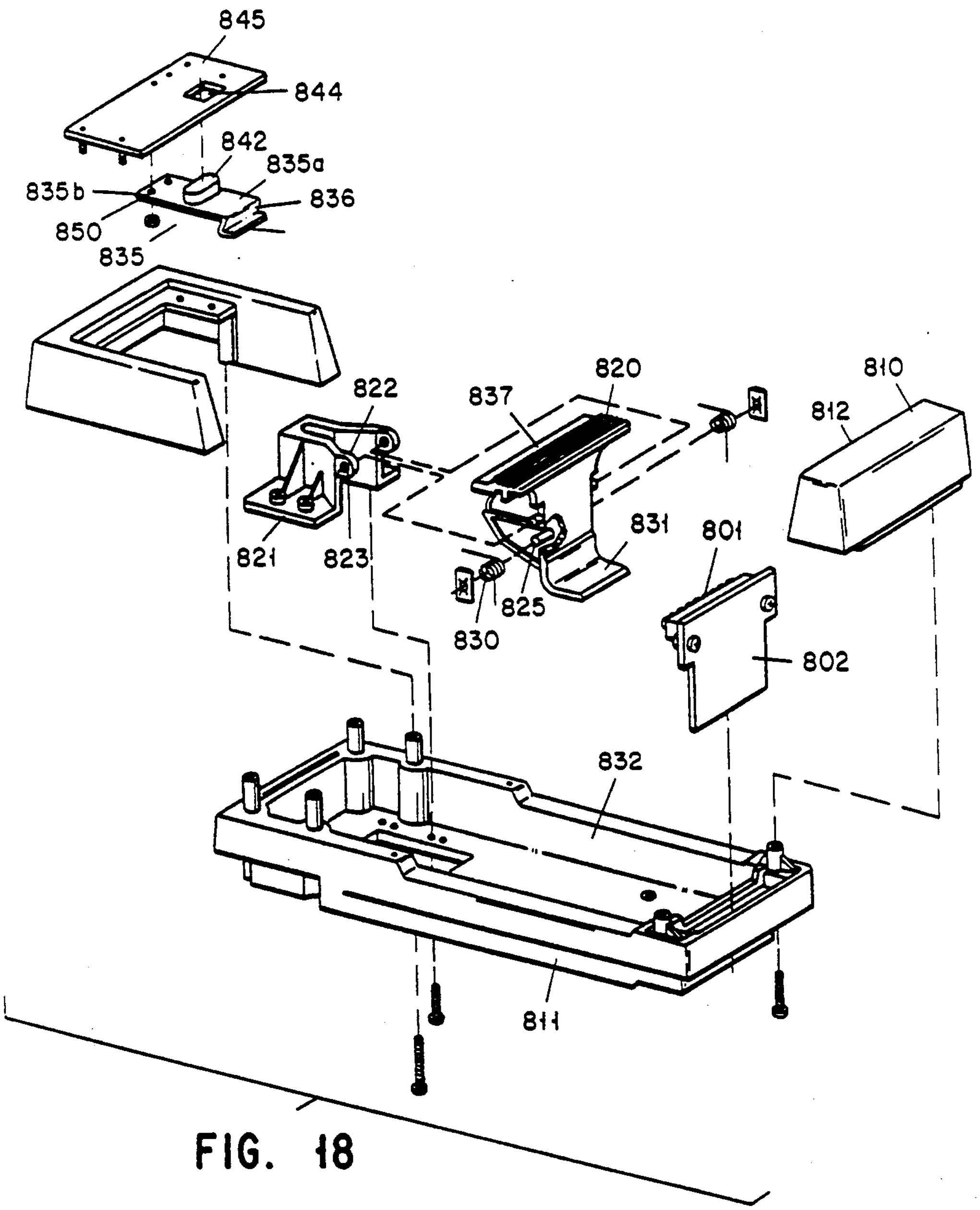
FIG. 18 is a somewhat diagrammatic exploded perspective view of the new docking module shown in FIG. 24.

FIG. 18 shows a somewhat diagrammatic exploded perspective view of the terminal docking module 800. The docking module has a series of spring contact fingers 801 mounted by means of printed circuit board 802. The spring fingers may be arranged as shown in pending U.S. patent application Ser. No. 07/327,660 filed Mar. 23, 1989, so as to engage with the contact pads (94, FIG. 5 of incorporated U.S. patent application Ser. No. 07/347,602). A connector 805 and ribbon cable 806, FIG. 17, provide electrically conductive paths between the spring fingers 801 and associated paths on board 802, and printed circuit board 264, FIG. 17. Ribbon cable 807, FIG. 17, leads from printed circuit board 264 to the controller for the printer which is mounted at 301, FIG. 10. By way of example, for an embodiment of portable briefcase printer, the cable 806 may be a sixteen conductor ribbon cable having a length of twenty inches, and serving both for power and data input/output. A similar cable of greater length may be used when module 800 is mounted in a vehicle remote from the printer.

Figure 19:
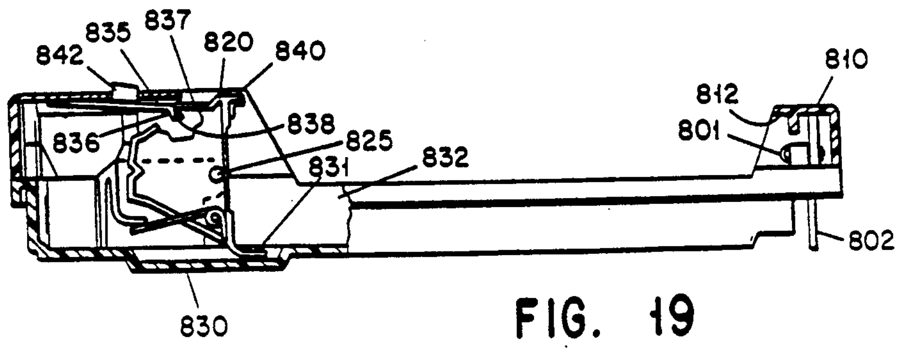
FIG. 19 is a side elevational view of the docking module of FIG. 18, with portions broken away in in section, so as to reveal details of internal construction.

A cover member 810, FIG. 18, is secured to module base 811, and provides an overhanging lip at 812, FIG. 19, for retaining the lower end of a terminal.

At the opposite end of module base 811, a latch part 820, FIG. 18, is mounted for pivotal movement on a latch mounting bracket 821. The bracket 821 may have a pair of spaced flanges such as 822 with aligned openings such as 823 which mount trunnions such as 825 of the latch 820. A torsion spring 830 acts on the latch to urge a mechanical sensor foot part 831, FIG. 19, of the latch into the space to be occupied by the upper end of a terminal such as 10 as it is pivoted downwardly into the receptacle 832 of the docking module.

Engagement of the terminal with mechanical sensor 831 causes the latch 820 to pivot until a latch spring 835, FIG. 19, snaps upwardly to engage a bend 836 thereof behind a cooperative ledge 837 of the latch. An extension 838 of the spring 835 limits the upward movement of the spring and retains the bend 836 in blocking relationship to ledge 837 preventing reverse pivoting of the latch. The latch 820 is thus locked in an angular position wherein a projection 840 thereof overlies the terminal receiving space and securely retains the terminal in receptacle 832. Even dropping of a portable printer will not cause release of the terminal from the receptacle since the latch 820 is securely locked in the retaining angular position.

A latch release button 842 is secured to latch spring 835 and may be manually depressed to depress bend 836 and disengage it from ledge 837 whereupon torsion spring 830 returns sensor foot 831 to its initial position, partly lifting the terminal out of receptacle 832. The latch button 842 protrudes through aperture 844, FIG. 18, of a trim plate 845 so as to be accessible for manual depression to release the latch.

By way of example, the latch spring 835 may be formed from a strip of type 304 stainless steel, cold rolled, 0.015 inch thick (no. 28 gauge) and 0.875 inch wide. The bend 836 may form an angle of seventy-five degrees with the plane of the latch spring main body portion 835a, FIG. 18, so that the ledge 837 is captured at the bend 836. BY way of example the height of bend 836 measured normal to the plane of body portion 835a, FIG. 18, may be 0.22 inch. Portion 835a may have a length of 1.844 inches and extension 838 may have a length of more than 0.2 inch where the overall length measured parallel to the plane of body portion 835a (FIG. 18) is 2.00 inch. The dimension from fixed end 835b to the screw location indicated at 850 is 0.927 inch. The values 0.927, 2.00 and 1.844 were changed to these values from former values of 0.957, 2.2125 and 1.913, respectively.

DESCRIPTION OF FIG. 20

Figure 20:
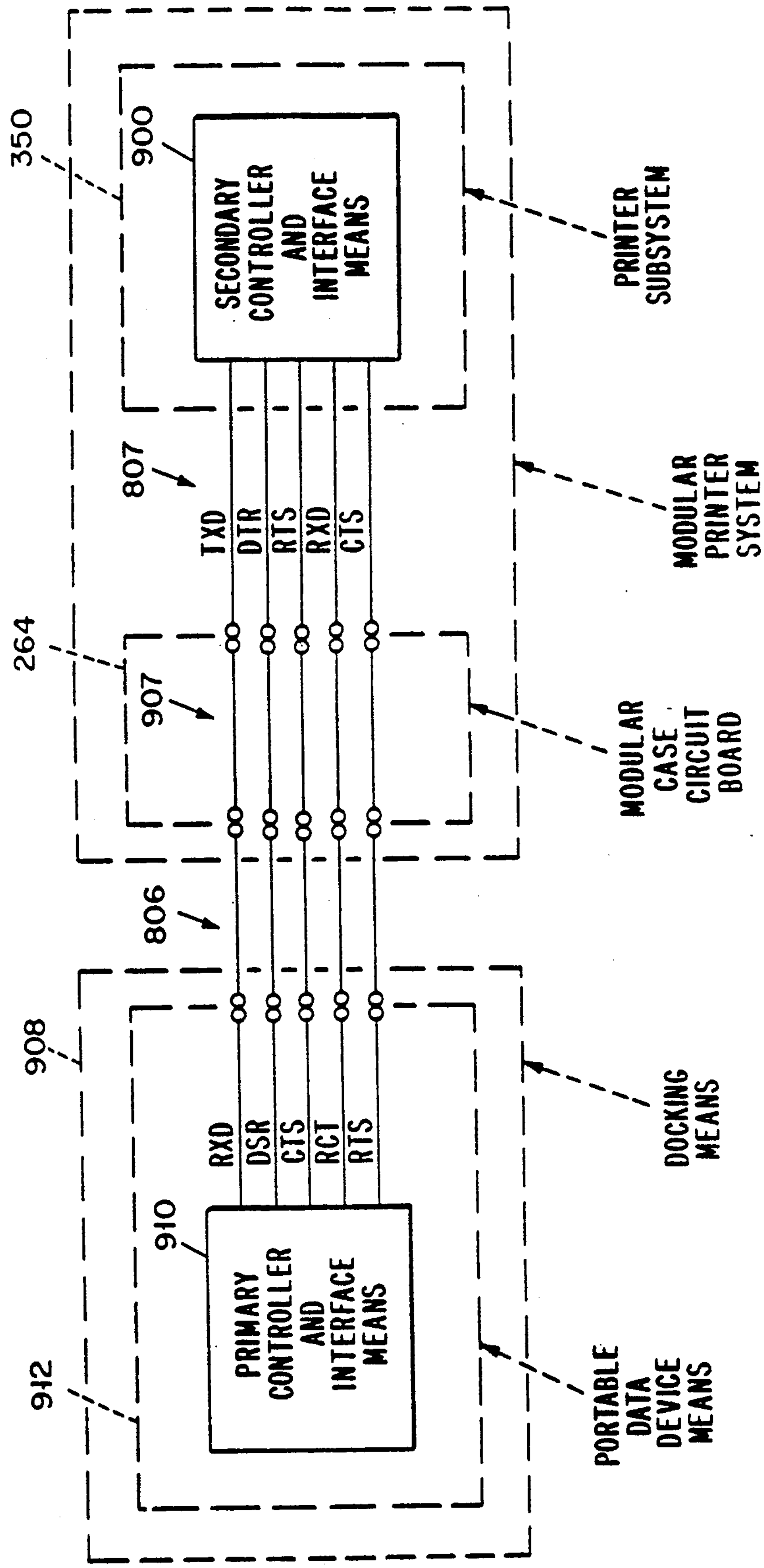
FIG. 20 is a diagrammatic illustration of the data communication system provided by the terminals of the incorporated U.S. patent application Ser. No. 07/347,602, and the printer systems of FIGS. 6 through 18.

FIG. 20 is a diagrammatic illustration of data flow between the printer and the terminal for FIGS. 6–16 and 17–19.

In FIG. 20, a secondary controller and interface means 900 (e.g. a type 78C10 printer controller with interface circuitry) is indicated at the right. The interface circuitry accommodates three switch selectable protocols as described in section 8.0 of APPENDIX B. The controller 900 is programmed for operation as a secondary as described in APPENDIX C, e.g. at Section 4.4.9 Secondary State Machine, and Section 6.0 PRINTER PRESENTATION LAYER. In particular it is to be noted that with the protocol according to the present invention, the secondary controller 900 when the printer finishes printing the print line or lines in a print command, returns a response with the same sequence number so that the terminal is advised as to which print lines are actually printed.

As represented in FIG. 20, the signals TXD, DTR, RTS, RXD and CTS may be coupled e.g. via flexible cable 807, FIG. 17, to the printed circuit board 264. The signal paths on the printed circuit board are indicated at 907, FIG. 20. The ribbon cable 806, FIG. 17, is indicated in FIG. 20, and leads to the 15 pin D-sub connector 164, FIG. 7, 9 and 10, or to the spring fingers such as 801, FIG. 18, a docking means such as 114, FIGS. 6, 9 and 15, or 800, FIGS. 17–19, being indicated at 908, FIG. 20.

A primary controller is indicated at 910, FIG. 20, and may be implemented as described in APPENDIX C. Thus the primary controller 910 may be part of a portable data device means 912. The electrical interface is described in Section 2.2.2.2 of APPENDIX B.

A braided power ground strap 912, FIG. 17, may connect with the power ground terminal of connector 154, FIG. 7, 9 and 10, or to the power ground spring contact of contacts 801, FIG. 18.

DISCUSSION OF THE MODULAR PRINTER SYSTEM

In prior art van mounted printers, communication with a data source such as a hand-held data capture terminal was limited such that it was possible for the printer to fail to print a line or more of data without alerting the terminal. Such printers could acknowledge receipt of a line of data from the hand-held data capture terminal, but there was no provision for a feedback signal to the hand-held data capture terminal to signify that a particular data line had actually been printed. Thus, where the printer accumulated several lines of data in a buffer memory, and the operator then inadvertently turned off the printer, such lines of data could be lost and not actually printed. Similarly, if the vehicle engine was started causing a power spike, actual printing of data in the buffer might fail to occur without any feedback notification to the terminal.

APPENDIX B gives the product specification for a commercial version of the modular printer system. Section 6.5 of APPENDIX B describes the connector providing signals between the host and the printer controller. The electrical interface is further described in APPENDIX B in section 2.2.2.2.

A special communications protocol termed "NPCP" (Part B) is described in section 8.1 of APPENDIX B, and in APPENDIX C, and a complete specification for this "NPCP" protocol is given in APPENDIX D.

It will be apparent that many modifications and variations may be made without departing from the scope of the teachings and concepts of the present invention.

Attorney Docket No. 6477XX

EXPRESS MAIL LABEL
No. LB 168 165 349

APPENDIX B

Excerpts from a Product Specification
for a Commercial Modular Printer System
According to the Present Invention
(Sections 1.0 through 16.0, Page Two Through
Twenty-Five, Twenty-Four Pages)

1.0 SCOPE

This document describes the product specifications for the 815 modular 80 column printer. The modular design allows standard modules to be configured in various ways to meet many different application requirements. The printer may be used in portable applications and in fixed mount applications within a van.

1.1 PRODUCT FEATURES

- o Automatic power conservation mode.
- o -20 degrees to +60 degrees C operation.
- o Beeper.
- o Capable of operation from a 10 to 16 VDC power source, with or without internal battery.
- o Operation and recharging from a 14.2 VDC power source (when a battery is installed).
- o Normal and inverted (upside down) print orientations.
- o Will print on 1 to 3 ply carbonless paper.
- o Will handle 9.5" wide pin fed, fan fold paper.
- o 150 CPS bidirectional, logic seeking printer operation.
- o Graphics capabilities (bit image and character).
- o User-defined characters, draft quality only.
- o Near letter quality print.

2.0 EQUIPMENT SPECIFICATION 2.1 MECHANICAL 2.1.1 MODULES 2.1.1.1 PRINTER FRAME

The frame is the main structural component. All other modules mount to the frame.

2.1.1.2 HANDLE

Used for portable applications. This mounts directly to the frame.

2.1.1.3 PRINTER FOOT

This is used in portable applications, and is installed on the frame opposite the handle. One of two styles may be used, one a simple foot, and the other with provisions to store a coiled power supply cord for AC applications.

2.1.1.4 TERMINAL MODULE

The terminal module accomodates the NT121XL, NT141XL, and NT141GL.

2.1.1.5 PRINTER MODULE

This module contains the printer mechanism and control board. the customer loads paper by removing the cover from the printer module, and pivoting the internal printer module assembly.

2.1.1.6 50 SHEET PAPER TRAY MODULE

Used in the portable, this holds 50 sheets of 3 ply fan fold paper. The AC option is also installed in this module if needed.

2.1.1.7 TERMINAL SIDE BRACKET

Used in the fixed mount application where the terminal is mounted on the side of the frame.

2.1.1.8 REMOTE MOUNT

A filler strip replaces the terminal side bracket and provides a D-sub connection on the side of the printer frame. This provides a method of mounting the terminal in a truck remote from the printer frame.

2.1.1.10 BATTERY

Standard VCR battery, PANASONIC Type LCR-1812VBNC. The unit is designed to provide 3000 print lines of 80 characters from a fully charged new battery with an average of 14 dots per character.

2.1.2 CONFIGURATIONS 2.1.2.1 PORTABLE

Weight: 17.0 lbs, with 50 sheets of 3 ply paper, battery and without terminal
Size: 14.0w x 14.5l x 5.0h 2.1.2.2 PORTABLE WITH AC OPTION INSTALLED Weight: 18 LBS, With 50 sheets of 3 ply paper, battery and without terminal
Size: 14W X 15.5L X 5.0H 2.1.2.3 FIXED MOUNT Weight: 18 LBS , Without paper
Size: 19.0W X 14.5L X 7.5 H 2.1.2.4 FIXED MOUNT WITH REMOTE TERMINAL Weight, printer: 17 lbs, without paper
Size, printer: 14 x 14 x 7.5
Weight, remote mount: 1.5 LBS
Size, remote mount: 12 x 7 x 7.5

2.1.3 MOLDED CASE MATERIALS 2.1.3.1 UL RATING

All molded plastic components of the printer are 94VO rated.

2.1.3.2 STRUCTURAL FRAME COMPONENTS

The main structural components of the printer are molded of structural foam.

Material: GE NORYL FN215
Color: Norand 560-500-003 base material
Norand 560-500-003 painted texture
Texture: One coat texture
Components:
Frame and handle fillers
Handle
Printer foot
AC Printer foot
Terminal side bracket
Frame fillers (with/without D-sub)

2.1.3.3 OTHER MOLDED PLASTIC COMPONENTS

Material: BORG WARNER ABS KJU
Color: Norand 560-500-001
Texture: RAWAL standard
Components:
Terminal module and slide retainer
Mechanism case, cover, exit cover
Retainer, and cover latches
50 sheet paper tray
200 sheet paper tray 2.2 ELECTRICAL 2.2.1 INTERNAL BATTERY A 1.8 AH battery may be installed internally. Connection is made with a coaxial plug. The battery is installed in the paper tray by opening the printer mechanism module and rotating the printer.

2.2.2 HANDHELD COMPUTER INTERFACE 2.2.2.1 HANDHELD COMPUTER CHARGING

The handheld computer will charge only when the printer is attached to an external power source such as the truck or the AC charger. The printer will not charge the handheld computer from the internal printer battery.The charge output is .5 volts less than the voltage input to the printer.

2.2.2.2 ELECTRICAL INTERFACE

The electrical interface is designed for use with Norand handheld computers, as well as standard RS-232 host computers with a serial port, such as an IBM PC. The input circuitry will accept either TTL or RS-232 levels.

| State | Signal condition | Interchange voltage |
|---|---|---|
| On | Spacing,start bit | +2.5 to 5.0 volts |
| Off | Marking, stop bit | 0 to 0.7 volts |

The terminal interface connector is a DA-15P, 15 pin D-subminiature connector, with the following pinout. All other lines should not be connected.

| Pin number | Signal |
|---|---|
| 4 | RCT |
| 3 | RTS |
| 5 | RXD |
| 6 | CTS |
| 8 | Terminal charge |
| 9 | Signal ground |

2.2.2.3 HANDHELD COMPUTER COMPATIBILITY

The printer will work with the NT121XL,NT141XL, and NT141GL.

2.2.3 PRINTER BATTERY CHARGING

The internal printer battery will be charged whenever an external supply is attached to the printer. The input to the printer must be within 10-16 volts.

A full charge will occur in one hour when the AC option is used, or when the truck is running with the truck cable attached to the printer. From low battery, a 10 minute charge will allow printing of at least 5 pages. For protection of the battery, the charge current is limited to less than 6 Amps under all conditions.

3.0 ENVIRONMENTAL 3.1 AGENCY APPROVALS 3.1.1 UL APPROVAL

The portable printer with AC option installed will pass UL electrical safety requirements.

3.1.2 FCC RADIATED AND CONDUCTED EMMISSIONS

All configurations are certified to meet FCC regulation part 15J,clasS A.

3.2 SHOCK/IMPACT 3.2.1 FUNCTIONAL DROP

The portable printer will withstand a drop from 30 inches without sustaining functional damage, although the cover may come loose and require reseating.

If dropped from 12" or less, the removable cover will remain in place.

3.2.2 INDUCED SHOCK

The printer will withstand a 50g, 11msec impact on each axis.

3.2.3 PACKAGED DROP

All configurations, when packaged for shipment, will survive 10 drops on each corner and axis, and will sustain no damage.

3.3 VIBRATION

All configurations will survive single axis and quasi-random vibration equivalent to 100,000 miles, mounted in a truck. testing will be done per norand document 435-000-059, figure 8.5.1, 8.5.2, and 8.5.3.

3.4 TEMPERATURE 3.4.1 OPERATING: -4 to 140 degrees f (-20 to +60 degrees c)

3.4.2 STORAGE: -22 to +158 degrees f (-30 to + 70 degrees c)

3.5 HUMIDITY

The printer will remain operational in humidity conditions from 5 to 90 percent non-condensing over the entire operational and storage temperature range.

3.6 ELECTROSTATIC DISCHARGE

All configurations will survive to 20 KV as tested per the Norand ESD test standard document. There will be no hardware failures and no soft failures such as interupted tickets or missed lines of print. The terminal inserted in the printer will not be affected.

3.7 RAIN RESISTANCE

The rain falling rain test is performed using the norand test method, as described in Norand specification 435-000-059, based on MIL-SPEC 810D. The rate of falling rain is 11.2 inches per hour. The printer will withstand temporary exposure during normal route use as indicated.

3.7.1 STANDARD PRODUCT

In the carry position (handle up): 15 minute exposure
In the use position (paper exit up): 5 minute exposure
other positions: not recommended.

3.7.2 WITH THE OPTIONAL SOFTSIDED CASE

In the carry position(handle up): 30 minute exposure
horizontal position: (paper exit up), 30 minute exposure
other positions: not recommended.

3.8 DUST/SAND CONTAMINATION RESISTANCE

The printer in all configurations passes a 30 hour dust and sand contamination test as specified in Norand environmental test document 435-000-059.

3.9 THERMAL CONDENSATION

The printer in all configurations passes a 17 hour test for thermal condensation, per Norand document 435-000-059.

4.0 ACCESSORIES 4.1 STANDARD TRUCK CABLES

An optional truck cable is available so that current NP108 and NP111 customers could attach a small adapter cable to their current truck cable and install the new printer.
It is 4 feet in length.

4.2 SOFTSIDE CASE

An optional softsided case is available for all portable printers. This multifunction case will provide further impact resistance as well as additional rain protection. Also included in the case is an external pocket for printed receipts and extra new paper.

4.3 SECURING STRAP

A heavy nylon strap is available which may be used to secure the portable printer in the truck. One end of the strap is bolted to the truck. A quick release clip on the opposite end may be attached around the handle of the portable printer.

5.0 TOP COVER/PAPER LOADING

The paper is loaded by removing the top cover, pivoting the printer mechanism up and sliding the paper under the printer. Removing the top cover exposes the tractor feed mechanism so the paper can easily be loaded. A rear guide is provided to insure proper paper feeding into the mechanism.

The paper will feed automatically by lifting the paper tear bar and pressing the advance page switch. The printer head will automatically position to the center to guide the paper.

A proximity sensor will prevent printing operations except for paper loading with the back cover removed. If a print operation is attempted with the cover removed the beeper will sound. Normal operation will resume when the cover is replaced.

5.1 CONTROLLER MOUNTING

The printer controller board will mount underneath the printer mechanism. The size of the printer controller is 9.5"L x 5.50"W with no components taller than .75".

6.0 PRINTER MECHANISM SPECIFICATIONS 6.1 PRINT SPEED

The printer mechanism prints normal pica characters at a minimum speed of 150 characters per second (CPS), in draft mode, when using a 9x9 half-dot print font, with 3 half-dots of inter-character spacing. The printer will print an 11 inch, 66 line page of 80 characters per line in draft mode in 54 seconds.

6.2 OPERATING VOLTAGE RANGE

The printer mechanism shall operate properly whenever the input voltage to the mechanism is in the range of 10 to 16 VDC.

6.3 PAPER OUT SENSOR

A paper out sensor is provided which will survive normal shock and vibration.

6.4 PAPER TEAR BAR

A paper bail and tear bar is provided.

6.5 CONNECTORS

The connector providing signals between the host terminal/power system and the printer controller is a 14 pin AMP model 1-102203-1. The connector between the printer controller and the system control panel is a 13 pin AMP 1-102203-0. The control panel connector provides signals for 2 contact switches, 1 sensing switch, 5 LEDs, a beeper, 12 VDC (unregulated), ground, +5 VDC and one spare.

The pin assignments for the control panel connector are:

| | | |
|---|---|---|
| 1. Paper Out LED | 6. +5 VDC | 11. Spare |
| 2. Low Battery LED | 7. Gnd. | |
| 3. Head Jam LED | 8. +12 VDC | 12. Cover Off sensor |
| 4. Ready LED | 9. Advance Page Sw. | 13. Beeper |
| 5. Power On LED | 10. Set Page Top SW. | |

The pin assignments on the control board for the power/host connector are:

| | | |
|---|---|---|
| 1. TXD | 6. Spare | 11. 10-16 VDC |
| 2. DTR | 7. Signal gnd. | 12. +VHD/MTR |
| 3. RTS | 8. Power gnd. | 13. +VHD/MTR |
| 4. RXD | 9. Power gnd. | 14. +VDC ON |
| 5. CTS | 10. 10-16 VDC | |

6.6 PAPER FEED KNOB

A manual paper feed thumbwheel is provided. Access to it is provided by removing the top cover.

6.8 MOUNTING

The printer module is capable of being mounted either horizontally or at 30 degrees (pins firing down).

6.9 PAPER REQUIREMENTS

The printer mechanism is capable of handling and producing acceptable print quality on 1-3 ply carbonless NCR type sprocket fed paper that has a width of 9.5" (paper width including tear-off sprocket margins) and has a maximum thickness of 0.010".

A push tractor type mechanism is used to feed the paper.

6.10 RIBBON SPECIFICATION

Unicolor, (black or purple) cartridge style, capable of printing over the entire operating temperature range. The ribbon will last for a minimum of 1 million characters.

6.11 TACHOMETER

The printer mechanism has a tachometer so that the control board can determine if a head jam has occured.

6.12 DUTY CYCLE

The 150 cps printer mechanism shall be capable of continuous 9-pin printing over the full operating temperature range using the standard 14 dots per character.

7.0 CONTROL BOARD REQUIREMENTS 7.1 PRINTER MECHANISM CONTROL BOARD DIMENSIONS

Maximum length (side-to-side): 9.5"

Maximum width (front to rear): 5.50"
Maximum height of components: .75"

7.2 INPUT VOLTAGE

The printer will operate properly any time the input voltage to the printer is between 10 and 16 VDC, with or without an internal battery.

7.3 INPUT CURRENT

The control board and printer draw no more than 2.5 amperes of average current at +12 volts and +20 degrees C.

The printer draws no more than 6.0 amperes of ripple current, peak-to-peak, superimposed on top of the average current at +12 VDC and +20 degrees C.

With the control board powered down (sleep mode), the printer draws no more than 100 microamps of current.

The maximum powerup inrush current of the printer is less than 20 amperes and lasts no longer than 100 milliseconds.

7.4 POWER CONSERVATION MODE 7.4.1 AUTOMATIC POWER DOWN

The printer control board firmware will deactivate all printer electronics automatically after an inactivity timeout period to conserve battery power. All current information pertaining to input buffers, print buffers, print modes, user-defined characters, page information, top-of-form location, etc., is retained while the printer is asleep and is again made available on any subsequent control board warm power-up. If the print head is not at the home position before power-down, the printer controller firmware will move the print head to the home position. The default inactivity timeout period is 10 seconds, but is adjustable using the control code sequence <ESC>'z'. The 10-16VDC voltage may be present for up to 400 microseconds after the Ready LED is turned off. The control board will only power down when NPCP is selected.

7.4.2 AUTOMATIC POWER-UP

The printer will power-up automatically whenever the host computer begins to transmit data or when a control panel switch has been pressed. If the print head is not at the home position, the printer controller firmware will move the print head to the home position to safeguard against the possibility of operator print head repositioning while the control board was asleep. All information pertaining to input buffers, print buffers, print modes, user-defined characters, page information, top-of-form location, etc., are restored back to their power-down settings on a warm power-up, or to predefined defaults (current Epson standard) on a cold power-up. Power-up shall be accomplished in not more than 1000 ms.

8.0 HANDHELD COMPUTER INTERFACE

Three switch selectable protocols are available.

1. Ready/Busy Flag - current Epson Serial Interface standard.
2. X-ON/X-OFF - Standard Epson Serial Interface.

3. Norand Portable Communication Protocol 8.1 NPCP CHARACTERISITICS

Half-Duplex, Asynchronous ,4800, 9600, and 19200 baud
Transparent message blocks, 8 data bits, No parity, CRC-16
1 start bit, 1 stop bit, Similar to HDLC
For a complete specification on NPCP,see Norand specification 541-011-201.

9.0 ABNORMAL SITUATIONS 9.1 UNDER/OVER VOLTAGE

When the printer has detected that the input voltage is not between its upper or lower limits of normal operation, the printer will stop printing, go off-line, beep and remain off-line until the input voltage returns to within limits. If the control board times out before the input voltage returns to within limits, the control board will power down and save all print data. When the input voltage returns to within normal limits and the printer is requested to begin printing again, the control board shall reprint all data on that line. In no case will recovery from an overvoltage or undervoltage condition result in input data not being printed nor will pressing the reset switch be required to recover.

The upper limit of normal input voltage is no less than 16 VDC, and the lower limit of normal input voltage is no more than 10 VDC. The printer will withstand the input voltage transient specified in SAE J1113 without sustaining damage or loss of data. If power is restored within 15 minutes after an accidental interruption there will be no loss of data and the printing operation will resume at the point where it was interrupted.

9.2 LOW BATTERY PRINTING

When the control board firmware has detected that the battery voltage has decreased to a point near its lower limit of normal operation, the control board will provide a visual indication to warn of impending cessation of print activity. One line of printout will be allowed before print activity stops. When the battery voltage has returned to within normal limits, printing will resume. The printer will complete any line of print in progress and only suspend operations due to low battery between print lines.

Detection of the low battery condition will occur at +10.0, +.5, -0.0 VDC.

9.3 HEAD JAM

When the control board firmware has detected a head jam situation from either the print head motor tachometer or from an absence of the print head home signal, the control board will beep three times, clear the input buffer and go into sleep mode. After power up because of switch closure or CTS high, the printer will home the print head and attempt to print the first line. If a head jam occurs again the printer will beep three times and re-enter sleep mode. If the head jam has been cleared the printer will then go Ready.

9.4 PAPER OUT DETECTION

When paper out is detected by the paper out sensor, the control board calculates where the actual physical end of the printable area is and continues to print until the start of that line. The control board will then go not ready, beep, and wait for the operator to load new paper using the Advance Page switch. When the operator presses the Set Page Top switch the head will home in case the print head has been moved. Printing will then resume. Paper Out detection will not prevent a paper advance operation when the cover is off.

10.0 AUTOMATIC PAPER LOADING

Paper is loaded into the printer with the cover off using the advance page switch on the control panel. Paper is first fed into the printer until the paper just enters the guide slot just beyond the push-tractors. The tractor clamps (for fan-fold paper) are adjusted and closed, the paper bail is lifted away from the platen and the advance page switch is pressed. The controller will center the head on the platen and advance the paper to the top of the first page after which a beep will signify completion of this operation to the operator. The operator manually adjusts the paper to the exact top of the page, moves the paper bail against the platen and presses the set page top switch to establish the current paper position as the top-of-form. The controller homes the print head completing the paper loading.

11.0 OPTION SWITCHES

Option switches are provided at the rear of the pivot frame for protocol selection and serial interface parameters (baud rate, parity, and number of stop bits) only. All other selectable features (automatic skip-over-perforation, default print mode on powerup, etc.) are selected by escape codes.

POSITION:
1. OFF=Normal, ON=Loopback test
2. Zero font style. OFF= 0 Without slash
   ON = 0 With slash
3. Auto feed. OFF=CR, ON=CR+LF

| 4 | 5 | 6 | SELECT INTERFACE CONDITION | |
|---|---|---|---|---|
| – | OFF | OFF | BY NPCP | |
| OFF | ON | ON | BY DTR | NON PARITY |
| OFF | ON | OFF | BY DTR | ODD PARITY |
| OFF | OFF | ON | BY DTR | EVEN PARITY |
| ON | ON | ON | BY XON/XOFF | NON PARITY |
| ON | ON | OFF | BY XON/XOFF | ODD PARITY |
| ON | OFF | ON | BY XON/XOFF | EVEN PARITY |

| 7 | 8 | SELECT BAUD RATE |
|---|---|---|
| OFF | OFF | 19200 BAUD |
| ON | OFF | 9600 |
| OFF | ON | 4800 |
| ON | ON | 1200 |

12.0 BEEPER

The control panel incorporates a beeper with a frequency of 2048 hz and a duration of 200 ms for each beep. The operation of the beeper is controlled by the control board.

13.0 CONTROL CODE SEQUENCES

The control board firmware recognizes and parses all of the below listed control code sequences and any parameters that they require. However, implemetation of some of these control code sequences is not possible due to printer mechanism limitations.

| Code Sequence | Brief Description |
|---|---|
| <BEL> | Beeper. |
| <BS> | Backspace. |
| <HT> | Horizontal tab. |
| <LF> | Line feed. |
| <VT> | Vertical tab. |
| <FF> | Form feed. |
| <CR> | Carriage return. |
| <SO> | Select double-width print (1 line). |
| <SI> | Select compressed print. |
| <DC2> | Cancel compressed print. |
| <DC4> | Cancel double-width print (1 line). |
| <CAN> | Cancel line. |
| <DEL> | Delete character. |
| <ESC><SO> | Select double-width print (1 line). |
| <ESC><SI> | Select compressed print. |
| <ESC><US> | Select or cancel bottom up print orientation. |
| <ESC><SP> | Select intercharacter space. |
| <ESC>'!' | Master select. |
| <ESC>'#' | Cancel MSB control. |
| <ESC>'$' | Select absolute dot position. |
| <ESC>'%' | Select user-defined character set. |
| <ESC>'&' | Define user-defined characters. |
| <ESC>'*' | Select graphics mode. |
| <ESC>'+' | Print character graphics. |
| <ESC>'-' | Select or cancel underline print. |
| <ESC>'/' | Select vertical tab channel. |
| <ESC>'0' | Select 1/8-inch line spacing. |
| <ESC>'1' | Select 7/72-inch line spacing. |
| <ESC>'2' | Select 1/6-inch line spacing. |
| <ESC>'3' | Select n/216-inch line spacing. |
| <ESC>'4' | Select italic print. |
| <ESC>'5' | Cancel italic print. |
| <ESC>'6' | Printable code area expansion |
| <ESC>'7' | Cancel <ESC>'6'. |
| <ESC>'8' | Disable paper-out sensor. |
| <ESC>'9' | Enable paper-out sensor. |
| <ESC>':' | Copy ROM into RAM. |
| <ESC>'<' | Select unidirectional mode (1 line). |
| <ESC>'=' | Select MSB = 0. |
| <ESC>'>' | Select MSB = 1. |
| <ESC>'?' | Reassign graphics mode. |
| <ESC>'@' | Initialize printer. |
| <ESC>'A' | Select n/72-inch line spacing. |
| <ESC>'B' | Set vertical tabs. |
| <ESC>'C' | Select page length in either lines or inches. |
| <ESC>'D' | Set horizontal tabs. |
| <ESC>'E' | Select emphasized print. |
| <ESC>'F' | Cancel emphasized print. |
| <ESC>'G' | Select double-strike print (draft mode only). |
| <ESC>'H' | Cancel double-strike print. |
| <ESC>'I' | Printable code area expansion. |
| <ESC>'J' | Perform n/216-inch line feed. |
| <ESC>'K' | Select single-density graphics. |
| <ESC>'L' | Select double-density graphics. |
| <ESC>'M' | Select elite print. |

| | |
|---|---|
| <ESC>'N' | Select skip-over-perforation. |
| <ESC>'O' | Cancel skip-over-perforation. |
| <ESC>'P' | Select pica print. |
| <ESC>'Q' | Set right margin. |
| <ESC>'R' | International character set. |
| <ESC>'S' | Select either superscript or subscript print. |
| <ESC>'T' | Cancel superscript and subscript print. |
| <ESC>'U' | Select or cancel uni-directional print. |
| <ESC>'W' | Select or cancel double-width print. |
| <ESC>'Y' | Select high-speed double-density graphics. |
| <ESC>'Z' | Select quadruple-density graphics. |
| <ESC>'\' | Select relative dot position. |
| <ESC>'^' | Select 9-pin graphics. |
| <ESC>'a' | NLQ justification. |
| <ESC>'b' | Set vertical tabs in channels. |
| <ESC>'j' | Perform n/216-inch reverse line feed. |
| <ESC>'l' | Set left margin. |
| <ESC>'s' | Select or cancel half-speed print. |
| <ESC>'t' | Select or cancel character graphics. |
| <ESC>'x' | Select NLQ or draft print. |
| <ESC>'z' | Set inactivity time for sleep mode. |

13.1 NEW CONTROL CODE SEQUENCES

13.1.1 <ESC><US> --- Select or cancel bottom up print orientation.

Two modes of print orientation are implemented. The most familiar is the top down orientation, which is the default.

In the bottom up print mode, the first line printed is the last line of the last page of a given document. It is the host computer's responsibility to send this line to the printer first and to maintain proper vertical spacing. The data received from the host computer will be in the left-to-right format and any further data manipulation for this print orientation is the printer control board's responsibility.

The data received may consist of a mixture of different print modes, (enlarged, emphasized, etc.), print densities (compressed, graphics, etc.), character sets, etc. The final output of bottom up print orientation does not differ when compared side by side with the output of top down print, when given comparable input data.

Print orientation can only be changed at the start of a new print line and remains in effect for subsequent lines until changed by the host using the following format:

| | | | |
|---|---|---|---|
| ASCII Code: | ESC | US | m |
| Hexadecimal: | 1B | 1F | m |
| Decimal: | 27 | 31 | m |

When m = CHR$(0) or CHR$(48) selects top down orientation
When m = CHR$(1) or CHR$(49) selects bottom up orientation For example: This data string would print on the left side of the platen the dot patterns below:

```
CHR$(27);CHR$(31);CHR$(0);
CHR$(121);CHR$(27);CHR$(75);CHR$(6);CHR$(0);
CHR$(231);CHR$(60);CHR$(24);CHR$(0);CHR$(24);CHR$(0);CHR$(65)
CHR$(13);CHR$(10);
```

```
                    ------------ FULL DOT # -----------
                    1 2 3 4 5 6 1 2 3 4 5 6 1 2 3 4 5 6
        TOP-------1             *              * *
                  2             *             *   *
                  3 *       *   * *          *     *
PRINT             4  *     *      * *   *   *       *
HEAD              5   *   *       * *   *   * * * * *
WIRES             6    * *      * *         *       *
                  7     *       *           *       *
                  8    *        *
         BOTTOM---9   *
```

This data string would print on the right side of the platen the dot patterns below::

```
CHR$(27);CHR$(31);CHR$(1);
CHR$(121);CHR$(27);CHR$(75);CHR$(6);CHR$(0);
CHR$(231);CHR$(60);CHR$(24):CHR$(0);CHR$(24);CHR$(0);CHR$(65)
CHR$(13);CHR$(10);
```

```
                    ------------ FULL DOT # -----------
                    6 5 4 3 2 1 6 5 4 3 2 1 6 5 4 3 2 1
        TOP-------1                                 *
                  2                       *        *
PRINT             3   *       *           *       *
HEAD              4   *       *         * *      * *
WIRES             5   * * * * *   *   * *      *    *
                  6   *       *   *   * *     *      *
                  7    *     *          * *   *        *
                  8     *   *             *
         BOTTOM---9      * *              *
```

Similar logic also applies to the printing of the user defined characters and 9 pin graphics patterns. The logic of the horizontal tabs, line-wrap, dot positioning, etc., are also affected by the bottom up print orientation mode.

13.1.2 <ESC>'+' --- Print character graphics.

```
ASCII Code:   ESC   +   n   d
Hexadecimal:  1B   2B   n   d
Decimal:      2743  n   d
```

This control code sequence enables the printing of character graphics where:

n = length of the character graphics data stream, CHR$(1) <= n <= CHR$(255).
d = character graphics data stream, c(1) ... c(n).
c = character graphics data, CHR$(0) <= c <= CHR$(255).

Character graphics for this control code sequence is defined as:

CHR$(0) to CHR$(31) -- IBM character graphics symbol set. *
CHR$(32) to CHR$(126) -- International character set. **
CHR$(127) -- <SP>. *
CHR$(128) to CHR$(255) -- Epson character graphics.

* All control codes print as character graphics.

** Represents the current international character set selected from either the control code sequence <ESC>'R' or by the cold power-up default.

13.1.3 <ESC>'c' --- Select or cancel control panel input.

This command is ignored.

13.1.4 <ESC>'z' --- Set inactivity time for sleep mode.

| | | | |
|---|---|---|---|
| ASCII Code: | ESC | z | n |
| Hexadecimal: | 1B | 7A | n |
| Decimal: | 27 | 122 | n |

After an inactivity time period of n seconds the printer control board firmware will power-down all printer electronics to conserve battery power, where CHR$(1) <= n <= CHR$(255). All current information pertaining to input buffers, print buffers, print modes, user-defined characters, page information, top-of-form location, etc., etc., is retained while the control board is powered-down and is again made available on any subsequent control board warm power-up. The cold power-up defaults are n = CHR$(10).

13.2 MODIFIED CONTROL CODE SEQUENCES 13.2.1 <ESC>'$' --- Select absolute dot position.

Allowed in draft and NLQ.

13.2.2 <ESC>'R' --- International Character Set

The Epson standard character sets are implemented as listed below. Note the additional character set requirements for Greek and Hebrew. The USA character set is the cold power-up default.

| Character Set # | and Description |
|---|---|
| 0 | United States |
| 1 | France |
| 2 | Germany |
| 3 | United Kingdom |
| 4 | Denmark I |
| 5 | Sweden |
| 6 | Italy |
| 7 | Spain I |
| 8 | Japan |
| 9 | Norway |
| 10 | Denmark II |
| 11 | Spain II |
| 12 | Latin America |
| 13 | Hebrew * |
| 14 | Greek * |

* See paragraph 14.1 and 14.2 for Greek and Hebrew character set font tables.

13.2.3 <ESC>'\' --- Select relative dot position.

Allowed in draft and NLQ print also.

13.2.4 <ESC>'^' --- Select 9-pin graphics.

The 9-pin graphics control code sequence must be modified to support the <ESC>'*' 8-pin graphics modes CHR$(2) and CHR$(3).

13.2.5 <ESC>'a' --- justification.

Allowed in draft and NLQ print also.

13.2.6 <ESC>'t' --- Select or cancel character graphics.

Character graphics for this control code sequence is defined as:

CHR$(0) to CHR$(31) -- FX-86e IBM character graphics symbol set. *
CHR$(32) to CHR$(126) -- International character set. **
CHR$(127) -- <DEL>.
CHR$(128) to CHR$(255) -- FX-86e Epson character graphics.

* Only when both of the control code sequences <ESC>'t'<1> and <ESC>'I1' are in effect, will the unused, single character control code sequences from CHR$(0) to CHR$(31) print as their respective character graphics. The remaining, unprintable, character graphics are available only through the control code sequence <ESC>'+'.

** Represents the current international character set selected from either the control code sequence <ESC>'R' or by the cold power-up default.

9.14 PRINT FONTS

Epson standard print fonts are supported, except where noted below. These fonts utilize a 9 pin print head, but print only the top-most 7 wires for non-descender characters (capital letters), and print only the bottom-most 7 wires for descender characters (lower-case letters and certain punctuation characters). The print width is 9 half dots, with half dots 10, 11, and 12 being the intercharacter gap.

14.1 HEBREW CHARACTER FONT

FULL DOT #

```
       1 2 3 4 5 6     1 2 3 4 5 6     1 2 3 4 5 6     1 2 3 4 5 6
       :.:.:.:.:,;,    :.:.:.:.:,;,    :.:.:.:.:,;,    :.:.:.:.:,;,
P T 1-            -    -          -    -          -    -           -
R   2-*       *   -    -* * * *   -    -     * *  -    -* * * * *  -
I   3-  *     *   -    -      *   -    -       *  -    -      *    -
N   4-  * * *     -    -      *   -    -     * *  -    -      *    -
T   5-*     *     -    -      *   -    -   *   *  -    -      *    -
W   6-*       *   -    -* * * * * -    -  *    *  -    -      *    -
I   7-            -    -          -    -          -    -           -
R   8-            -    -          -    -          -    -           -
E B 9-            -    -          -    -          -    -           -
       :.:.:.:.:,;,    :.:.:.:.:,;,    :.:.:.:.:,;,    :.:.:.:.:,;,
            38              65              66              67

       :.:.:.:.:,;,    :.:.:.:.:,;,    :.:.:.:.:,;,    :.:.:.:.:,;,
      1-            -    -          -    -          -    -           -
      2-* * * * *   -    -   * *    -    -* * * *   -    -* * * * *  -
      3-        *   -    -     *    -    -  *       -    - *     *   -
      4-*       *   -    -     *    -    -  *       -    -*      *   -
      5-*       *   -    -     *    -    -  *       -    -*      *   -
      6-*       *   -    -     *    -    -  *       -    -*      *   -
      7-            -    -          -    -          -    -           -
      8-            -    -          -    -          -    -           -
      9-            -    -          -    -          -    -           -
       :.:.:.:.:,;,    :.:.:.:.:,;,    :.:.:.:.:,;,    :.:.:.:.:,;,
            68              69              70              71
```

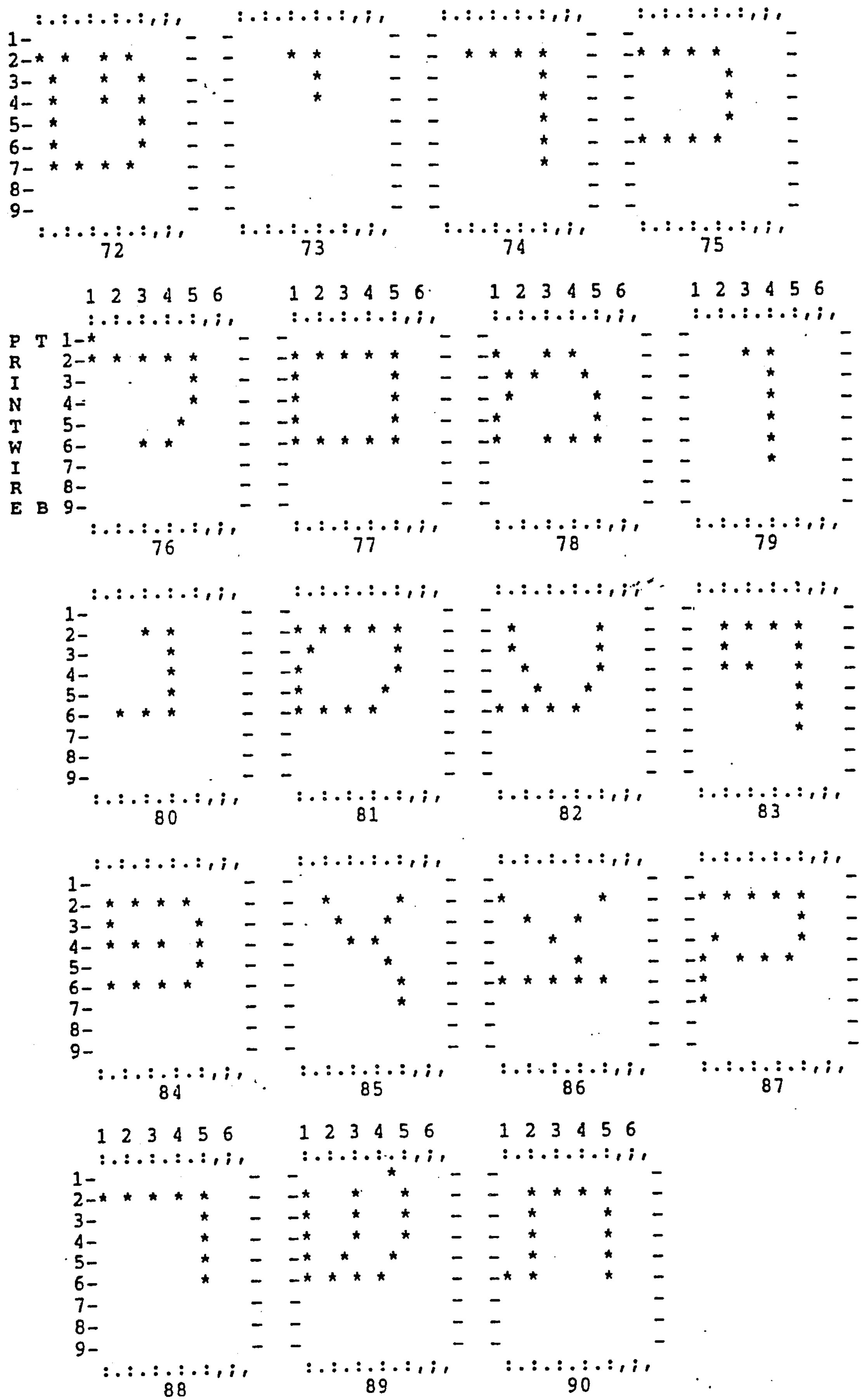
72
73
74
75
1 2 3 4 5 6
P R I N T W I R E
T
B
1-
2-
3-
4-
5-
6-
7-
8-
9-
76
77
78
79
80
81
82
83
84
85
86
87
88
89
90

14.2 GREEK CHARACTER FONT

FULL DOT #

```
      1 2 3 4 5 6    1 2 3 4 5 6    1 2 3 4 5 6    1 2 3 4 5 6
      :.:.:.:.:,;,   :.:.:.:.:,;,   :.:.:.:.:,;,   :.:.:.:.:,;,
P T 1-   * *    -   -* * * *   -   -* * * * * -   -    *     -
R   2-  *   *   -   - *      * -   -*         -   -   * *    -
I   3- *     *  -   - *      * -   -*         -   -  *   *   -
N   4-*       * -   - * * * *  -   -*         -   - *     *  -
T   5-* * * * * -   - *      * -   -*         -   - *     *  -
W   6-*       * -   - *      * -   -*         -   -*       * -
I   7-*       * -   -* * * *   -   -*         -   -* * * * * -
R   8-          -   -          -   -          -   -          -
E B 9-          -   -          -   -          -   -          -
      :.:.:.:.:,;,   :.:.:.:.:,;,   :.:.:.:.:,;,   :.:.:.:.:,;,
          97             98             99             100

      :.:.:.:.:,;,   :.:.:.:.:,;,   :.:.:.:.:,;,   :.:.:.:.:,;,
    1-* * * * * -   - * * * *  -   -*       * -   -  * * *   -
    2-*         -   -      *   -   -*       * -   - *     *  -
    3-*         -   -     *    -   -*       * -   -*       * -
    4-* * * *   -   -    *     -   -* * * * * -   -* * * * * -
    5-*         -   -   *      -   -*       * -   -*       * -
    6-*         -   -  *       -   -*       * -   - *     *  -
    7-* * * * * -   - * * * *  -   -*       * -   -  * * *   -
    8-          -   -          -   -          -   -          -
    9-          -   -          -   -          -   -          -
      :.:.:.:.:,;,   :.:.:.:.:,;,   :.:.:.:.:,;,   :.:.:.:.:,;,
          101            102            103            104

      :.:.:.:.:,;,   :.:.:.:.:,;,   :.:.:.:.:,;,   :.:.:.:.:,;,
    1-  * * *   -   -*       * -   -    *     -   -*       * -
    2-    *     -   -*     *   -   -   * *    -   -* *   * * -
    3-    *     -   -*   *     -   -  *   *   -   -*  * *  * -
    4-    *     -   -* *       -   - *     *  -   -*   *   * -
    5-    *     -   -*   *     -   - *     *  -   -*       * -
    6-    *     -   -*     *   -   -*       * -   -*       * -
    7-  * * *   -   -*       * -   -*       * -   -*       * -
    8-          -   -          -   -          -   -          -
    9-          -   -          -   -          -   -          -
      :.:.:.:.:,;,   :.:.:.:.:,;,   :.:.:.:.:,;,   :.:.:.:.:,;,
          105            106            107            108

      1 2 3 4 5 6    1 2 3 4 5 6    1 2 3 4 5 6    1 2 3 4 5 6
      :.:.:.:.:,;,   :.:.:.:.:,;,   :.:.:.:.:,;,   :.:.:.:.:,;,
P T 1-*       * -   -* * * * * -   - * * * *  -   -* * * * * -
R   2-* *     * -   -          -   -*       * -   -*       * -
I   3-*  *    * -   -          -   -*       * -   -*       * -
N   4-*   *   * -   -  * * *   -   -*       * -   -*       * -
T   5-*    *  * -   -          -   -*       * -   -*       * -
W   6-*     * * -   -          -   -*       * -   -*       * -
I   7-*       * -   -* * * * * -   - * * * *  -   -*       * -
R   8-          -   -          -   -          -   -          -
E B 9-          -   -          -   -          -   -          -
      :.:.:.:.:,;,   :.:.:.:.:,;,   :.:.:.:.:,;,   :.:.:.:.:,;,
          109            110            111            112
```

```
 :.:.:.:.:,;,      :.:.:.:.:,;,      :.:.:.:.:,;,      :.:.:.:.:,;,
1-* * * *     -  -* * * * * *    -  -* * * * * *   -  -*          *   -
2-*        *  -  - *             -  -      *       -  - *       *     -
3-*        *  -  -   *           -  -      *       -  -   *   *       -
4-* * * *     -  -     * *       -  -      *       -  -     * *       -
5-*           -  -   *           -  -      *       -  -      *        -
6-*           -  - *             -  -      *       -  -        *      -
7-*           -  -* * * * * *    -  -      *       -  -          *    -
8-            -  -               -  -              -  -               -
9-            -  -               -  -              -  -               -
 :.:.:.:.:,;,      :.:.:.:.:,;,      :.:.:.:.:,;,      :.:.:.:.:,;,
     113               114               115               116
```

```
 :.:.:.:.:,;,      :.:.:.:.:,;,      :.:.:.:.:,;,      :.:.:.:.:,;,
1-     *      -  - *       *     -  -      *       -  -  * * *        -
2- * * * *    -  -   *   *       -  -*     *     * -  - *        *    -
3-*    *    * -  -     * *       -  -*     *     * -  -*           *  -
4-*    *    * -  -      *        -  - *    *    *  -  -*           *  -
5-*    *    * -  -     * *       -  -    * * *     -  - *        *    -
6- * * * *    -  -   *     *     -  -      *       -  -   *    *      -
7-     *      -  - *         *   -  -      *       -  -* *    * *     -
8-            -  -               -  -              -  -               -
9-            -  -               -  -              -  -               -
 :.:.:.:.:,;,      :.:.:.:.:,;,      :.:.:.:.:,;,      :.:.:.:.:,;,
     117               118               119               120
```

15.0 SELF Test

The self test can be initiated from a cold power-up or a warm power-up where no unprinted print buffer data exists by pressing the Advance Page and Set Page Top switches simultaneously. The control board will power up, run a diagnostic test of the internal Ram and Rom and then begin printing, if the internal diagnostic tests were okay. The printout will consist of the printer controller firmware name and version number, a customer-readable list of all option switch settings, followed by a continuous pattern of rotating characters. The self test operation may be terminated at any time by simultaneously pressing both switches a second time.

16.0 CONTROL SWITCHES AND INDICATORS

- o ADVANCE PAGE - This switch advances the paper to the next top-of-page mark, based on the current page length parameter. When this switch is pressed with no paper loaded the paper is advanced to the estimated top-of-page using the paper out sensor. The thumbwheel is used to manually position the paper exactly. The "Set Page Top" switch, which is always active, is then pressed to indicate paper loading is complete.

- o SET PAGE TOP - Depressing this switch sets the current paper position as the top of the page. The beeper will sound to indicate to the operator that the operation is complete.

O PRINTER STATUS INDICATORS:

| POWER | PAPER OUT | LOW BATT | HEAD JAM | READY | PRINTER STATUS |
|---|---|---|---|---|---|
| OFF | OFF | OFF | OFF | OFF | Powered down |
| ON | OFF | OFF | OFF | ON | Power on, paper loaded and ready to print. |
| ON | ON | OFF | OFF | OFF | Out of paper. beeper also is on. |
| *ON | OFF | BLINK | OFF | OFF | Under voltage (input less than 10.0 VDC but control board not yet powered down. |
| *ON | OFF | OFF | OFF | BLINK | Over voltage (input greater than 16.0 VDC.) |
| ON | OFF | OFF | ON | OFF | Head jam. |

*ACTUAL RANGE:
Under voltage = 10.0 - 10.5
Over voltage = 15.5 - 16.0

Attorney Docket No. 6477XX

EXPRESS MAIL LABEL
NO. LB 168 165 349

APPENDIX C

Sections 3.0 - 7.2.6. of a Specification for the Protocol for a Commercial Modular Printer System According to the Present Invention

3.0 PHYSICAL LAYER

In the following example, the host will select the printer, send a block of data and receive the secondary's response. The host expects a response for each transmission. Therefore, the host will receive data by timeout on RXD.

The terminal will be required to have its RTS high during a transaction, and as such the signal functions more like DTR or SELECT. The printer's RTS is still allowed to fluctuate and as such acts more like DSR or Busy.

NOTE: The dropping of RTS by the printer during mid transaction is not important. It can be removed from the printer firmware.

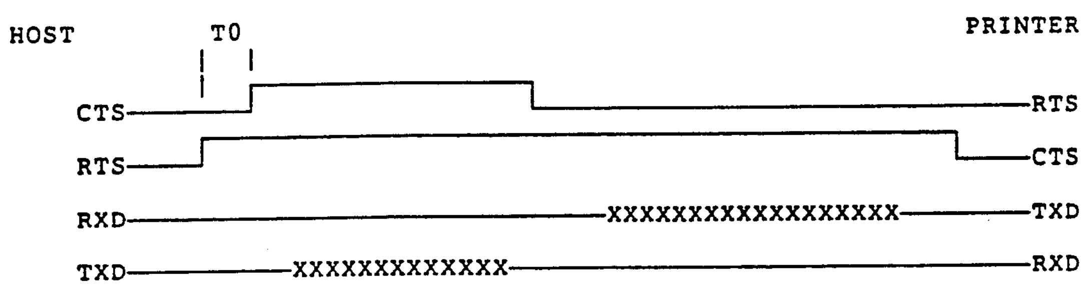

t0 The host raises RTS and waits up to 3 seconds for the printer to respond with CTS. If no CTS response is found, then an error is logged by the host.

4.0 DATA LINK CONTROL LAYER

4.1 Basics

The data link control layer is an HDLC like protocol implementation. It provides for polling of a secondary stations by a primary station. This usage is called normal response mode (NRM).

4.2 Sublayers

The DLC is designed as two sublayers similar to those in the IEEE 802 specifications. The Two layers are media access control (MAC) and logical link control (LLC).

4.2.1 Media Access Control Sublayer

Media access control isolates the part of the DLC that has to interface with the physical layer. MAC provides a consistent interface with LLC so that any physical interface could be used. It isolates the LLC sublayer from any knowledge of bit rates, error checking techniques, data transparency etc.

4.2.2 Logical Link Control Sublayer

Logical Link control provides the actual control of the DLC peer to peer communications. It is basically a set of state machines used to manage what to send in response to all possible inputs. The secondary and the primary have different requirements for the state machines. The primary must provide the polling mechanism. The primary also must implement all recovery actions for link failures.

Only the secondary protocols are discussed in this document.

4.3 MAC requirements

The MAC must provide three services to the LLC.

1. Add the framing information to data passed from the LLC and remove the framing information from data passed to the LLC.
2. Provide the capability to transmit and receive and 8 bit values. This is known as data transparency.
3. Provide error control through cyclic redundancy codes (CRC) and frame length checking. Received frames are checked and transmitted frames have a CRC field appended to them.

4.3.1 Frame Format

The format of frames sent from a transmitting MAC to a receiving MAC is as follows:

<STX><Dev-Addr><Length><LLC-Data><CRC16> where:

| | |
|---|---|
| STX | Ascii code 02H |
| Dev-addr | The address of the printer. Its value is 01H. |
| Length | This is a 16 bit field. It is composed of two bytes encoded with odd parity. The seven remaining bits of each byte are combined to represent a 14 bit length of the LLC-Data field. For example, suppose the length is 134 bytes. This is 00000010000110 binary. The first byte would be 00000001 and the second byte would 10000110. Parity is used on each byte to detect errors in the length field upon receiving a frame. |
| LLC-Data | This is the data passed by logical link control. |

CRC16 This is the cyclic redundancy check code. It is generated using the polynomial x^16+x^15+x^2+1 and is the same as that used in bisync. It is calculated over all the fields following the STX.

4.3.2 Transparency

Transparency is provided by using a length field in the frame. This field specifies the length of the LLC-Data. The LLC-Data can then be composed of any characters. Once all the characters are sent or received the CRC field is processed.

4.3.3 Error Processing

The two major functions of error processing are CRC processing and length processing. The length processing verifies that a frame is less than a maximum frame size. In a received frame, the length field is checked for parity errors and reasonableness (ie less than a maximum frame size). If there is an error the frame is ignored.

4.4 Logical Link Control Definition 4.4.1 Basics

LLC is an HDLC like protocol. It implements an unbalanced mode of operation, normal response mode. This is a primary (controller), secondary (terminal) type operation. The primary polls the secondary for information and also sends data to the secondary at that time.

4.4.2 Link Data Units (LDU)

The LDU format is as follows:

<Control-field> <I-field> where:

Control-field - type of frame (see next section).
I-field - Data characters maxlength 1024, minimum length is 0.

These fields are passed as parameters to the MAC sublayer and used by the MAC to build the frames. These fields are also passed by the MAC to the LLC when a frame is received.

4.4.4 Control-field Usage

The control field usage is similar to that found in HDLC. There are three types of frames, unnumbered frames, supervisory frames and information frames. The frame formats are as follows:

```
Type        Bits          7 6 5 4 3 2 1 0

Unnumbered       1 X X X 1 1 1 1
                   | | |
                   -------------- Type of unnumbered frame
                           000 DISC
                           001 SNRM
                           010 UA
                           011 FRMR
                           110 XID
                           111 RESET

Supervisory 1 R R R 0 Y 0 1
                   | | |   |
                   | | |   ------ 0=RR  1=RNR
                   | | |
                   -------------- NR sequence count

I-frame          1 R R R S S S 0
                   | | | | | |
                   | | | -------- NS sequence count
                   | | |
                   -------------- NR count
```

The NR and NS fields are counts modulo 8. When the count is 111 binary, its next value is 000 binary.

4.4.5 Unnumbered frames

Unnumbered frames are used to control the state of the link. Frames can originate with the primary or the secondary. The following table indicates where the frame can originate and the code for the type of unnumbered frame. Frames from the primary are commands and frames from the secondary are responses.

| Type | Command | Response | Value | I-field (in Hex) |
|---|---|---|---|---|
| DISC | yes | no | 8F | no |
| SNRM | yes | no | 9F | no |
| UA | no | yes | AF | no |
| FRMR | no | yes | BF | yes |
| XID | yes | yes | EF | yes |
| RESET yes | no | FF | no | |

4.4.5.1 DISC

DISC is used to place the secondary in normal disconnect mode (NDM). In NDM the secondary can accept only SNRM, XID or RESET frames.

4.4.5.2 SNRM

SNRM places the secondary into normal response mode (NRM). In NRM the secondary can receive any valid frame. This command resets the secondary's state variables so that the NS and the NR of the primary and the secondary are in sync.

4.4.5.3 UA

UA is used to respond to DISC and SNRM to inform the primary that the command was executed.

4.4.5.4 FRMR

FRMR is used to inform the primary that a protocol error has occurred. It contains one byte of data in the I-field to indicate the failure. The following table defines the reason codes.

| I-field (hex) | Failure |
|---|---|
| 01 | Invalid frame received. This is a protocol error |
| 02 | Received NR did not match expected NR |
| 03 | Received NS did not match expected NS |
| 04 | Frame can only be processed in NRM and secondary is in NDM |
| 05 | Frame too short |
| 06 | Frame too long |

If the secondary transmits FRMR, it enters NDM. The primary is responsible for recovery. If the secondary sends FRMR in response to an I-frame, the I-frame is lost.

4.4.5.5 XID

XID is used to identify the type of secondary. The i-field will be encoded with information defining the capabilities of the sender. The i-field is formated as follows:

| Field | Usage |
|---|---|
| link type | 1 byte value 00H (secondary) |
| device type | 2 bytes value 0205H (printer, 80 column). |
| version | 1 bytes. Version number of software in device. |
| revision | 1 byte. Revision number of software. |
| serial# | 4 bytes. Serial number of unit. |
| session limit | 2 bytes value 0001H (only 1 session allowed). |

4.4.5.6 RESET

RESET is used to force the secondary to reset in the event it is non-responsive to any other message. This is a last resort message because the secondary is completely reset and any pending buffers of data are cleared.

4.4.6 Supervisory Frames

Supervisory frames are used by the primary to poll the secondary for any frames it needs to send to the primary. The primary will normally poll with a receiver ready (RR). If the primary is busy (This could happen if the primary has filled up all its buffers with messages from the data link), it will poll with a receiver not ready (RNR) thereby idling the data link and informing the secondaries that the link remains active.

If the secondary has no message and it is capable of receiving a message (in particular an I-frame) then it should respond with an RR. If the secondary has no buffer for receiving an I-field, then it can send an RNR. If the RNR is in response to an I-frame, that I-frame is ignored and must be resent later by the primary when the secondary can receive it. This will occur when the secondary's buffers free up and it starts responding with RRs. The secondary may accept an I-frame and send an RNR to acknowledge it, thereby preventing unnecessary frames being sent on the link.

The secondary must be able to receive a RESET even if it is responding to polls with RNR.

The NR field is used to indicate what number of I-frame is expected next.

4.4.7 I-frames

I-frames are used to send data to the secondary or to receive data from the secondary. The NR field is used to indicate what number of I-frame is next expected by the sender of this I-frame and the NS is the number of this I-frame. The use of NR and NS provides for a frame acknowledgement mechanism and also prevents loss of frames. See the next section for examples.

4.4.8 Data Link Exchange Examples

This section contains examples of data flows on the link. The format of the examples is that the primary is on the left and the secondary is on the right. An error shows the direction of data flow. Before the starting point of an arrow is a description of the message. A message is one of the following:

```
RR(address,NR)
I(address,NR,NS)
SNRM(address)
UA(address)
FRMR(address,reason)
```

4.4.8.1 I-frame Exchange Response Mode

```
RR(A,sa)     ------>                   primary polls A
             <------ I(A,ra,sa)        A sends its data
RR(A,sa+1)   ------>                   primary acks A's data
             <------ RR(A,ra)          A is done
                .
                .                      later
                .
I(B,sa+1,ra)------>                    primary has data for B
             <------ RR(B,ra+1)        B acks the data
```

4.4.8.2 CRC Errors

```
RR(A,sa)     ------>                   primary polls A
             <------ I(A,ra,sa)        A sends some data that primary
                                       receives with a CRC error
                .
                .                      primary times out waiting
                .
RR(A,sa)     ------>                   primary polls A again with same
                                       NR indicating to A that it did
```

```
                                          not receive the last frame
          <------ I(A,rb,sb)              A resends
RR(A,sa+1) ------>                        primary acks the data
          <------ RR(A,ra)                A is done
              .
              .                           Host will send to A
              .
I(A,sa+1,ra)------>                       CRC error, A ignores
              .
              .                           Host times out waiting for
              .                           response
I(A,sa+1,ra)------>                       Host retransmits
          <------ RR(A,ra+1)              A acks frame
```

4.4.8.3 Response Frame CRC error

```
RR(A,sa)   ------>                        primary polls A for data
           <------ I(A,ra,sa)             A sends data
RR(A,sa+1) ------>                        Primary's ack has CRC error and
                                          is ignored by A
              .
              .                           primary times out waiting for
              .                           A's response
RR(A,sa+1) ------>                        A receives ack this time
           <------ RR(A,ra)               A is done
I(A,sa+1,ra)------>                       primary has data for A
           <------ RR(A,ra+1)             A's ack has CRC error
              .
              .                           primary times out
              .
I(A,sa+1,ra)------>                       primary retransmits
           <------ RR(A,rA+1)             A ignores data with same NS and
                                          resends ack. A does not send a
                                          FRMR because the NS was the
                                          same as the previous NS. If the
                                          NS had been anything other than
                                          ra or ra+1,then A would send an
                                          FRMR
```

4.4.8.4 Sequence Error in NR

```
RR(A,sa)   ------>
           <------                        I(A,ra,sa)
RR(A,sa+1)------>
           <------                        RR(A,ra)
              .
              .                           later
              .
RR(A,sa+2)------>
<------    FRMR(A,2)                      NR from primary is in error
```

4.4.8.5 Sequence Error in NS

```
RR(A,sa)       ------>
               <------                    I(A,ra,sa)
RR(A,sa+1)------>
               <------                    RR(A,ra)
I(A,sa+1,ra+1) ------>                    NS is in error, should be ra
               <------                    FRMR(A,3)
```

4.4.9 Secondary State Machine

Following is a state table for the secondary protocol. The states are across the top and inputs are down the left side. The states are NDM, NRM and RSP. NRM is a state in NRM that indicates the secondary is not awaiting an acknowledgement to an I-frame that it has sent. RSP indicates the secondary has sent an I-frame and expects an acknowledgement. RSP is needed because a CRC error may have occurred on the I-frame and the host may poll with an NR different from what the secondary expects after sending the I-frame. In this case the NR should be one less than the NS and that does not mean the secondary should send a FRMR but should resend the I-frame.

If the primary sends an I-frame with an NS one less than what the secondary expects, then the secondary ignores the I-frame assuming that the primary missed the original response acknowledging that I-frame.

RSP also allows for another I-frame to be sent if one is available. For example, the secondary sends an I-frame to the host, the host sends another poll (RR) with an NR indicating that it accepted the I-frame, and meanwhile another messages is ready to be sent by the secondary. The secondary sends the new I-frame and remains in RSP.

Each state entry consists of three lines. Line one indicates the frame to be sent if any, based on current values for VS and VR. VS is the internal value kept by the secondary for the NS of its next I-frame and VR is the expected value of the next NR from the host. Line two indicates the state transition and line three is used to indicate what action to take. The action is a letter from the table following the state table.

Frames with bad CRCs or lengths do not get passed to the LLC by the MAC (they just get ignored) and if the LLC receives I-frames that it has no communication buffer for then it ignores the I-frame and passes an RR(NR) to the state machine. This reduces the inputs needed by the state machine to implement the protocol.

In the input section of the table 'sendq' is used. This is an indication that the network layer has a data to send. In the action section, dequeue means that the 'sendq' indicator has been acknowledged. This does not imply that the data has been sent.

State Table for Secondary

| Inputs | NDM | NRM | RSP |
|---|---|---|---|
| SNRM | UA<br>NRM<br>a | UA<br>NRM<br>a | UA<br>NRM<br>a |
| RNR NR=VS | FRMR NDM<br>NDM<br>- | RR(VR)<br>NRM<br>- | RR(VR)<br>NRM<br>f |
| RR NR=VS<br>sendq empty | FRMR NDM<br>NDM<br>- | RR(VR)<br>NRM<br>- | RR(VR)<br>NRM<br>f |
| RR NR=VS<br>sendq ~empty | FRMR NDM<br>NDM<br>- | I(VS,VR)<br>RSP<br>b | I(VS,VR)<br>RSP<br>b |
| RR NR inv * | FRMR NDM<br>NDM<br>- | FRMR NR~=NS<br>NDM<br>- | FRMR NR~=NS<br>NDM<br>- |
| RR NR=VS-1 | FRMR NDM<br>NDM<br>- | FRMR NR~=NS<br>NDM<br>- | I(VS-1,VR)<br>RSP<br>- |
| I NR=VS<br>NS=VR<br>sendq empty | FRMR NDM<br>NDM<br>- | RR(VR+1)<br>NRM<br>c | RR(VR+1)<br>NRM<br>c |
| I NR=VS<br>NS=VR<br>sendq~empty | FRMR NDM<br>NDM<br>- | I(VS,VR+1)<br>RSP<br>d | I(VS,VR+1)<br>RSP<br>d |
| I NR inv *<br>NS=VR | FRMR NDM<br>NDM<br>- | FRMR NR~=VS<br>NDM<br>- | FRMR NR~=VS<br>NDM<br>- |
| I NR=VS-1<br>NS=VR | FRMR NDM<br>NDM<br>- | FRMR NR~=VS<br>NDM<br>- | I(VS-1,VR)<br>RSP<br>- |
| I NS=lastNS | NDM<br>FRMR NDM<br>NDM<br>- | NRM<br>FRMR NS~=VR<br>NDM<br>- | RSP<br>RR(VR)<br>RSP<br>- |
| I NS~=VR | FRMR NDM<br>NDM<br>- | FRMR NS~=VR<br>NDM<br>- | FRMR NS~=VR<br>NDM<br>- |
| RR NR=VS<br>no input<br>buffer | FRMR NDM<br>NDM<br>- | RNR(VR)<br>NDM<br>- | RNR(VR)<br>NRM<br>- |
| I NR=VS<br>NS=VR<br>no inbuf | FRMR NDM<br>NDM<br>- | RR(VR)<br>NRM<br>- | RR(VR)<br>NRM<br>- |
| SC | UA<br>NDM<br>- | UA<br>NDM<br>- | UA<br>NDM<br>- |

DI

State Table for Secondary (con't)

| | | | |
|---|---|---|---|
| RESET | -<br>NDM<br>e | -<br>NDM<br>e | -<br>NDM<br>e |
| XID | XID<br>NDM<br>h | XID<br>NRM<br>h | XID<br>RSP<br>h |
| MAC errors | <br>NDM<br>g | <br>NDM<br>g | <br>NDM<br>g |

* NR is invalid if it NR>VS or NR<VS and no I-frames have been received.

ACTIONS a enqueue link reset indication,VR=0,VS=0
b dequeue send indication, VS=VS+1,save send buffer in case of retransmit
c VR=VR+1, indicate I-frame received (enqueue data), release last send buffer,lastNS=NS
d dequeue send indication, VS=VS+1, VR=VR+1, indicate I-frame received, save send buffer
e reset secondary, clear buffer etc
f release last send buffer
g enqueue MAC error
h enqueue i-field configuration info because it could be used by other layers or operating system.

5.0 SESSION LAYER

The session layer enforces certain protocol rules. In the case of the printer the rules are very simple. All data must be either to the presentation layer or the session layer, and the session layer allows only one program at a time to communicate with the printer. The session layer in the printer includes the functionality of the network and transport layers also. In particular the transport header is produced by the session layer. This is a reasonable way to implement the protocol for the printer since only one session is allowed and that implies the need for a single connection (transport layer) and a single channel (network layer).

5.1 Session Layer Message Format

The format of messages sent between the session layers of the host and the printer is:

<Channel><TH><Data>

Where:

Channel 16 bit value. When the host starts communicating with the printer, it will pass a value in this field that it will use for all subsequent communication on this session. This value should be the same on messages returned to the host.

TH Transport header. See the next section for detailed description. For the printer, only

| | |
|---|---|
| | certain values are expected in this field, depending on whether the message is to the presentation layer or the session layer. |
| Data | This is a field containing either a session layer message or print data. The TH specifies which. |

5.2 TH

To provide the transport services, a header is attached to each message to be sent. The header is one byte and its format follows:

```
Bits  7 6 5 4 3 2 1 0
      | | | | | | | |
      | | | | | | --- Service provided for
      | | | | | |       01      Session Layer
      | | | | | |       10      Presentation Layer
      | | | | ------- unused
      | | ----------- Chaining
      | |               11      only of chain
      | ------------- Response type (see below)
      --------------- Message type (0=request,1=response)
```

5.2.1 Service Provided For Subfield

The service provided for field is used to indicate which layer is using the transport layer functions.

5.2.2 Chaining Subfield

The chaining bits indicate how the data is being segmented into smaller elements for transmitting and used by the receiving transport layer to recombine the data. The transport layer will guarantee delivery in the proper order. An only of chain indicates that the data did not get split into smaller pieces. A configuration parameter will specify how large a message can be before it must be split. The printer will always receive only of chain messages.

5.2.3 Response Type Subfield

Response type is used in two ways: if the message type is a request then it indicates whether a response is required. If the message type is a response then it indicates whether the response is positive or negative. See the following table.

| Message Type | Response Type | Meaning |
|---|---|---|
| 0 | 0 | request, no response |
| 0 | 1 | request, response required |
| 1 | 0 | positive response |
| 1 | 1 | negative response |

A positive response indicates that the message was received by the destination. It may also mean that the message was processed if the destination delayed responding until after processing. A negative response will include a data field used to return the reason the message was not accepted by the destination.

5.2.4 Message Type Subfield

Message type indicates whether this is a response or a request. The printer expects only session to session layer messages to be requests requiring responses and all presentation layer messages will not expect responses.

5.3 Session Layer Messages 5.3.1 Bind

This message is used by the host to start a session with the printer. Only one session is permitted at a time.

The TH for this message is 71H and indicates a session layer request message expecting a response.

<Bind><prog><host><prn><bind-id><0> where:

| | |
|---|---|
| Bind | one byte value 00H. |
| prog | a string terminated by 0. ignored by printer |
| host | a string terminated by 0. ignored by printer |
| prn | the string "PRN" terminated by zero. Must match |
| bind-id | a two byte field to identify which session is being started and used in the response sent by the printer |

5.3.2 Response to Bind

When the bind request is received, the printer will check that no other session is in progress and will check that the prn field equals "PRN". It will send a response with a TH of 0B1H and message format as follows:

<Bind><bind-id><response> where:

| | | |
|---|---|---|
| Bind | | one byte value 00H. |
| bind-id | | two bytes. The same value as received in the bind. |
| response | | one byte: |
| | value | meaning |
| | 00H | bind accepted, no other sessions and prn field was correct. |
| | 01H | bind rejected, prn field invalid. |
| | 02H | bind rejected, another session in progress. |

5.3.3 Unbind

This message will be received when the program in the host is done using the printer. The printer must send a positive response. If there is any unprinted data in the buffer, it will be printed but unacknowledged. The unbind will have a TH of 71H indicating a request expecting a response to the session layer. The unbind is formated as follows:

<Unbind><reason> where:

| | |
|---|---|
| Unbind | one byte value 01H. |
| reason | two bytes value 0000H. |

5.3.4 Response to Unbind

The printer will send a positive response to the unbind. Its TH will have a value of 0B1H indicating a positive response to the session layer and have the following format:

<Unbind> where:

| | |
|---|---|
| Unbind | one byte value 01H. |

Once this response is sent, the printer can begin another session with the reception of a bind command.

5.3.5 Term-Sess

Sometimes the host may need to cancel a session with the printer because of a problem (such as the application communicating with the printer being canceled). When this happens, the host will send a term-sess command, which has no response. The printer can finish printing the data or flush it. In either case it can not send any messages back to the host for that session. The term-sess TH will be 31H indicated a request requiring no response to the session layer. The format of the term-sess message is:

<Term-sess><reason> where:

| | |
|---|---|
| Term-sess | one byte value 02H. |
| reason | one byte, value does not matter to printer. |

If the printer receives a message on a channel for which it is not in session (sent a positive response to a bind), it can send the term-sess message with a reason code of 00H, which means session has no partner. It does not matter what the TH is. If a message is received on the correct channel, but formated incorrectly (such as TH invalid or session command invalid), the session layer can send a term-sess with reason code 4 (protocol error). If this happens, the printer should terminate the session on its side (as if it had received a term-sess).

5.3.6 Examples

This section will show message flows from the viewpoint of the session layer. They will not include the DLC fields. These messages would be contained in I-frames. The format of the messages in the example is:

<channel#><TH><data> where:

| | |
|---|---|
| channel# | two bytes provided by the host and used by the printer. |
| TH | one byte. Is as defined for the message sent |
| data | is the command to the session layer or data to be printed. |

5.3.6.1 Establish Session

| To | Message | Comment |
|---|---|---|
| printer | 00057100413000543100505 24E00000200 | channel 5, response expected, bind from A0 in device T1 to PRN. Bind-id is 2. |
| host | 0005B100000500 | channel 5, positive response. |

5.3.6.2 Send Data and Responses

| To | Message | Comment |
|---|---|---|
| printer | 00053201004142434445464748490D | channel 5, print data, sequence 0 data is ABCDEFGHI<carriage return> |
| printer | 00053201010D0D0D | channel 5, print data sequence 1 data is 3 carriage returns |
| host | 0005328100 | printer has completed first message |
| printer | 00053201020931323 30 | channel 5, print data, sequence 2 data is <tab>123<carriage return> |
| host | 0005328101 | printer has completed second message |
| host | 0005328102 | printer has completed third message |

5.3.6.3 Normal End of Session

| To | Message | Comment |
|---|---|---|
| printer | 000571010000 | channel 5, session layer request requiring a response, unbind. |
| Host | 0005B101 | printer sends positive response. |

5.3.6.4 Abnormal End of Session

| To | Message | Comment |
|---|---|---|
| printer | 000531H0200 | channel 5, session layer request, no response expected, terminate session because of abend. The printer will quit sending any messages to host on this session. Another session may be started from the host using the same channel. |

5.3.6.5 Invalid Session Request

| To | Message | Comment |
|---|---|---|
| printer | 00067100413100543100505 24E00000200 | channel 6, response expected, bind from A1 in device T1 to PRN. Bind-id is 3. |

| | | |
|---|---|---|
| host | 0006F100000502 | channel 6, negative response, too many sessions. |
| printer | 00067100413000543100505254000002 00 | channel 6, response expected, from A0 in device T1 to PRT. Bind-id is 3. |
| host | 0006F100000501 | channel 6, negative response, application unknown. This is because the prn field did not equal "PRN". |

6.0 PRINTER PRESENTATION LAYER

The printer commands are sent from the presentation layer of the host computer to the presentation layer of the printer. The commands are enclosed in presentation layer protocol units (PLDU) as follows:

<command><data> where:

command — a one byte value specifying the printer function to perform. These functions are defined in the following sections.

data — contains parameters for the commands and also actual print data.

6.1 Printer Commands

PLDUs are used to send commands to the printer. the PLDU is formated with a printer command followed by the data for the printer.

The printer returns responses in PLDUs using the same command code, but with the high bit set. Each sub-section below defines the command from the host and the printer responses.

6.1.1 Print

The command code is 01H. The response code is 81H.

The data for this command are a one byte sequence number (mod 256) and the actual print data with embedded command codes. When the printer finishes printing the data from the PLSU, it returns a response with the same sequence number. Note that multiple print lines may be in a print command PLDU and that the response does not need to be returned before another print command is received.

6.1.2 Printer on Line

The command code is 02H. The response code is 82H.

This command will place the printer on line.

6.1.3 Request Status

The command code is 03H. THe response code is 83H.

This command requests that the current printer status be returned. The format of the response if five bytes as follows:

```
Byte        Usage
 0          P  P  O  R  B  B  B  B status
            |  |  |  |  |  |  |  |
            |  |  |  |  ---------- buffer status
            |  |  |  |               0000 empty
            |  |  |  |               1000 half-full
            |  |  |  |               1110 90 chars left
            |  |  |  |                  (1 line)
            |  |  |  |               1111 full
            |  |  |  ------------- 0=not charging 1=recharging
            |  |  ---------------- 0=not online 1=online
            |  ------------------- power up status
                                   00 no power up
                                   01 reset
                                   10 powered up
                                   This field is cleared after
                                   status.

               returned
 1          0  0  C  B  O  L  P  H errors
                  |  |  |  |  |  |
                  |  |  |  |  |  - 0=no head jam 1=head jammed
                  |  |  |  |  ---- 0=paper not out 1=paper out
                  |  |  |  ------- 0=not low voltage 1=low
                  |  |  |              voltage
                  |  |  ---------- 0=no over voltage  1= over
                  |  |                 voltage.  O and L are
                  |  |                 are for recharging.
                  |  ------------- 0=battery ok 1=low batt.
                  ---------------- 0=cover on,1=cover off,
 2          protocol error counts      cleared by sending
                                       response
 3          print head location

 4          0  0  0  0  H  H  F  L printer mech. activity
                        |  |  |  |
                        |  |  |  - 0=not line adv 1=line adv
                        |  |  ---- 0=not form feed 1=form feed
                        |  |
                        ---------- head motion
                                   00 none
                                   01 move right
                                   10 move left
```

6.1.4 Request Current Configuration

The command code is 07H. The response code is 87H.

This command requests that the printer return the current configuration. The format of the response is 7 bytes as follows:

```
Byte    Usage

  0     Print mode (hex code)
        00  normal
        01  NLQ
        02  double width
        03  compressed
        04  emphasized
        05  doublestrike
        06  character graphics
        40  single density graphics
        41  double density graphics
        42  quad density graphics
```

```
1       0  0  0  I  S  S  P  T style
                 |  |  |  |  |
                 |  |  |  |  - 0=pica 1=elite
                 |  |  |  ---- 0=normal 1=proportional
                 |  |  ------- 0=super/subscript
                               00 none
                               01 subscript
                               10 superscript
                 ------------- 0=normal 1=italics
2 and 3 buffer size
4       character set          values as defined in
                               section 3.12.2.2 with
                               values > 80H as user
                               defined.

5       pagelength
6       linespacing
        0 1/6
        1 1/8
        2 7/72
        3 n/72
        4 n/216
```

6.1.5 Request Supported Features

The command code for this function is 04H. The response code is 84H.

This command requests that the printer return the features that is supports. The response data is defined below. Unless otherwise indicated, single bit fields have the value shown when they hold a one.

```
Byte    Usage

 0      0  0  G  D  E  C  W  N print mode
              |  |  |  |  |  |
              |  |  |  |  |  - NLQ
              |  |  |  |  ---- double width
              |  |  |  ------- compressed
              |  |  ---------- emphasized
              |  ------------- double strike
              ---------------- char graphics

 1      0  0  0  0  0  Q  D  S graphics
                       |  |  |
                       |  |  - single density
                       |  ---- double density
                       ------- quad density

 2      0  0  I  U  L  P  E  P style
              |  |  |  |  |  |
              |  |  |  |  |  - pica
              |  |  |  |  ---- elite
              |  |  |  ------- proportional
              |  |  ---------- subscripts
              |  ------------- superscripts
              ---------------- italics

3,4     buffer size
5,6,7   charsets      bit zero is USA, bit one is France
        and so on, each bit on for the number of the char
        set in section 3.12.2.2.
```

```
8       number of user defined char sets allowed

9       M  V  H  R  X  A  B  C miscellaneous
        |  |  |  |  |  |  |  |
        |  |  |  |  |  |  |  - 10 char/in
        |  |  |  |  |  |  ---- 12 char/in
        |  |  |  |  |  ------- 15 char/in
        |  |  |  |  ---------- reserved
        |  |  |  ------------- reserved line feeds
        |  |  |                supported
        |  |  ---------------- horizontal tabs
        |  ------------------- vertical tabs
        ---------------------- setable margins

10      line spacings see section 7.1.4 above
11-25   "BA-2000N    V.RR"
26-29   All zeros
```

6.1.6 Self Test

Command code=05H and the response code=85H.

This command forces the printer to do a self test. This command will clear the print buffer. At the start of self test the beeper will sound and all indicators will go on for 0.5 seconds. The positions of the switch settings will be indicated as well as a code indicating the version of the firmware.

6.1.7 Reset

Command code=06H

This command resets the printer and does not return a response. The printer should reset everything that it can.

6.2 Printer Status PLDUs

The printer can generate status messages that are not responses to requests from the host. These messages indicate a change in status that the host should know about.

The code for this status is FFH. Its data format is as follows:

| Byte | Usage | |
|---|---|---|
| 0 | errors | same as byte 1 or request status |
| 1 | offline | |
| | bit 0=1 indicates printer was set offline | |

7.0 NPCP COMMUNICATION SEQUENCES
7.1 Normal Handshake
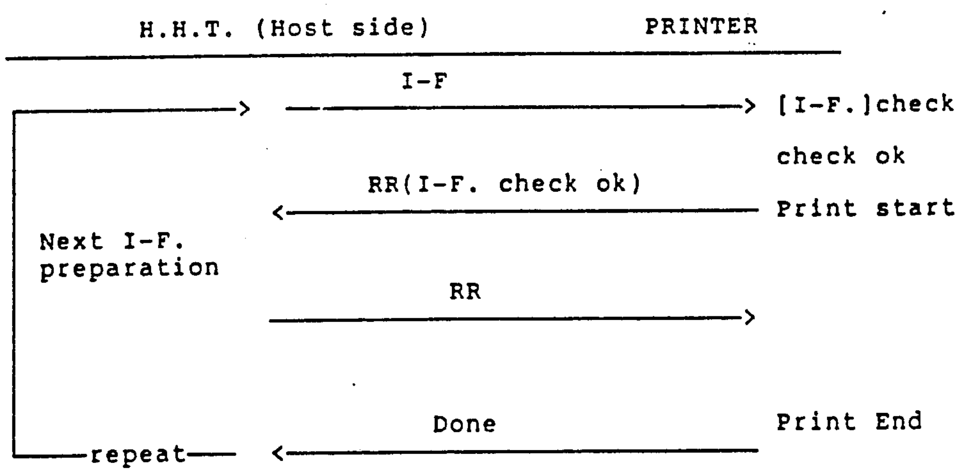
7.2 Error Case
7.2.1 Paper Out
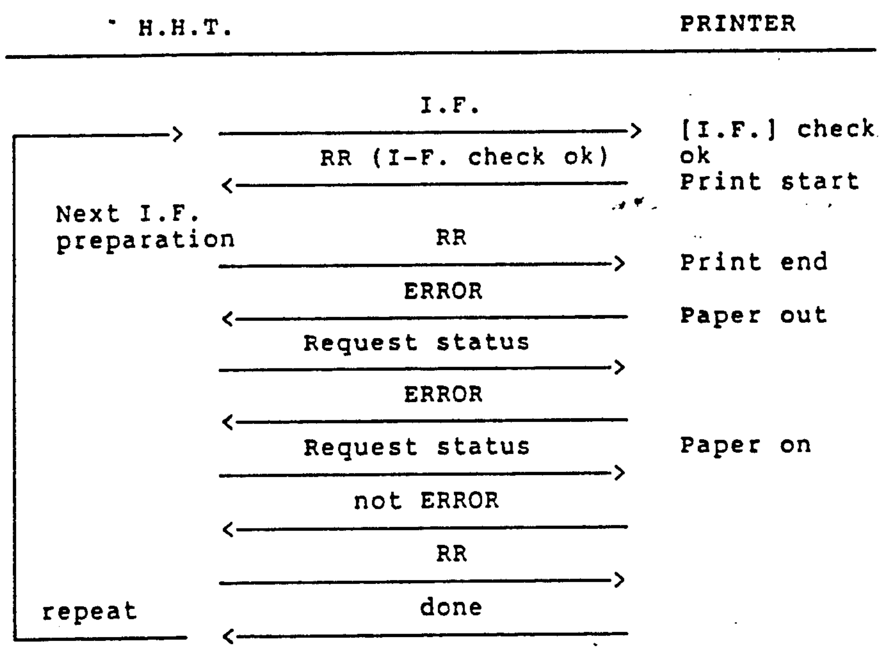

7.2.2 Cover-off During Printing
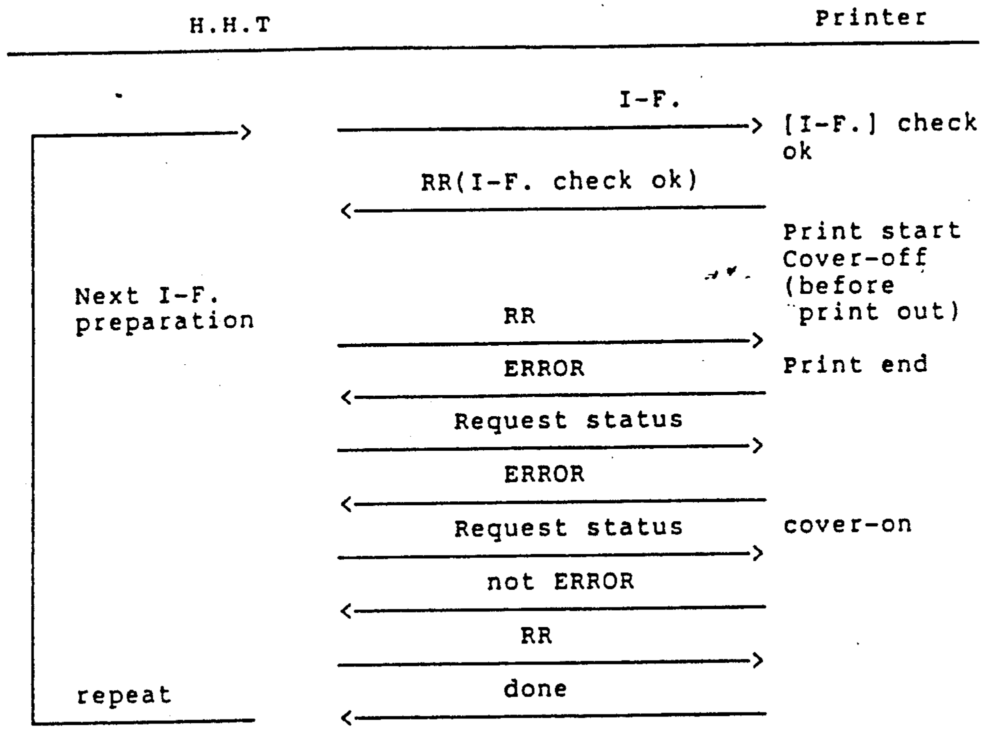
7.2.3 Cover-off After the CPU Performed Print Done Processing
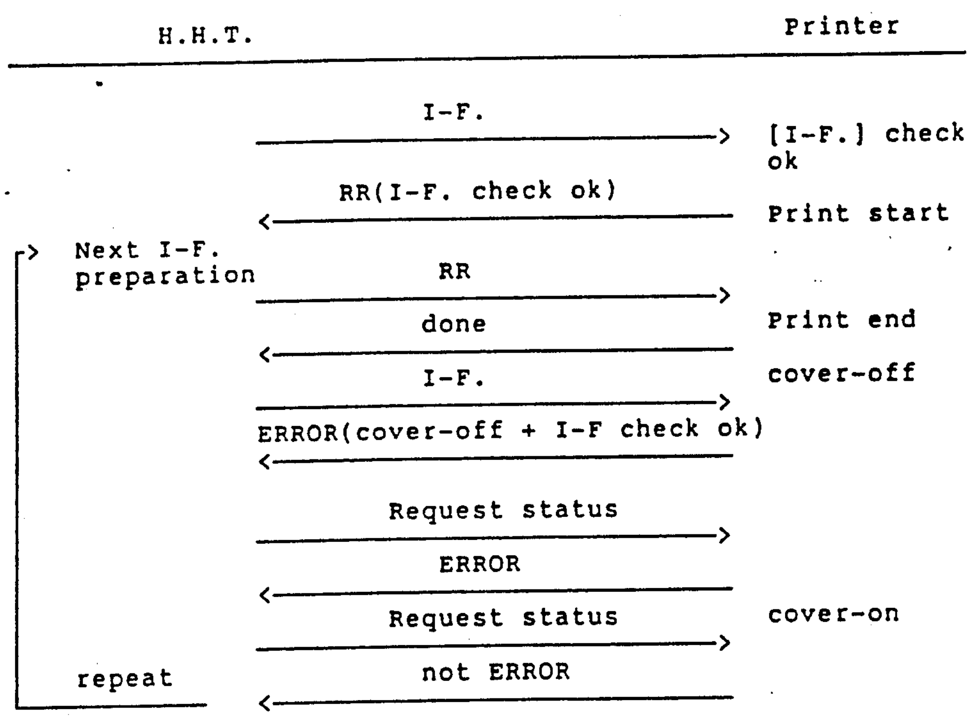

7.2.4 Over Voltage

| H.H.T. | | Printer |
| --- | --- | --- |
| → | I-F. → | [I-F.] check ok |
| | ← RR(I-F. check ok | Print start |
| Next I-F. preparation | RR → | -over voltage stop printing |
| | ← ERROR | Recover print restart |
| | Request status → | Print end |
| | ← NOT ERROR | |
| | RR → | |
| | ← DONE | |
| | I-F. → | I-F check ok |
| | ← RR (I-F check ok) | Print start |
| | RR → | -overvoltage -stop printing |
| | ← ERROR | (10 sec) (sleep) |
| | Request Status → | wake up still over-voltage |
| | ← ERROR | |
| | Request status → | wait 10 sec., sleep |
| | | wake up, (voltage recovered) |
| | ← Not ERROR | Reprint |
| | RR → | Print END |
| → | ← Done | |

7.2.5 I-F. Error

| H.H.T. | | Printer |
|---|---|---|
| | I-F. ————————> | [I-F.] check no good |
| H.H.T. time out- | | |

7.2.6 Head Jam

| H.H.T. | | Printer |
|---|---|---|
| | I-F. ————————> | [I-F.] check ok |
| | <———————— RR(I-F. check ok) | (Print start) |
| Next I-F. preparation | | - Head jam. print stop |
| | RR ————————> | |
| | <———————— ERROR (Head jam) | |
| | Request status ————————> | |
| | <———————— ERROR (Head jam) | -Head jam clear |
| | Request status ————————> | |
| | <———————— ERROR clear | |
| | SNRM ————————> | |

Attorney Docket No. 6477XX

EXPRESS MAIL LABEL
No. LB 168 165 349

APPENDIX D

Listing of
"NPCP" Program for
Type B System
(Sixty-Three Pages)

```
;        *********************************************
;        *                                           *
;        *          NPCP                             *
;        *                                           *
;        *  Norand Portable Communication protocol   *
;        *                                           *
;        *                  for   TYPE  B            *
;        *                                           *
;        *********************************************
;
;
;
;
;
;        EQU table
;
;        recieve U_frame
;
N_DISC:         EQU     00000000B       ;disconnect mode  (NDM)
N_SNRM:         EQU     00010000B       ;normal response mode  (NRM)
N_UA:           EQU     00100000B       ;unnumbered acknowledge
N_FRMR:         EQU     00110000B       ;frame reject
N_XID:          EQU     01100000B       ;exchange identification
N_RESET:        EQU     01110000B       ;reset
;
;        send U_frame
;
S_DISC:         EQU     10001111B       ;disconnect mode  (NDM)
S_SNRM:         EQU     10011111B       ;normal response mode  (NRM)
S_UA:           EQU     10101111B       ;unnumbered acknowledge
S_FRMR:         EQU     10111111B       ;frame reject
S_XID:          EQU     11101111B       ;exchange identification
S_RESET:        EQU     11111111B       ;reset
;
;        send S_frame
;
SS_RR:          EQU     10000001B       ;RR code
SS_RNR:         EQU     10000101B       ;RNR code
SS_IFR:         EQU     10000000B       ;I_frame
;
;
;
;        TH value
;
N_BIND:         EQU     71H             ;bind mode          71H.00H
N_UNBIND:       EQU     01H             ;unbind mode        71H.01H
N_TERM:         EQU     31H             ;term-sess          31H.02H
N_PRES:         EQU     32H             ;presentation layer message  32H.**
RESTOB:         EQU     0B1H            ;response to bind
RESTNB:         EQU     0F1H            ;response to bad "PRN" bind
```

```
;
;       host command value
;
C_PRINT:        EQU     01H         ;print
R_PRINT:        EQU     81H         ;response
C_ONLINE:       EQU     02H         ;printer on line
R_ONLINE:       EQU     82H         ;response
C_RQST:         EQU     03H         ;request status
R_RQST:         EQU     83H         ;response
C_RQCC:         EQU     07H         ;current configuration
R_RQCC:         EQU     87H         ;response
C_RQSF:         EQU     04H         ;supported features
R_RQSF:         EQU     84H         ;response
C_RQSLT:        EQU     05H         ;self test
R_RQSLT:        EQU     85H         ;response
C_RQRT:         EQU     06H         ;reset
R_RQRT:         EQU     86H         ;response
R_ERROR:        EQU     0FFH        ;response
;
;
;
;       FRMR    frame error reason codes
;
IFR:    EQU     01H                 ;invalid frame received
NGNR:   EQU     02H                 ;received NR <> expected NR
NGNS:   EQU     03H                 ;        NS             NS
ERNDM:  EQU     04H                 ;secondary is in NDM
FTOOS:  EQU     05H                 ;frame too short
FTOOL:  EQU     06H                 ;frame too long
;
;
;
;       error reason codes value FFH
;
E_O_V:          EQU     08H         ;over voltage
E_L_V:          EQU     04H         ;low  voltage
E_HEAD_JAM:     EQU     01H         ;head jum error
E_P_OUT:        EQU     02H         ;paper out error
E_COVER:        EQU     20H         ;paper cover error
;
;
;
;       NPMOD
;
NDM:    EQU     01H                 ;NDM mode
NRM:    EQU     02H                 ;NRM mode
RSP:    EQU     04H                 ;RSP mode
;       EQU     08H
;       EQU     10H
;       EQU     20H
;       EQU     40H
;       EQU     80H
;
;       NPFLG0
;
RXER:   EQU     01H                 ;receive error occured
RXDEX:  EQU     02H                 ;receive data exist
F_BIND: EQU     04H                 ;bind command receive flag
EXTXD:  EQU     08H                 ;TX data to host exist
BDBIND: EQU     10H                 ;bad bind flag
BDBIND2:EQU     20H                 ;bad bind flag 2
BFUL:   EQU     40H                 ;input buffer full flag
RCVPTC: EQU     80H                 ;print command receive
;
;
;       NPFLG1
```

```
;
GTRR:     EQU     01H                          ;get RR command
NPWAT::   EQU     02H                          ;NPCP wait flag
;         EQU     04H                          ;
;         EQU     08H                          ;
;         EQU     10H                          ;
;         EQU     20H                          ;
;         EQU     40H                          ;
;         EQU     80H                          ;
;
;
;         NPTSK   NPCP task number
;
N_NP0:            EQU     00                   ;
N_NP1:            EQU     01                   ;
N_NP2:            EQU     02                   ;
N_NP3:            EQU     03                   ;
N_NP4:            EQU     04                   ;
N_NP5:            EQU     05                   ;
N_NP6:            EQU     06                   ;
N_NP7:            EQU     07                   ;
N_NP8:            EQU     08                   ;
N_NP9:            EQU     09                   ;
N_NP10:           EQU     10                   ;
N_NP11:           EQU     11                   ;
N_NP12:           EQU     12                   ;
N_NP13:           EQU     13                   ;
;
N_NPEND:          EQU     14                   ;wait CTS off
N_NPEND0:         EQU     15                   ;wait for respons transmit 0
N_NPEND1:         EQU     16                   ;wait for respons transmit 1
N_NPTX:           EQU     17                   ;data transmit task
N_NPTX1:          EQU     18                   ;data transmit task 1
N_NPTX2:          EQU     19                   ;data transmit task 2
N_NPTX22:         EQU     20                   ;data transmit task 2.2
N_NPTX3:          EQU     21                   ;data transmit task 3
ERNUM:            EQU     22                   ;error number
;
;
;
;         NNPCP
;
;         norand portable communication protocol
;
NNPCP::
          ONIW    DPSW-RAM,NPCP                ;if NPCP mode
          RET                                  ;else
;
          LDAW    NPTSK-RAM                    ;get task no
          SLL     A                            ;*2
          TABLE                                ;get table add
          JB                                   ;jump to table add
NPTABLE:
          DW      NP0                          ; 0 wait CTS on
          DW      NP1                          ; 1 wait STX
          DW      NP2                          ; 2
          DW      NP3                          ; 3
          DW      NP4                          ; 4
          DW      NP5                          ; 5
          DW      NP6                          ; 6
          DW      NP7                          ; 7
          DW      NP8                          ; 8
          DW      NP9                          ; 9
          DW      NP10                         ;10
          DW      NP11                         ;11
          DW      NP12                         ;12
          DW      NP13                         ;13
```

```
        DW      NPEND               ;14 wait cts
        DW      NPEND0              ;15 wait for response transmit 0
        DW      NPEND1              ;16 wait for response transmit 1
        DW      NPTX                ;17 data transmit
        DW      NPTX1               ;18 data transmit
        DW      NPTX2               ;19 data transmit
        DW      NPTX22              ;20 data transmit
        DW      NPTX3               ;21 data transmit
        DW      NP_ERROR            ;22 error routine
;
;
;
NP0:
        ONI     PC,CTS              ;if CTS on
        JR      NP000               ;then jump
        SETMKH  MKSR
        RET                         ;
;
NP000:
        RESMKH  MKSR                ;RX interrupt mask reset (=enable) RGA
;       07.21.88
;
;       check error occur
;
        OFFIW   PRTFL1-RAM,VHIH+VHIL+VLOW+MVERR+PEERR+COVER
        JR      NP00                ;error occur
;
;       06.28.88 at norand *
;                                   ;then
        LHLD    IB_CNT              ;*counter restore
        LXI     EA,00               ;*
        DEQ     EA,H                ;*if counter = 0
        RET                         ;*
;
;       07.21.88
;
NP00:
;
;
;       *7/13
        MOV     A,RXB               ;read
;
        SKNIT   ER                  ;error flag reset
        NOP
        RESW    NPFLG0,RXER+RXDEX
;
        RESMKH  MKSR                ;RX interrupt mask reset (=enable) RGA
;
        MVIW    NPTSK-RAM,N_NP1     ;set next task number
;
        SETW    NPFLG1,NPWAT        ;NPCP wait flag set
;
;
;       check error occur
;
        OFFIW   PRTFL1-RAM,VHIH+VHIL+VLOW+MVERR+PEERR+COVER
        JR      NP01                ;error occur
;
        LXI     H,0                 ;
        SHLD    STPTIM              ;clear
;
NP01:
        LHLD    IW_PTR              ;load pointer
        SHLD    S_IW_PTR            ;store
;
        SHLD    M_IW_PTR            ;store for npcp
```

```
        SHLD    M_IR_PTR                ;store for npcp
;
        LHLD    IB_CNT                  ;load counter
        SHLD    S_IB_CNT                ;store
;
        LXI     H,0                     ;clear
        SHLD    M_IB_CNT                ;counter clear
;
;       *7/13
        RESPB   RTS+DTR                 ;RTS on  (goto data receive)
;
        RET
;
NP1:
        CALL    NEXT_DATA               ;get next data
;
        EQIW    SVRXD-RAM,02H           ;if data = 02H = STX
        JMP     NP_ERRORS               ;else  goto error routine
        CALL    CRCINI                  ;CRC check initialize
;
        MVIW    NPTSK-RAM,N_NP2         ;set next task number
        RET
;
NP2:
        CALL    NEXT_DATA               ;get next data
;
        EQIW    SVRXD-RAM,01H           ;if data = 01H = dev. add.
        JMP     NP_ERRORS               ;else  goto error routine
        LDAW    SVRXD-RAM
        CALL    CKCRC                   ;CRC check
        MVIW    NPTSK-RAM,N_NP3         ;set next task number
        RET
;
NP3:
        CALL    NEXT_DATA               ;get next data
        LDAW    SVRXD-RAM
        CALL    CKPAR                   ;parity check   cy = 1 = error
        SKN     CY
        JMP     NP_ERRORS               ;parity error occured
        LDAW    SVRXD-RAM
        STAW    NPBUF1-RAM              ;save length1
        CALL    CKCRC                   ;CRC check
        MVIW    NPTSK-RAM,N_NP4         ;set next task number
        RET
;
NP4:
        CALL    NEXT_DATA               ;get next data
        LDAW    SVRXD-RAM
        CALL    CKPAR                   ;parity check   cy = 1 = error
        SKN     CY
        JMP     NP_ERRORS               ;parity error occured
        LDAW    SVRXD-RAM
        STAW    NPBUF2-RAM              ;save length2
        CALL    CKCRC                   ;CRC check
;
;       remain buffer size check
;
        LDAW    NPBUF2-RAM              ;get length2
        SLL     A
        MOV     C,A                     ;save
        LDAW    NPBUF1-RAM              ;get length1
        SLR     A
        RLR     C                       ;(C) <- low byte
        ANI     A,03FH
        MOV     B,A                     ;(B) <- high byte  (BC) <- length
        SBCD    SVLNGT                  ;save length
```

```
        LXI     EA,06               ;
        DLT     EA,B                ;if 6 >= length
        JR      NP44                ;then
                                    ;else
;
        LDED    IB_CNT              ;input buffer counter
        DMOV    EA,D
        DADD    EA,B                ;length + buffer counter
        LXI     D,IBVAL-20          ;buffer size - 20 byte
        DLT     EA,D                ;(length+buffer) < (buffer size - 20)
        JR      NP45                ;else buffer full
                                    ;then not full
;
NP44:
        RESW    NPFLG0,BFUL         ;buffer ful flag reset
        MVIW    NPTSK-RAM,N_NP5     ;set next task number
        RET
;
NP45:
        SETW    NPFLG0,BFUL         ;buffer full flag set
        MVIW    NPTSK-RAM,N_NP5     ;set next task number
        RET
NP5:
        CALL    NEXT_DATA           ;get next data
        LDAW    SVRXD-RAM           ;get control field
        STAW    NPBUF3-RAM          ;save
        CALL    CKCRC               ;CRC check
        CALL    DECUNT              ;decriment length counter
        SKN     CY                  ;if end
        JMP     NPCP50              ;then
                                    ;else
;
        MVIW    NPTSK-RAM,N_NP6     ;set next task number
        RET
;
NP6:
        CALL    NEXT_DATA           ;get next data
        LDAW    SVRXD-RAM           ;get channel
        STAW    NPBUF4-RAM          ;save
        CALL    CKCRC               ;CRC check
        CALL    DECUNT              ;decriment length counter
        SKN     CY                  ;if end
        JMP     NPCP50              ;then
                                    ;else
;
        MVIW    NPTSK-RAM,N_NP7     ;set next task number
        RET
NP7:
        CALL    NEXT_DATA           ;get next data
        LDAW    SVRXD-RAM           ;get channel
        STAW    NPBUF5-RAM          ;save
        CALL    CKCRC               ;CRC check
        CALL    DECUNT              ;decriment length counter
        SKN     CY                  ;if end
        JMP     NPCP50              ;then
                                    ;else
;
        MVIW    NPTSK-RAM,N_NP8     ;set next task number
        RET
;
NP8:
        CALL    NEXT_DATA           ;get next data
        LDAW    SVRXD-RAM           ;get TH
STAW    NPBUF6-RAM                  ;save
CALL    CKCRC                       ;CRC check
CALL    DECUNT                      ;decriment length counter
SKN     CY                          ;if end
JMP     NPCP50                      ;then
                                    ;else
MVIW    NPTSK-RAM,N_NP9             ;set next task number
RET
```

```
;
NP9:
        CALL    NEXT_DATA               ;get next data
        LDAW    SVRXD-RAM               ;get TH + 1
        STAW    NPBUF7-RAM              ;save
        CALL    CKCRC                   ;CRC check
        CALL    DECUNT                  ;decriment length counter
        SKN     CY                      ;if end
        JMP     NPCP50                  ;then
                                        ;else
;
        MVIW    NPTSK-RAM,N_NP10        ;set next task number
        RET
;
NP10:
        CALL    NEXT_DATA               ;get next data
        LDAW    SVRXD-RAM               ;get TH + 2
        STAW    NPBUF8-RAM              ;save
        CALL    CKCRC                   ;CRC check
        CALL    DECUNT                  ;decriment length counter
        SKN     CY                      ;if end
        JMP     NPCP50                  ;then
;
        MVIW    NPTSK-RAM,N_NP11        ;set next task number
;
        RET
;
;       input to receive buffer
;
NP11:
NPCP20:
        CALL    NEXT_DATA               ;get next data
        LDAW    SVRXD-RAM               ;
;
        OFFIW   NPFLG0-RAM,BFUL         ;if buffer full flag set
        JR      NPCP25                  ;then
;
        LHLD    S_IW_PTR
        STAX    H+                      ;store data & renew pointer
        LXI     EA,IN_BUF+IBVAL         ;in buffer end point
        DNE     EA,H                    ;if buffer end
        LXI     H,IN_BUF                ;then renew pointer
        SHLD    S_IW_PTR
        LHLD    S_IB_CNT                ;load receive data counter
        INX     H                       ;renew
        SHLD    S_IB_CNT
NPCP25:
        CALL    CKCRC                   ;goto CRC check
        CALL    DECUNT                  ;length decriment
        SKN     CY                      ;if end
        JMP     NPCP50
        RET                             ;get next data
;
;
;       get  CRC
;
NPCP50:
        MVI     A,00
        CALL    CKCRC                   ;
;
        MVI     A,00
        CALL    CKCRC                   ;last 16 bit check
;
        MVIW    NPTSK-RAM,N_NP12        ;set next task number
        RET
;
NP12::
        CALL    NEXT_DATA               ;get next data
```

```
;
        LDAW    SVRXD-RAM
        STAW    SCRCH-RAM            ;save
;
        MVIW    NPTSK-RAM,N_NP13     ;set next task number
        RET
;
NP13::
        CALL    NEXT_DATA            ;get next data
;
        LDAW    SVRXD-RAM
        STAW    SCRCL-RAM            ;save
;
;       CRC check
;
        MOV     EAL,A                ;2nd byte set
        LDAW    SCRCH-RAM            ;load  1st byte
        MOV     EAH,A                ;EA <- get CRC
        LDED    CRCL                 ;get generated CRC  (D)<- 1st,(E)<- 2nd
        DEQ     EA,D                 ;if get CRC = generated CRC
        JMP     NP_ERROR0            ;else
;
;       LLC check
;
        LDAW    NPBUF3               ;get control field
;
;       frame check
;
        MOV     B,A                  ;save
        ANI     A,0FH                ;mask
        EQI     A,0FH                ;if U_frame
        JMP     LLC09                ;else
                                     ;then U_frame
;
        MOV     A,B
        ANI     A,070H
        NEI     A,N_DISC             ;if command is DISC
        JMP     DISC                 ;then
;
        MOV     A,B
        ANI     A,070H
        NEI     A,N_SNRM             ;if command is SNRM
        JMP     SNRM                 ;then
;
        MOV     A,B
        ANI     A,070H
        NEI     A,N_RESET            ;if command is RESET
        JMP     RESET                ;then
;
        MOV     A,B
        ANI     A,070H
        NEI     A,N_XID              ;if command is XID
        JMP     XID                  ;then
                                     ;else command error
;
        JMP     NP_ERRORS            ;else  goto error routine
;
LLC09:
;
;       mode check
;
        ONIW    NPMOD,NDM            ;if NDM
        JR      LLC10                ;else
        JMP     MNDM                 ;then goto NDM
;
;       check frame
;
LLC10::
        ONI     A,01H                ;B1 bit check
        JMP     I_FM                 ;off = I_frame
                                     ;on  = S_frame
;
        ONI     A,04H                ;RR or RNR check
```

```
        JMP     S_RR                            ;RR message
        JMP     S_RNR                           ;RNR message
;
;       I_frame mode
;
I_FM::
        CALL    CKNRNS                          ;check NR & NS number
        CALL    CHNCK                           ;channel check
        SKN     CY
        JMP     I_ERR                           ;I_frame error routine
;
;       check command
;
        LDAW    NPBUF6-RAM                      ;get TH
        NEI     A,N_BIND                        ;if bind mode
        JMP     BIND                            ;then
        NEI     A,N_TERM                        ;if term=sess mode
        JMP     TERM                            ;then
        NEI     A,N_PRES                        ;if presentation layer message
        JMP     PRES                            ;then
        JMP     I_ERR                           ;else error mode
;
;
;       NPTX
;
;       data transmit routine
;
NPTX:
;
;       ONI     PC,CTS                          ;if CTS on        DEL 0913
;       RET                                     ;then             DEL 0913
;                                               ;else
;       *7/13
;       RESFB   RTS+DTR                         ;RTS on   (goto data reDEL0913
;-
        LXI     H,1000                          ;
        SHLD    CRCL                            ;wait counter value set
;
        MVIW    NPTSK-RAM,N_NPTX1               ;set next task number
        RET
;
NPTX1:
        OFFI    PC,CTS                          ;if CTS on
        JRE     NPTX11                          ;else
                                                ;then
;
        LDAW    TXCNT-RAM                       ;Tx data counter
        STAW    S_TXCNT-RAM                     ;save for retry
;
        SETSMH  SMHTXE                          ;tx enable
;
;       test    1 line  ;*
;
;       RESMKH  MKST                            ;TX interrupt mask reset (=enable)
;
        MVIW    NPTSK-RAM,N_NPTX2               ;set next task number
        RET
;
NPTX11:
        LHLD    CRCL                            ;counter load
        DCX     H
        MOV     A,L
        ORA     A,H
        SK      Z                               ;if end
        JRE     NPTX111                         ;else
                                                ;then
;
        LDAW    TXCNT-RAM                       ;Tx data counter
```

```
        STAW    S_TXCNT-RAM                 ;save for retry
;
        JMP     NP_ERRORS                   ;else  goto error routine
;
NPTX111:
        SHLD    CRCL
        RET                                 ;not end
;
;
NPTX2::
;
;       test    3 line  ;*
;
;       MOV     A,SMH                       ;check Tx end
;       OFFI    A,SMHTXE                    ;if Tx end
;       RET                                 ;else
;
;
;*********************************************************************
;
;
        SKIT    FST                         ;if Tx buffer empty
        RET                                 ;else
                                            ;then
;
        DCRW    TXCNT-RAM                   ;Tx data counter decriment
        JR      NPTX200                     ;not end
                                            ;Tx end
;
        RESSMH  SMHTXE                      ;tx disable
;
;;;;;   SETMKH  MKST  <-   kill             ;TX interrupt mask set (=disable)
;
        JR      NPTX260
;
NPTX200:
        LXI     EA,NPSND1                   ;NPCP buffer top address
        LDAW    SVRXD-RAM                   ;Tx data counter load
        EADD    EA,A                        ;set address
        DMOV    H,EA
        LDAX    H                           ;now Tx data load
        MOV     TXB,A                       ;TX data buffer write
        INRW    SVRXD-RAM                   ;counter increment
        RET
;
NPTX260:
;
;****************************************************
;
;                                           ;then
;       LXI     H,100                       ;                  DEL 0913
;       SHLD    CRCL                        ;wait counter value setDEL0913
;
;       MVIW    NPTSK-RAM,N_NPTX22          ;set next task number DEL0913
;       RET                                                    DEL 0913
;
NPTX22:
;       LHLD    CRCL                        ;counter load      DEL 0913
;       DCX     H                                              DEL 0913
;       MOV     A,L                                            DEL 0913
;       ORA     A,H                                            DEL 0913
;       SK      Z                           ;if end            DEL 0913
;       JRE     NPTX221                     ;else              DEL 0913
;                                           ;then
;       SETPB   RTS                         ;RTS off  (stop da DEL0913
;
;       MVIW    NPTSK-RAM,N_NPTX3           ;set next task number
;
;       06.27.88 at norand *
;
```

```
;
;
        ONIW    NPFLG0,RCVPTC          ;*if print command receive flag set
        RET                            ;*
;
        RESW    NPFLG0,RCVPTC          ;*print command receive flag reset
;
        LDED    S_IW_PTR               ;*
        SDED    IW_PTR                 ;*pointer restore
;
        LDED    S_IB_CNT               ;*
        SDED    IB_CNT                 ;*counter restore
;
        RET                            ;*
;
;
NPTX221:
        SHLD    CRCL                                      DEL 0913
;       RET                            ;not end           DEL 0913
;
;
;
NPTX3:
        ONI     PC,CTS                 ;if CTS on
        RET                            ;then
;
        MVIW    NTSK-RAM,N_NPU         ;first task number set
;
        RESW    NPFLG1,NPWAT           ;NPCP wait flag reset
;
;
;       test
;
;
;       ONIW    NPFLG0,RCVPTC          ;if print command receive flag set
;       RET
;
;       RESW    NPFLG0,RCVPTC          ;print command receive flag reset
;
;       LDED    S_IW_PTR
;       SDED    IW_PTR                 ;pointer restore
;
;       LDED    S_IB_CNT
;       SDED    IB_CNT                 ;counter restore
;
        RET
;
;
;       wait CTS off
;
NPEND:
;
;       ONI     PC,CTS                 ;if CTS off        DEL 0913
;       RET                            ;else              DEL 0913
;                                      ;then
        SETPB   RTS                    ;RTS off  (goto data not receive)
        SETMKH  MKSR                   ;RX interrupt mask reset (=disable)
;
;
;       test
;
;
        ONIW    NPFLG0,RCVPTC          ;if print command receive flag set
        JR      NPEND01
;
        RESW    NPFLG0,RCVPTC          ;print command receive flag reset
;
;
;       06.27.88 at norand *
;
```

```
;*      LDED    S_IW_PTR
;*      SDED    IW_PTR                  ;pointer restore
;
;*      LDED    S_IB_CNT
;*      SDED    IB_CNT                  ;counter restore
;
NPEND01:
        EQIW    TXCNT-RAM,00            ;if have Tx data
        JR      NPEND00                 ;then
;
        MVIW    NPTSK-RAM,N_NP0         ;first task number set
;
        RET
;
NPEND00:
;
;       LXI     H,80                    ;                  DEL 0913
;       SHLD    CRCL                    ;wait counter value set DEL0913
;
;       MVIW    CRCL-RAM,100
;
;       MVIW    NPTSK-RAM,N_NPEND0      ;next task number set DEL 0913
;       RET                                                DEL 0913
;
;
;       NPEND0
;
;       wait for response transmit 0
;
NPEND0:
        LHLD    CRCL                    ;counter load DEL 0913
;       DCX     H                                          DEL 0913
;       MOV     A,L                                        DEL 0913
;       ORA     A,H                                        DEL 0913
;       SK      Z                       ;if end            DEL 0913
;       JRE     NPEND001                ;else              DEL 0913
;                                       ;then
        MVIW    NPTSK-RAM,N_NPEND1      ;next task number set
        RET
;
NPEND001:
;       SHLD    CRCL                                       DEL 0913
;       RET                             ;not end           DEL 0913
;
;
;
;
;       NPEND1
;
;       wait for response transmit 1
;
NPEND1:
;
;       check error occur
;
        ONIW    NPFLG0-RAM,F_BIND       ;if already BIND command received
        JRE     NPEND1A                 ;else
;                                       ;then
        OFFIW   PRTFL1-RAM,VHIH+VHIL+VLOW+MVERR+PEERR+COVER
        JRE     NPEND16                 ;error occur
;
NPEND1A:
        OFFIW   NPFLG0-RAM,RCVPTC       ;if print command receive flag set
        JR      NPEND12                 ;then
;
        RESW    NPFLG1,GTRR             ;get normal RR command flag reset
        MVIW    NPTSK-RAM,N_NPTX        ;next task number set
        RET
```

```
;
NPEND12:
;
;06.27.88 at norand      RESW    NPFLG1,NPWAT            ;NPCP wait flag reset
;
;       ***************************************
;
;
;06.27.88 at norand      LHLD    IB_CNT                  ;counter restore
;06.27.88 at norand      LXI     EA,00                   ;
;06.27.88 at norand      DEQ     EA,H                    ;if counter = 0
;06.27.88 at norand      RET                             ;
;
;****************************************
;       OFFIW   PRTFL2-RAM,PRTING       ;if printing now
;       RET                             ;then return
;****************************************
;06.27.88 at norand      SETW    NPFLG1,NPWAT            ;NPCP wait flag reset
;
;       check TX data exist
;
        CALL    CKTXD                   ;check TX data exist
;
        ONIW    NPFLG0-RAM,EXTXD        ;if Tx data exist
        JR      NPEND13                 ;else  RR send
;
;       TX data exist
;
        CALL    SETPRES                 ;I_frame Tx
;
NPEND13:
;       06.27.88 at norand *
;
;*      RESW    NPFLG0,RCVPTC           ;print command receive flag reset
;
        RESW    NPFLG1,GTRR             ;get normal RR command flag reset
;
        MVIW    NPTSK-RAM,N_NPTX        ;next task number set
        RET
;
NPEND16:
;
;       error occur
;
        OFFIW   NPFLG0-RAM,RCVPTC       ;if print command receive flag set
        JR      NPEND18                 ;then
;
        OFFIW   NPFLG1-RAM,GTRR         ;get normal RR command flag reset
NPEND18:
        CALL    SETERCD                 ;set error command
;
;       06.27.88 at norand *
;
;*      RESW    NPFLG0,RCVPTC           ;print command receive flag reset
;
        RESW    NPFLG1,GTRR             ;get normal RR command flag reset
        MVIW    NPTSK-RAM,N_NPTX        ;next task number set
        RET
;
;
;
NP_EX:
;*************************************************
;       for test
;
;       MVIW    NPTSK-RAM,N_NP0         ;first task number set
;
;       SETMKH  MKSR                    ;Rx interrupt disable
```

```
;       RET
;
;*************************************************
;
;
;
        MVIW    TXCNT-RAM,00            ;set no Tx data
;
        MVIW    NPTSK-RAM,N_NPEND       ;end task number set
;
        RET
;
;
;
;
;       subroutine
;
;       NEXT_DATA
;
;       get next data  if error occured then goto error routine
;
NEXT_DATA::
        OFFIW   NPFLG0,RXER             ;if RX error occur
        JMP     NEXT_DEXT               ;goto error routine
;
;       ONIW    NPFLG0,RXDEX            ;if data receive
;       JR      NEXT_DA1                ;else
;       RESW    NPFLG0,RXDEX
;       RET
;
        LHLD    M_IB_CNT
        MOV     A,H
        ORA     A,L
        SKN     Z                       ;if data receive
        JR      NEXT_DA1                ;else
;
        DI
        LHLD    M_IR_PTR                ;load read pointer
        LDAX    H+                      ;load data & renew pointer
        LXI     EA,IN_BUF+IBVAL         ;buffer end pointer
        DNE     EA,H                    ;if buffer end
        LXI     H,IN_BUF                ;then renew pointer
        SHLD    M_IR_PTR
;
        STAW    SVRXD-RAM
;
        LHLD    M_IB_CNT
        DCX     H
        SHLD    M_IB_CNT
;
        EI
        RET
;
NEXT_DA1:
        POP     H                       ;kill return address
;
        OFFI    PC,CTS                  ;if CTS off
        JR      NP_ERRORS               ;then
                                        ;else
;
        RET
;
NEXT_DEXT:
        INRW    NPERCT-RAM              ;MAC error counter increment
        MVIW    NPTSK-RAM,ERNUM         ;error number set
        POP     H                       ;kill return address
        RESW    NPFLG0,RXER+RXDEX
```

```
        RET
;
;       NP_ERRORS
;
;       NPCP error mode set
;
NP_ERRORS:
        INRW    NPERCT-RAM              ;MAC error counter increment
        MVIW    NPTSK-RAM,ERNUM         ;error number set
        RET
;
;
;       NP_ERROR
;
;       NPCP error routine
;
NP_ERROR:
;
        ONI     PC,CTS                  ;if CTS off
        RET                             ;else
NP_EREX:
        MVIW    NPTSK-RAM,N_NP0         ;first task number set
;
        SETPB   RTS                     ;RTS off  (goto data not receive)
        SETMKH  MKSR                    ;Rx interrupt disable
        RESW    NPFLG1,NPWAT            ;NPCP wait flag reset
;       *7/13
        MOV     A,RXB                   ;read
;
        SKNIT   ER                      ;error flag reset
        NOP
        RESW    NPFLG0,RXER+RXDEX
        RET
;
;
;       NP_ERROR0
;
;       NPCP error routine 0
;
NP_ERROR0::
;
        INRW    NPERCT-RAM              ;MAC error counter increment
        MVIW    NPTSK-RAM,ERNUM         ;error number set
        JR      NP_ERROR
;
;
;
SETSTX:
        MVIW    NPSND1-RAM,02H          ;02H = STX set
        CALL    CRCINI                  ;CRC check initialize
;
        MVI     A,01H                   ;01H = dev. add.
        STAW    NPSND2-RAM
        CALL    CKCRC                   ;CRC check
        RET
;
;
LENSET:
        CALL    SETLEN                  ;set length routine
        MOV     A,H
        STAW    NPSND3-RAM              ;length 1 set
        CALL    CKCRC                   ;CRC check
;
        MOV     A,L
        STAW    NPSND4-RAM              ;length 2 set
        CALL    CKCRC                   ;CRC check
        RET
```

```
;
;       I_ERR
;
;       I_frame error
;
;       do nothing bat send  S_frame
;
;       send back term-sess response
;
I_ERR:
;
;       response to message
;
        CALL    SETSTX                  ;STX & dev. add. set
;
        MVI     A,6                     ;length set 6
        CALL    LENSET                  ;length set
;
;       control field set
;
;
        MVI     B,SS_IFR                ;I-frame set
        LDAW    NRCNT-RAM               ;load
        SLL     A
        SLL     A
        SLL     A
        SLL     A
        ORA     B,A
;
        LDAW    NSCNT-RAM               ;load
        SLL     A
        ORA     A,B
;
        INRW    NSCNT-RAM
        ANIW    NSCNT-RAM,07H           ;mask
;
        STAW    NPSND5-RAM              ;set control field
        CALL    CKCRC                   ;CRC check
;
        LDAW    NPBUF4                  ;channel high
        STAW    NPSND6-RAM              ;
        CALL    CKCRC                   ;CRC check
;
        LDAW    NPBUF5                  ;channel low
        STAW    NPSND7-RAM              ;
        CALL    CKCRC                   ;CRC check
;
        MVI     A,N_TERM                ;TH  31H term-sess command
        STAW    NPSND8-RAM              ;
        CALL    CKCRC                   ;CRC check
;
        MVI     A,02H                   ;term-sess value
        STAW    NPSND9-RAM              ;
        CALL    CKCRC                   ;CRC check
;
        MVI     A,00H                   ;reason
        STAW    NPSND9+1-RAM            ;
        CALL    CKCRC                   ;CRC check
;
        MVI     A,00
        CALL    CKCRC                   ,
;
        MVI     A,00
        CALL    CKCRC                   ;last 16 bit check
;
        LDAW    CRCH-RAM                ;get generated CRC H
        STAW    NPSND9+2-RAM            ;CRC set
```

```
;
        LDAW    CRCL-RAM                ;get generated CRC L
        STAW    NPSND9+3-RAM            ;CRC set
;
        MVIW    TXCNT-RAM,12            ;Tx data counter set
        MVIW    SVRXD-RAM,0             ;Tx data loop counter set
;
;       MVIW    NPMOD-RAM,RSP           ;RSP  set
;
        MVIW    NPTSK-RAM,N_NPEND       ;end task number set
;
        RET
;
;
;
;       DECUNT
;
;       decriment length counter
;
;       SVLNGT <- SVLNGT - 1
;
;       ext.    cy = 1 end.     cy = 0 not end.
;
DECUNT:
        LDED    SVLNGT                  ;get lengtnvalue
        DCX     D
        MOV     A,E
        ORA     A,D
        SK      Z                       ;if end
        JR      DECUN1                  ;else
        STC                             ;end set
        RET
DECUN1:
        CLC                             ;not end set
        SDED    SVLNGT                  ;
        RET
;
;
;       NPINIT  NPCP initialize routine
;
NPINIT::
        ONIW    DPSW-RAM,NPCP           ;if NPCP mode
        RET                             ;else
                                        ;then
;
        MVI     A,0
        STAW    NPTSK-RAM               ;set NPCP task no
        STAW    NPERCT-RAM              ;error counter clear
;
        MVIW    NPMOD-RAM,NDM           ;NDM node set
;
        RET
;
;
;       NPINIT  NPCP initialize routine from back up mode
;
NPINITB::
        ONIW    DPSW-RAM,NPCP           ;if NPCP mode
        RET                             ;else
                                        ;then
;
;       MVI     A,0
;       STAW    NPTSK-RAM               ;set NPCP task no
;
;       MVIW    NPMOD-RAM,NDM           ;NDM node set
;
        RET
;
```

```
;
;
;       CKCRC
;
;       cyclic redundancy check
;
;       X^16 + X^15 + X^2 + 1
;
;       It is the same as that sued in bisync
;
;       ent.    (A) <- now code
;       ext.    CRCH,CRCL  <- CRC16
;
;       keep    (B),(H),(L)
;
CKCRC:
        LXI     D,CRCL
        LDEAX   D                       ;EAL <- CRCL EAH <- CRCH
        MVI     C,8-1                   ;loop counter set
        LXI     D,0A001H                ;polynominal  X^16 + X^15 + X^2 + 1
CKCRC0:
        SLR     A                       ;shift right
        DRLR    EA                      ;rotate right
        SKN     CY                      ;cy = 1
        JRE     CKCRC2                  ;then
CKCRC1:
        DCR     C                       ;shift end ?
        JRE     CKCRC0                  ;not end
        LXI     D,CRCL
        STEAX   D                       ;save CRCL,CRCH
        RET
CKCRC2:
        DXR     EA,D                    ;xor
        JRE     CKCRC1                  ;goto next bit
;
;
;
;       CRCINI
;
;       CRC initialize
;
CRCINI:
        MVI     A,00                    ;clear data
        STAW    CRCH-RAM
        STAW    CRCL-RAM                ;clear
        RET
;
;
;
;
;       CKPAR
;
;       check parity bit for length code
;
;       ent. (A) <- code
;       ext. cy = 1 error.   cy = 0 ok.
;
CKPAR:
        PUSH    B
        MVI     B,0                     ;clear
        MVI     C,8-1                   ;loop counter set
CKPAR0:
        SLLC    A                       ;if  cy = 1
        JRE     CKPAR5                  ;else
        INR     B                       ;then
        nop                             ;guard to skip
```

```
CKPAR6:
        DCR     C                       ;shift end ?
        JRE     CKPAR3                  ;not end
CKPAR1:                                 ;shift end
        EQI     B,0                     ;if B = 0
        JRE     CKPAR2                  ;else
        STC                             ;then error
        POP     B
        RET
CKPAR2:
        CLC                             ;cy <- 0 ok
        POP     B
        RET
CKPAR3:
        SLLC    A                       ;if cy = 1
        JRE     CKPAR6                  ;else
        DCR     B                       ;then
        nop                             ;guard to skip
CKPAR5:
        DCR     C                       ;shift end
        JRE     CKPAR0                  ;not end
        JRE     CKPAR1                  ;end
;
;
;
;       SETLEN
;
;       set length data for NPCP code with parity bit
;
;       ent. (A) <- length    1=<  =<128
;       ext. (H) = length high ,(L) = length low
;
SETLEN::
        MVI     H,80H
        MOV     L,A                     ;save
        CALL    CKPAR                   ;check parity
        SK      CY                      ;if even
        RET                             ;else odd
        ORI     L,80H                   ;MSB on
        RET
;
;
;
;       CHNCK
;
;       channel check
;
;       ext.    Cy = 1 not ok.   cy = 0 ok.
;
CHNCK:
;
        OFFIW   NPFLG0-RAM,F_BIND       ;if already BIND command received
        JR      CHNC20                  ;then
                                        ;else
;
        LHLD    NPBUF4                  ;get channel code
        SHLD    S_CHAN                  ;save channel area
                                        ;for BIND command
;
CHNC12:
        CLC                             ;
        RET
;
CHNC20:
        LHLD    NPBUF4                  ;get channel code
        DMOV    EA,H
        LHLD    S_CHAN                  ;get current channel code
;
```

```
        DNE     EA,H                    ;if now channel code = current code
        JR      CHNC12                  ;then
;
        STC
        RET
;
;
;
;
;       SETFRM
;
;       FRMR command set routine
;
;       ent.    (B) <- error number
;
SETFRM:
        CALL    SETSTX                  ;STX & dev. add. set
;
        MVI     A,2                     ;length set 2
        CALL    LENSET                  ;length set
;
        MVI     A,S_FRMR                ;FRMR set
        STAW    NPSND5-RAM              ;set control field
        CALL    CKCRC                   ;CRC check
;
        MOV     A,B                     ;error command set
        STAW    NPSND6-RAM              ;set control field
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND7-RAM              ;CRC set
;
        LDAW    CRCL-RAM                ;get generated CRC L
        STAW    NPSND8-RAM              ;CRC set
;
        MVIW    TXCNT-RAM,8             ;Tx data counter set
        MVIW    SVRXD-RAM,0             ;Tx data loop counter set
;
        RET
;
;
;
;       SETRR
;
;       RR command set routine
;
;       ent.    (B) <- NR number
;
;
SETRR:
        CALL    SETSTX                  ;STX & dev. add. set
;
        MVI     A,1                     ;length set 1
        CALL    LENSET                  ;length set
;
        MVI     A,SS_RR                 ;RR set
        ORA     A,B                     ;NR set
        STAW    NPSND5-RAM              ;set control field
        CALL    CKCRC                   ;CRC check
;
```

```
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND6-RAM              ;CRC set
;
        LDAW    CRCL-RAM                ;get generated CRC L
        STAW    NPSND7-RAM              ;CRC set
;
        MVIW    TXCNT-RAM,7             ;Tx data counter set
        MVIW    SVRXD-RAM,0             ;Tx data loop counter set
;
        RET
;
;
;       SETRNR
;
;       RNR command set routine
;
;       ent.    (B) <- NR number
;
;
SETRNR:
        CALL    SETSTX                  ;STX & dev. add. set
;
        MVI     A,1                     ;length set 1
        CALL    LENSET                  ;length set
;
        MVI     A,SS_RNR                ;RNR set
        ORA     A,B                     ;NR set
        STAW    NPSND5-RAM              ;set control field
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND6-RAM              ;CRC set
;
        LDAW    CRCL-RAM                ;get generated CRC L
        STAW    NPSND7-RAM              ;CRC set
;
        MVIW    TXCNT-RAM,7             ;Tx data counter set
        MVIW    SVRXD-RAM,0             ;Tx data loop counter set
;
        RET
;
;
;
;
;       SETUA
;
;       UA command set routine
;
;
SETUA::
        CALL    SETSTX                  ;STX & dev. add. set
;
        MVI     A,1                     ;length set 1
        CALL    LENSET                  ;length set
```

```
;
        MVI     A,S_UA                  ;UA set
        STAW    NPSND5-RAM              ;set control field
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND6-RAM              ;CRC set
;
        LDAW    CRCL-RAM                ;get generated CRC L
        STAW    NPSND7-RAM              ;CRC set
;
        MVIW    TXCNT-RAM,7             ;Tx data counter set
        MVIW    SVRXD-RAM,0             ;Tx data loop counter set
;
        RET
;
;
;
;
;       IFRAME
;
;       I_frame Tx routine
;
;IFRAME:
;       RET
;
;
;
;
;       DISC
;
;       disconnect mode  (NDM)
;
DISC:
        CALL    SETUA                   ;UA command set
;
        MVIW    NPMOD-RAM,NDM           ;NDM mode set
;
        MVIW    NPTSK-RAM,N_NPEND       ;end task number set
;
        RET
;
;
;
;       SNRM
;
;       normal response mode  (NRM)
;
SNRM:
        CALL    SETUA                   ;UA command set
;
        MVIW    NSCNT-RAM,0             ;reset  kill !
;
        MVIW    NRCNT-RAM,0             ;reset
;
        MVIW    TXOKC-RAM,0             ;reset
        MVIW    PSEQC-RAM,0             ;reset
        MVIW    SEQPCT-RAM,0            ;reset
        MVIW    PASSP-RAM,0             ;reset
        MVIW    SEQPTR-RAM,0            ;reset
```

```
        MVIW    SEQPTR+1-RAM,0          ;reset
;
        MVIW    NPMOD-RAM,NRM           ;NRM (normal response mode) set
;
        MVIW    NPTSK-RAM,N_NPEND       ;end task number set
;
        RESW    NPFLG0,F_BIND           ;cancel communication
;
        RET
;
;       XID
;
;       exchange identification
;
XID:
        CALL    SETSTX                  ;STX & dev. add. set
;
        MVI     A,12                    ;length set 12
        CALL    LENSET                  ;length set
;
        MVI     A,S_XID                 ;
        STAW    NPSND5-RAM              ;set control field
        CALL    CKCRC                   ;CRC check
;
        MVI     A,00H                   ;link type
        STAW    NPSND6-RAM              ;
        CALL    CKCRC                   ;CRC check
;
        MVI     A,02H                   ;device type type  high
        STAW    NPSND7-RAM              ;
        CALL    CKCRC                   ;CRC check
;
        MVI     A,05H                   ;device type type  low
        STAW    NPSND8-RAM              ;
        CALL    CKCRC                   ;CRC check
;
        MVI     A,XVR1                  ;Ver. no.
        STAW    NPSND9-RAM              ;
        CALL    CKCRC                   ;CRC check
;
        MVI     A,XVR2                  ;Rev. no.
        STAW    NPSND9+1-RAM            ;
        CALL    CKCRC                   ;CRC check
;
        MVI     A,00H                   ;serial. no.
        STAW    NPSND9+2-RAM            ;
        CALL    CKCRC                   ;CRC check
;
        MVI     A,00H                   ;serial. no.
        STAW    NPSND9+3-RAM            ;
        CALL    CKCRC                   ;CRC check
;
        MVI     A,00H                   ;serial. no.
        STAW    NPSND9+4-RAM            ;
        CALL    CKCRC                   ;CRC check
;
        MVI     A,00H                   ;serial. no.
        STAW    NPSND9+5-RAM            ;
        CALL    CKCRC                   ;CRC check
;
        MVI     A,00H                   ;session limit
        STAW    NPSND9+6-RAM            ;
        CALL    CKCRC                   ;CRC check
;
        MVI     A,01H                   ;session limit
        STAW    NPSND9+7-RAM            ;
```

```
        CALL    CKCRC                       ;CRC check
;
        MVI     A,00
        CALL    CKCRC                       ;
;
        MVI     A,00
        CALL    CKCRC                       ;last 16 bit check
;
        LDAW    CRCH-RAM                    ;get generated CRC H
        STAW    NPSND9+8-RAM                ;CRC set
;
        LDAW    CRCL-RAM                    ;get generated CRC L
        STAW    NPSND9+9-RAM                ;CRC set
;
        MVIW    TXCNT-RAM,18                ;Tx data counter set
        MVIW    SVRXD-RAM,0                 ;Tx data loop counter set
;
        MVIW    NPTSK-RAM,N_NPEND           ;end task number set
;
        RET
;
;
;       RESET
;
;       reset
;
RESET:
;
        MVIW    TXCNT-RAM,0                 ;Tx data counter set
        MVIW    NPMOD-RAM,NDM               ;NDM mode set
        MVIW    NPTSK-RAM,N_NPEND           ;end task number set
        ;
        MVI     A,ETSTP
        MOV     ETMM,A
        MVIW    ETMJOB-RAM,0
        ;
        SETMKL  TIMMSK+CRTMSK
        ;
        RESCP   HEAD                    ;head die
        ;
        CALL    PWROF##
        ;
        MVI     PA,PAINIT               ;set PA initialize data
        ;
        LXI     H,EXTINIT
        SHLD    POUTH1                  ;head data out port #1
        SHLD    POUTH2                  ;head data out port #2
        ;
        MVI     A,MOTOFF                ;motor off data
        MOV     MTOUT,A
        ;
        CALL    CPINIT##                ;initialize CPU mode & PA - PB reg
                                        ; without PC & SI/F & PI/F
        JMP     INIT3##                 ;reset rutine
;
;       JMP     TO RESET ROUTINE        ;nanimoshinaidemo reset ni jump sureba
;                                       ;NDM mode ni naru
;
        RET
;
;
;       MNDM
;
;       normal disconect mode   (NDM)
;
MNDM:
```

```
;
        MVI     B,ERNDM                 ;ERNDM set
MNDM1:
        CALL    SETFRM                  ;set FRMR command
;
        MVIW    NPMOD-RAM,NDM           ;NDM mode set
        MVIW    NPTSK-RAM,N_NPEND       ;end task number set
;
        RET
;
;
;       S_RR
;
;       receive ready message
;
S_RR:
;
        LDAW    NRCNT-RAM
        SLL     A
        SLL     A
        SLL     A
        SLL     A
        ANI     A,070H                  ;mask
        MOV     B,A                     ;save
;
        LDAW    NPBUF3-RAM              ;get control filed
;
        SLR     A
        SLR     A
        SLR     A
        SLR     A
        ANI     A,07H                   ;mask  get host NR no.
        EQAW    NSCNT-RAM               ;if received data = expected data
        JMP     S_RR30                  ;else
;
        PUSH    B
        CALL    CKTXD                   ;check TX data exist
        POP     B
;
        OFFIW   NPFLG0-RAM,EXTXD        ;if Tx data exist
        JMP     S_RR20                  ;then
;
;       input buffer full check
;
        OFFIW   NPFLG0-RAM,BFUL         ;if buffer full flag set
        JMP     NPBFUL                  ;then
;
;       check buffer remain value
;
;
        LHLD    S_IB_CNT                ;load
;       DMOV    EA,H
;       LXI     D,IBVAL-20              ;buffer size - 20 byte
;       DLT     EA,D                    ;(buffer) < (buffer size - 20)
;       JR      S_RR50                  ;else buffer full
;                                       ;then not full
        CALL    SETRR                   ;RR command Tx set
;
        SETW    NPFLG1,GTRR             ;get normal RR command
;
;       INRW    NRCNT-RAM
;       ANIW    NRCNT-RAM,07H           ;mask
;
        MVIW    NPMOD-RAM,NRM           ;NRM (normal response mode) set
;
        MVIW    NPTSK-RAM,N_NPEND       ;end task number set
;
        RET
```

```
;
;       buffer full
;
;S_RR50:
;                                   ;then not full
;       CALL    SETRNR              ;RNR command Tx set
;
;       INRW    NRCNT-RAM
;       ANIW    NRCNT-RAM,07H       ;mask
;
;       ONIW    NPMOD-RAM,NRM       ;if NRM mode
;       JR      S_RR51              ;else
;                                   ;then
;       MVIW    NPMOD-RAM,NDM       ;NDM  set
;
;       MVIW    NPTSK-RAM,N_NPEND   ;end task number set
;
;       RET
;
;S_RR51:
;       MVIW    NPMOD-RAM,NRM       ;NRM (normal response mode) set
;
;       MVIW    NPTSK-RAM,N_NPEND   ;end task number set
;
;       RET
;
;       TX data exist
;
S_RR20::
        CALL    SETPRES             ;I_frame Tx
        RET
;
;       INRW    NRCNT-RAM
;       ANIW    NRCNT-RAM,07H       ;mask
;
;       ;
;       ;keep last send buffer
;       ;
;
;       MVIW    NPMOD-RAM,RSP       ;RSP  set
;
;       MVIW    NPTSK-RAM,N_NPEND   ;end task number set
;
;       RET
;
;       NR <> NSCNT
;
S_RR30:
;
        INR     A                   ;
        ANI     A,07H               ;mask
        EQAW    NSCNT-RAM           ;if received data = expected data - 1
        JR      S_RR33              ;else
                                    ;then
;
        ONIW    NPMOD-RAM,NRM       ;if NRM mode
        JR      S_RR35              ;else
                                    ;then
;
S_RR33:
        MVI     B,NGNR              ;NR error set
        CALL    SETFRM              ;set FRMR command
;
        MVIW    NPMOD-RAM,NDM       ;NDM  set
;
        MVIW    NPTSK-RAM,N_NPEND   ;end task number set
;
        RET
;
S_RR35:
```

```
;        CALL     IFRAME                        ;I_frame Tx
;
;        INRW     NRCNT-RAM
;        ANIW     NRCNT-RAM,07H                 ;mask
;
;        ;
;        ;keep last send buffer
;        ;
;
         LDAW     S_TXCNT-RAM
         STAW     TXCNT-RAM                     ;Tx data counter set
;
         MVIW     SVRXD-RAM,0                   ;Tx data loop counter set
;
         MVIW     NPTSK-RAM,N_NPEND             ;end task number set
;
         RET
;
;
;
;
;        S_RNR
;
;        receive not ready message
;
S_RNR:
;
         LDAW     NRCNT-RAM
         SLL      A
         SLL      A
         SLL      A
         SLL      A
         ANI      A,070H                        ;mask
         MOV      B,A                           ;save
;
         LDAW     NPBUF3-RAM                    ;get control filed
         SLR      A
         SLR      A
         SLR      A
         SLR      A
         ANI      A,07H                         ;mask  get host NR no.
         EQAW     NSCNT-RAM                     ;if received data = expected data
         JRE      S_RNR20                       ;else
                                                ;then
;
;        input buffer full check
;
         OFFIW    NPFLG0-RAM,BFUL               ;if buffer full flag set
         JMP      NPBFUL                        ;then
;
         CALL     SETRR                         ;RR command Tx set
;
;        INRW     NRCNT-RAM
;        ANIW     NRCNT-RAM,07H                 ;mask
;
         MVIW     NPMOD-RAM,NRM                 ;NRM (normal response mode) set
;
         MVIW     NPTSK-RAM,N_NPEND             ;end task number set
;
         RET
;
S_RNR20:
         MVI      B,NGNR                        ;NR error set
         JMP      MNDM1
;
;
;
;        CKNRNS
;
```

```
;        check NR & NS number
;
CKNRNS:
;
;        check NS
;
         LDAW    NPBUF3-RAM              ;get control filed
;
         ANI     A,0EH                   ;NS mask
         SLR     A
         ANI     A,07H                   ;mask  get host NS no.
         NEAW    NRCNT-RAM               ;if received data = expected data
         JMP     CKNR00                  ;then
;
         INR     A                       ;
         ANI     A,07H                   ;mask
         EQAW    NRCNT-RAM               ;if received data = expected data - 1
         JR      CKNR83                  ;else
                                         ;then
;
         ONIW    NPMOD-RAM,NRM           ;if NRM mode
         JMP     CKNR85                  ;else
                                         ;then
         LDAW    NRCNT-RAM               ;              9/14/88 RGA
         SLL     A                       ;              9/14/88 RGA
         SLL     A                       ;              9/14/88 RGA
         SLL     A                       ;              9/14/88 RGA
         SLL     A                       ;              9/14/88 RGA
         ANI     A,070H                  ;mask          9/14/88 RGA
         MOV     B,A                     ;save          9/14/88 RGA
;
         CALL    SETRR                   ;RR command Tx set 9/14/88 RGA
         MVIW    NPMOD-RAM,NRM           ;NRM           set 9/14/88 RGA
         MVIW    NPTSK-RAM,N_NPEND       ;end task number set 9/14/88 RGA
         POP     H                       ;9/14/88 RGA
         RET                             ;9/14/88 RGA
;
CKNR83:
         MVI     B,NGNS                  ;NS error set
         CALL    SETFRM                  ;set FRMR command
;
         MVIW    NPMOD-RAM,NDM           ;NDM  set
;
         MVIW    NPTSK-RAM,N_NPEND       ;end task number set
;
         POP     H                       ;kill return address
;
         RET
;
CKNR85:
;
         LDAW    S_TXCNT-RAM
         STAW    TXCNT-RAM               ;Tx data counter set
;
         MVIW    SVRXD-RAM,0             ;Tx data loop counter set
;
         MVIW    NPTSK-RAM,N_NPEND       ;end task number set
;
         POP     H                       ;kill return address
         RET
;
;
;        LDAW    NRCNT-RAM               ;load
;        SLL     A
;        SLL     A
;        SLL     A
;        SLL     A
;        MOV     B,A
;
```

```
;       CALL    SETRR                   ;RR command Tx set
;
;       MVIW    NPMOD-RAM,NRM           ;NRM (normal response mode) set
;
;       MVIW    NPTSK-RAM,N_NPEND       ;end task number set
;
;       POP     H                       ;kill return address
;
;       RET
;
;
;       check NR
;
CKNR00:
;
        INRW    NRCNT-RAM
        ANIW    NRCNT-RAM,07H           ;mask
;
        LDAW    NRCNT-RAM
        SLL     A
        SLL     A
        SLL     A
        SLL     A
        ANI     A,070H                  ;mask
        MOV     B,A                     ;save
;
        LDAW    NPBUF3-RAM              ;get control filed
;
        SLR     A
        SLR     A
        SLR     A
        SLR     A
        ANI     A,07H                   ;mask  get host NR no.
        EQAW    NSCNT-RAM               ;if received data = expected data
        JMP     CKNR30                  ;else
;
;       input buffer full check
;
        OFFIW   NPFLG0-RAM,BFUL         ;if buffer full flag set
        JR      CKNR50                  ;then buffer full
        CALL    SETRR                   ;RR command Tx set
        MVIW    NPMOD-RAM,NRM           ;NRM (normal response mode) set
        MVIW    NPTSK-RAM,N_NPEND       ;end task number set
        RET
;
;       buffer full
;
CKNR50:
        CALL    NPBFUL                  ;
        POP     H                       ;kill return add.
        RET
CKNR30:
;
        INR     A                       ;
        ANI     A,07H                   ;mask
        EQAW    NSCNT-RAM               ;if received data = expected data - 1
        JR      CKNR33                  ;else
                                        ;then
;
        ONIW    NPMOD-RAM,NRM           ;if NRM mode
        JR      CKNR35                  ;else
CKNR33:
        MVI     B,NGNR                  ;NR error set
        CALL    SETFRM                  ;set FRMR command
        MVIW    NPMOD-RAM,NDM           ;NDM  set
        MVIW    NPTSK-RAM,N_NPEND       ;end task number set
        POP     H                       ;kill return address
        RET
CKNR35:
        DCRW    NRCNT-RAM
```

```
        ANIW    NRCNT-RAM,07H           ;mask
        LDAW    S_TXCNT-RAM
        STAW    TXCNT-RAM               ;Tx data counter set
        MVIW    SVRXD-RAM,0             ;Tx data loop counter set
        MVIW    NPTSK-RAM,N_NPEND       ;end task number set
        POP     H                       ;kill return address
        RET
;
;
;       NPBFUL
;
;       buffer full then RNR response return
;
NPBFUL:
;                                       ;
        CALL    SETRNR                  ;RNR command Tx set
;
        MVIW    NPMOD-RAM,NRM           ;NRM (normal response mode) set
;
        MVIW    NPTSK-RAM,N_NPEND       ;end task number set
;
        RET
;
;
;
;
;       BIND
;
;       bind mode
;
BIND::
        NEIW    NPBUF7-RAM,N_UNBIND     ;if command is unbind command
        JMP     UNBIND                  ;then
                                        ;else BIND command
;
        OFFIW   NPFLG0-RAM,F_BIND       ;if already BIND command received
        CALL    BIND80                  ;then
                                        ;else
;
;       (C) reg. is terminate couter
;
        MVI     C,0                     ;clear
;
        NEIW    NPBUF8,00H              ;if terminate code
        INR     C                       ;then
;
        LDED    S_IB_CNT                ;counter load
        DMOV    EA,D
        LDED    IB_CNT
        DSUB    EA,D
        DMOV    D,EA                    ;EA <- now receive value
;
        LHLD    IW_PTR                  ;pointer load
;
BIND00:
        LDAX    H+                      ;store data & renew pointer
        LXI     EA,IN_BUF+IBVAL         ;in buffer end point
        DNE     EA,H                    ;if buffer end
        LXI     H,IN_BUF                ;then renew pointer
;
        NEI     A,00                    ;if terminater
        JRE     BIND01                  ;then
                                        ;else
;
        DCX     D
        MOV     A,D
        ORA     A,E
        SK      Z                       ;if end
        JR      BIND00                  ;else
```

```
;                                       ;then
BIND02:
;        JMP     error routine
;
         JMP     I_ERR                  ;goto term-sess command send
;
BIND01:
         INR     C                      ;terminater counter increment
         EQI     C,02                   ;if 2
         JR      BIND00                 ;else
;                                       ;then
         LDAX    H+                     ;store data & renew pointer
         LXI     EA,IN_BUF+IBVAL        ;in buffer end point
         DNE     EA,H                   ;if buffer end
         LXI     H,IN_BUF               ;then renew pointer
;
         EQI     A,'P'                  ;if   'P'
         CALL    BIND10                 ;else
;                                       ;then
         DCX     D
         MOV     A,D
         ORA     A,E
         SKN     Z                      ;if end
         JRE     BIND02                 ;then
;                                       ;else
         LDAX    H+                     ;store data & renew pointer
         LXI     EA,IN_BUF+IBVAL        ;in buffer end point
         DNE     EA,H                   ;if buffer end
         LXI     H,IN_BUF               ;then renew pointer
;
         EQI     A,'R'                  ;if   'R'
         CALL    BIND10                 ;else
;                                       ;then
         DCX     D
         MOV     A,D
         ORA     A,E
         SKN     Z                      ;if end
         JRE     BIND02                 ;then
;                                       ;else
         LDAX    H+                     ;store data & renew pointer
         LXI     EA,IN_BUF+IBVAL        ;in buffer end point
         DNE     EA,H                   ;if buffer end
         LXI     H,IN_BUF               ;then renew pointer
;
         EQI     A,'N'                  ;if   'N'
         CALL    BIND10                 ;else
;                                       ;then
         DCX     D
         MOV     A,D
         ORA     A,E
         SKN     Z                      ;if end
         JMP     BIND02                 ;then
;                                       ;else
;        00 terminater read only
;
         LDAX    H+                     ;store data & renew pointer
         LXI     EA,IN_BUF+IBVAL        ;in buffer end point
         DNE     EA,H                   ;if buffer end
         LXI     H,IN_BUF               ;then renew pointer
;
         DCX     D
         MOV     A,D
         ORA     A,E
         SKN     Z                      ;if end
         JMP     BIND02                 ;then
                                        ;else
;
```

```
;       load BIND_ID  high
;
        LDAX    H+                      ;store data & renew pointer
        LXI     EA,IN_BUF+IBVAL         ;in buffer end point
        DNE     EA,H                    ;if buffer end
        LXI     H,IN_BUF                ;then renew pointer
;
        MOV     B,A                     ;save
;
        DCX     D
        MOV     A,D
        ORA     A,E
        SKN     Z                       ;if end
        JMP     BIND02                  ;then
                                        ;else
;
;
;       load BIND_ID  low
;
        LDAX    H+                      ;store data & renew pointer
        LXI     EA,IN_BUF+IBVAL         ;in buffer end point
        DNE     EA,H                    ;if buffer end
        LXI     H,IN_BUF                ;then renew pointer
;
        MOV     C,A                     ;save
;
        DCX     D
        MOV     A,D
        ORA     A,E
        SKN     Z                       ;if end
        JMP     BIND02                  ;then
;
        PUSH    B                       ;save
;
        OFFIW   NPFLG0,BDBIND           ;if bad bind mode
        JMP     BIND16                  ;then
;
        OFFIW   NPFLG0,BDBIND2          ;if bad bind mode2
        JMP     BIND81                  ;then
;
;       response to bind
;
        CALL    SETSTX                  ;STX & dev. add. set
;
        MVI     A,8                     ;length set 8
        CALL    LENSET                  ;length set
;
;       control field set
;
;
        MVI     B,SS_IFR                ;I-frame set
        LDAW    NRCNT-RAM               ;load
        SLL     A
        SLL     A
        SLL     A
        SLL     A
        ORA     B,A
;
        LDAW    NSCNT-RAM               ;load
        SLL     A
        ORA     A,B
;
        INRW    NSCNT-RAM
        ANIW    NSCNT-RAM,07H           ;mask
;
        STAW    NPSND5-RAM              ;set control field
        CALL    CKCRC                   ;CRC check
```

```
;
        LDAW    S_CHAN                      ;channel high
        STAW    NPSND6-RAM                  ;
        CALL    CKCRC                       ;CRC check
;
        LDAW    S_CHAN+1                    ;channel low
        STAW    NPSND7-RAM                  ;
        CALL    CKCRC                       ;CRC check
;
        MVI     A,RESTOB                    ;TH  B1H response to bind
        STAW    NPSND8-RAM                  ;
        CALL    CKCRC                       ;CRC check
;
        MVI     A,00H                       ;00
        STAW    NPSND9-RAM                  ;
        CALL    CKCRC                       ;CRC check
;
        POP     B                           ;restore BIND_ID
;
        MOV     A,C                         ;bind_id low
        MOV     L,A
        MOV     A,B                         ;bind_id high
        STAW    NPSND9+1-RAM                ;
        CALL    CKCRC                       ;CRC check
;
        MOV     A,L                         ;bind id low
        STAW    NPSND9+2-RAM                ;
        CALL    CKCRC                       ;CRC check
;
        MVI     A,00H                       ;00 terminater
        STAW    NPSND9+3-RAM                ;
        CALL    CKCRC                       ;CRC check
;
        MVI     A,00
        CALL    CKCRC                       ;
;
        MVI     A,00
        CALL    CKCRC                       ;last 16 bit check
;
        LDAW    CRCH-RAM                    ;get generated CRC H
        STAW    NPSND9+4-RAM                ;CRC set
;
        LDAW    CRCL-RAM                    ;get generated CRC L
        STAW    NPSND9+5-RAM                ;CRC set
;
        MVIW    TXCNT-RAM,14                ;Tx data counter set
        MVIW    SVRXD-RAM,0                 ;Tx data loop counter set
;
        MVIW    NPMOD-RAM,RSP               ;RSP  set
;
        SETW    NPFLG0,F_BIND               ;BIND command received
;
        MVIW    NPTSK-RAM,N_NPEND           ;end task number set
;
        RET
;
;
;
;
;
;
;       'P' 'R' 'N' error occuered
;
BIND10::
        SETW    NPFLG0,BDBIND               ;bad bind flag set
        RET
;
```

```
;
;
;       response to bad bind
;
BIND16::
        RESW    NPFLG0,BDBIND           ;flag clear
;
        CALL    SETSTX                  ;STX & dev. add. set
;
        MVI     A,8                     ;length set 8
        CALL    LENSET                  ;length set
;
;       control field set
;
        MVI     B,SS_IFR                ;I-frame set
        LDAW    NRCNT-RAM               ;load
        SLL     A
        SLL     A
        SLL     A
        SLL     A
        ORA     B,A
;
        LDAW    NSCNT-RAM               ;load
        SLL     A
        ORA     A,B
;
        INRW    NSCNT-RAM
        ANIW    NSCNT-RAM,07H           ;mask
;
        STAW    NPSND5-RAM              ;set control field
        CALL    CKCRC                   ;CRC check
;
        LDAW    S_CHAN                  ;channel high
        STAW    NPSND6-RAM              ;
        CALL    CKCRC                   ;CRC check
;
        LDAW    S_CHAN+1                ;channel low
        STAW    NPSND7-RAM              ;
        CALL    CKCRC                   ;CRC check
;
        MVI     A,RESTNB                ;TH  F1H response to bad "PRN" bind
        STAW    NPSND8-RAM              ;
        CALL    CKCRC                   ;CRC check
;
        MVI     A,00H                   ;00
        STAW    NPSND9-RAM              ;
        CALL    CKCRC                   ;CRC check
;
        POP     B                       ;restore BIND_ID
;
        MOV     A,C                     ;bind_id low
        MOV     L,A
        MOV     A,B                     ;bind_id high
        STAW    NPSND9+1-RAM            ;
        CALL    CKCRC                   ;CRC check
;
        MOV     A,L                     ;bind id low
        STAW    NPSND9+2-RAM            ;
        CALL    CKCRC                   ;CRC check
;
        MVI     A,01H                   ;01 bad bind code
        STAW    NPSND9+3-RAM            ;
        CALL    CKCRC                   ;CRC check
;
        MVI     A,00
        CALL    CKCRC                   ;
;
```

```
        MVI     A,00
        CALL    CKCRC                   ;last 16 bit check
;
        LDAW    CRCH-RAM                ;get generated CRC H
        STAW    NPSND9+4-RAM            ;CRC set
;
        LDAW    CRCL-RAM                ;get generated CRC L
        STAW    NPSND9+5-RAM            ;CRC set
;
        MVIW    TXCNT-RAM,14            ;Tx data counter set
        MVIW    SVRXD-RAM,0             ;Tx data loop counter set
;
        MVIW    NPMOD-RAM,RSP           ;RSP  set
;
        MVIW    NPTSK-RAM,N_NPEND       ;end task number set
;
        RET
;
;
;       error   bind command come after bind
;
BIND80::
        SETW    NPFLG0,BDBIND2          ;bad bind flag set
        RET
;
BIND81::
        RESW    NPFLG0,BDBIND2          ;bad bind flag set
;
        CALL    SETSTX                  ;STX & dev. add. set
;
        MVI     A,8                     ;length set 8
        CALL    LENSET                  ;length set
;
;       control field set
;
        MVI     B,SS_IFR                ;I-frame set
        LDAW    NRCNT-RAM               ;load
        SLL     A
        SLL     A
        SLL     A
        SLL     A
        ORA     B,A
;
        LDAW    NSCNT-RAM               ;load
        SLL     A
        ORA     A,B
;
        INRW    NSCNT-RAM
        ANIW    NSCNT-RAM,07H           ;mask
;
        STAW    NPSND5-RAM              ;set control field
        CALL    CKCRC                   ;CRC check
;
        LDAW    S_CHAN                  ;channel high
        STAW    NPSND6-RAM              ;
        CALL    CKCRC                   ;CRC check
;
        LDAW    S_CHAN+1                ;channel low
        STAW    NPSND7-RAM              ;
        CALL    CKCRC                   ;CRC check
;
        MVI     A,RESTNB                ;TH  F1H response to bad "PRN" bind
        STAW    NPSND8-RAM              ;
        CALL    CKCRC                   ;CRC check
;
        MVI     A,00H                   ;00
        STAW    NPSND9-RAM              ;
```

```
        CALL    CKCRC                     ;CRC check
;
        POP     B                         ;restore BIND_ID
;
        MOV     A,C                       ;bind_id low
        MOV     L,A
        MOV     A,B                       ;bind_id high
        STAW    NPSND9+1-RAM              ;
        CALL    CKCRC                     ;CRC check
;
        MOV     A,L                       ;bind id low
        STAW    NPSND9+2-RAM              ;
        CALL    CKCRC                     ;CRC check
;
        MVI     A,02H                     ;02H bad bind code
        STAW    NPSND9+3-RAM              ;
        CALL    CKCRC                     ;CRC check
;
        MVI     A,00
        CALL    CKCRC                     ;
;
        MVI     A,00
        CALL    CKCRC                     ;last 16 bit check
;
        LDAW    CRCH-RAM                  ;get generated CRC H
        STAW    NPSND9+4-RAM              ;CRC set
;
        LDAW    CRCL-RAM                  ;get generated CRC L
        STAW    NPSND9+5-RAM              ;CRC set
;
        MVIW    TXCNT-RAM,14              ;Tx data counter set
        MVIW    SVRXD-RAM,0               ;Tx data loop counter set
;
        MVIW    NPMOD-RAM,RSP             ;RSP  set
;
        MVIW    NPTSK-RAM,N_NPEND         ;end task number set
;
        RET
;
;
;
;
;
BIND90:
        JMP     I_ERR                     ;goto term-sess command send
;
UNBIND:
        ONIW    NPFLG0-RAM,F_BIND         ;if already UNBIND command received
        JR      BIND90                    ;then
                                          ;else
;
;       buffer full check
;
        CALL    CLRINB                    ;then  KILL!! (clear) input buffer
;
;       response to unbind
;
        CALL    SETSTX                    ;STX & dev. add. set
;
        MVI     A,5                       ;length set 5
        CALL    LENSET                    ;length set
;
;       control field set
;
        MVI     B,SS_IFR                  ;I-frame set
        LDAW    NRCNT-RAM                 ;load
        SLL     A
        SLL     A
```

```
        SLL     A
        SLL     A
        ORA     B,A
;
        LDAW    NSCNT-RAM               ;load
        SLL     A
        ORA     A,B
;
        INRW    NSCNT-RAM
        ANIW    NSCNT-RAM,07H           ;mask
;
        STAW    NPSND5-RAM              ;set control field
        CALL    CKCRC                   ;CRC check
;
        LDAW    S_CHAN                  ;channel high
        STAW    NPSND6-RAM              ;
        CALL    CKCRC                   ;CRC check
;
        LDAW    S_CHAN+1                ;channel low
        STAW    NPSND7-RAM              ;
        CALL    CKCRC                   ;CRC check
;
        MVI     A,RESTOB                ;TH  P1K response to bind
        STAW    NPSND8-RAM              ;
        CALL    CKCRC                   ;CRC check
;
        MVI     A,01H                   ;positive response
        STAW    NPSND9-RAM              ;
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND9+1-RAM            ;CRC set
;
        LDAW    CRCL-RAM                ;get generated CRC L
        STAW    NPSND9+2-RAM            ;CRC set
;
        MVIW    TXCNT-RAM,11            ;Tx data counter set
        MVIW    SVRXD-RAM,0             ;Tx data loop counter set
;
        RESW    NPFLG0,F_BIND           ;UNBIND command received
;
        MVIW    NPMOD-RAM,RSP           ;RSP  set
;
        MVIW    NPTSK-RAM,N_NPEND       ;end task number set
;
        RET
;
;
;       CLRINB  clear input buffer
;
CLRINB:
        LXI     H,0000                  ;clear
        SHLD    IB_CNT
        LXI     H,IN_BUF
        SHLD    IW_PTR
        SHLD    IR_PTR
        RET
;
;
;       TERM
;
;       term-sess mode
;
```

```
;
TERM::
        ONIW    NPFLG0-RAM,F_BIND           ;if already BIND command received
        JMP     I_ERR                       ;else
                                            ;then
;       EQIW    NPBUF7-RAM,02H              ;if command is term-sess command
        JMP     I_ERR
;
        CALL    CLRINB
;
        RESW    NPFLG0,F_BIND               ;cancel communication
        RET
;
;
;       PRES
;
;       presentation layer message
;
PRES::
        ONIW    NPFLG0-RAM,F_BIND           ;if already BIND command received
        JMP     I_ERR                       ;else
;
        NEIW    NPBUF7-RAM,C_PRINT          ;if command is print command
        JMP     PR_PRINT                    ;then
;
        NEIW    NPBUF7-RAM,C_ONLINE         ;if command is printter online
        JMP     PR_ONLN                     ;then
;
        NEIW    NPBUF7-RAM,C_RQST           ;if command is request status
        JMP     PR_RQST                     ;then
;
        NEIW    NPBUF7-RAM,C_RQCC           ;if command is current configuration
        JMP     PR_RQCC                     ;then
;
        NEIW    NPBUF7-RAM,C_RQSF           ;if command is supported features
        JMP     PR_RQSF                     ;then
;
        NEIW    NPBUF7-RAM,C_RQSLT          ;if command is self test
        JMP     PR_RQSLT                    ;then
;
        NEIW    NPBUF7-RAM,C_RQRT           ;if command is reset
        JMP     PR_RQRT                     ;then
                                            ;else
;
;       bad command number receive
;
        JMP     I_ERR                       ;send term_sess command
;
;       print command receive
;
PR_PRINT::
;
;       test
;
;       LDED    S_IW_PTR
;       SDED    IW_PTR                      ;pointer restore
;
;       LDED    S_IB_CNT
;       SDED    IB_CNT                      ;counter restore
;
;       sequence pointer set
;
        INRW    SEQPCT-RAM                  ;increment sequence pointer counter
        LDAW    SEQPCT-RAM                  ;load
        SLL     A                           ;*2
        LXI     EA,SEQPTR-2                 ;sequence pointer buffer
        EADD    EA,A
        DMOV    H,EA                        ;(HL) <- buffer address
;
```

```
        LDED    S_IW_PTR                ;pointer load
        LXI     EA,IN_BUF-1
        DCX     D
        DNE     EA,D                    ;if buffer top
        LXI     D,IN_BUF+IBVAL-1        ;then
        DMOV    EA,D
        STEAX   H                       ;store
;
;       sequence # set
;
        INRW    PSEQC-RAM               ;increment sequence counter
        LDAW    PSEQC-RAM               ;load
        LXI     EA,PSBUFF-1             ;print sequence # buffer
        EADD    EA,A
        DMOV    H,EA                    ;(HL) <- buffer address
;
        LDAW    NPBUF8-RAM              ;load sequence #
        STAX    H                       ;store
;
        SETW    NPFLG0,RCVPTC           ;print command receive flag set
        RET
;
;       check TX data exist
;
        CALL    CKTXD                   ;check TX data exist
;
;
        OFFIW   NPFLG0-RAM,EXTXD        ;if Tx data exist
        JR      PR_P00                  ;then
        RET                             ;else
;
;
;       TX data exist
;
PR_P00:
        CALL    SETPRES                 ;I_frame Tx
;
        RET
;
;
;       SETPRES
;
;       set print command response
;
SETPRES:
;
;       response to message
;
        CALL    SETSTX                  ;STX & dev. add. set
;
        MVI     A,6                     ;length set 6
        CALL    LENSET                  ;length set
;
;       control field set
;
;
        MVI     B,SS_IFR                ;I-frame set
        LDAW    NRCNT-RAM               ;load
        SLL     A
        SLL     A
        SLL     A
        SLL     A
        ORA     B,A
;
        LDAW    NSCNT-RAM               ;load
        SLL     A
        ORA     A,B
```

```
;
        INRW    NSCNT-RAM
        ANIW    NSCNT-RAM,07H             ;mask
;
        STAW    NPSND5-RAM                ;set control field
        CALL    CKCRC                     ;CRC check
;
        LDAW    S_CHAN                    ;channel high
        STAW    NPSND6-RAM                ;
        CALL    CKCRC                     ;CRC check
;
        LDAW    S_CHAN+1                  ;channel low
        STAW    NPSND7-RAM                ;
        CALL    CKCRC                     ;CRC check
;
        MVI     A,N_PRES                  ;TH  32H response to print data
        STAW    NPSND8-RAM                ;
        CALL    CKCRC                     ;CRC check
;
        MVI     A,R_PRINT                 ;respons to print
        STAW    NPSND9-RAM                ;
        CALL    CKCRC                     ;CRC check
;
;
;       LDAW    NPBUF8-RAM                ;load sequence #
;
;
        LXI     H,PSBUFF                  ;print sequence # buffer top add
        LDAX    H+                        ;load # & HL increment
;
        STAW    NPSND9+1-RAM              ;
        CALL    CKCRC                     ;CRC check      keep (HL)
;
        DCRW    PSEQC-RAM                 ;counter decrement
        LDAW    PSEQC-RAM                 ;load
        NEI     A,00                      ;if counter = 0
        JR      SETPR1                    ;then
                                          ;else
;
        MOV     C,A                       ;loop counter set
        LXI     D,PSBUFF                  ;print sequence # buffer top add
        BLOCK                             ;move buffer
;
SETPR1:
        MVI     A,00
        CALL    CKCRC                     ;
;
        MVI     A,00
        CALL    CKCRC                     ;last 16 bit check
;
        LDAW    CRCH-RAM                  ;get generated CRC H
        STAW    NPSND9+2-RAM              ;CRC set
;
        LDAW    CRCL-RAM                  ;get generated CRC L
        STAW    NPSND9+3-RAM              ;CRC set
;
        MVIW    TXCNT-RAM,12              ;Tx data counter set
        MVIW    SVRXD-RAM,0               ;Tx data loop counter set
;
        DCRW    TXOKC-RAM                 ;tx ok counter decrement
;
        MVIW    NPMOD-RAM,RSP             ;RSP  set
;
        MVIW    NPTSK-RAM,N_NPEND         ;end task number set
;
        RET
;
```

```
;
;       SETERCD
;
;       set error command response
;
SETERCD:

        response to message
;
        CALL    SETSTX                  ;STX & dev. add. set
;
        MVI     A,7                     ;length set 7
        CALL    LENSET                  ;length set
;
;       control field set
;
;
        MVI     B,SS_IFR                ;I-frame set
        LDAW    NRCNT-RAM               ;load
        SLL     A
        SLL     A
        SLL     A
        SLL     A
        ORA     B,A
;
        LDAW    NSCNT-RAM               ;load
        SLL     A
        ORA     A,B
;
        INRW    NSCNT-RAM
        ANIW    NSCNT-RAM,07H           ;mask
;
        STAW    NPSND5-RAM              ;set control field
        CALL    CKCRC                   ;CRC check
;
        LDAW    S_CHAN                  ;channel high
        STAW    NPSND6-RAM              ;
        CALL    CKCRC                   ;CRC check
;
        LDAW    S_CHAN+1                ;channel low
        STAW    NPSND7-RAM              ;
        CALL    CKCRC                   ;CRC check
;
        MVI     A,N_PRES                ;TH  32H response to print data
        STAW    NPSND8-RAM              ;
        CALL    CKCRC                   ;CRC check
;
        MVI     A,R_ERROR               ;respons to error
        STAW    NPSND9-RAM              ;
        CALL    CKCRC                   ;CRC check
;
        MVI     A,00                    ;no error code
;
        OFFIW   PRTFL1-RAM,VHIH
        ORI     A,E_O_V                 ;over voltage
        OFFIW   PRTFL1-RAM,VHIL
        ORI     A,E_O_V                 ;over voltage
        OFFIW   PRTFL1-RAM,VLOW
        ORI     A,E_L_V                 ;low  voltage
        OFFIW   PRTFL1-RAM,MVERR
        ORI     A,E_HEAD_JAM            ;head jum error
        OFFIW   PRTFL1-RAM,PEERR
        ORI     A,E_P_OUT               ;paper out error
        OFFIW   PRTFL1-RAM,COVER
        ORI     A,E_COVER               ;paper cover error
;
```

```
        STAW    NPSND9+1-RAM            ;
        CALL    CKCRC                   ;CRC check
;
        MVI     A,00                    ;online set
        STAW    NPSND9+2-RAM            ;
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND9+3-RAM            ;CRC set
;
        LDAW    CRCL-RAM                ;get generated CRC L
        STAW    NPSND9+4-RAM            ;CRC set
;
        MVIW    TXCNT-RAM,13            ;Tx data counter set
        MVIW    SVRXD-RAM,0             ;Tx data loop counter set
;
        MVIW    NPMOD-RAM,RSP           ;RSP  set
;
        RET
;
;
;
;
;       CKTXD
;
;       check TX data exist
;
;       ext.    NPFLG0-EXTXD = 1 Tx data exist
;               NPFLG0-EXTXD = 0 Tx data not exist
;
CKTXD::
        EQIW    TXOKC-RAM,00            ;if TX data exist
        JR      CKTXD0                  ;then
        RESW    NPFLG0,EXTXD            ;flag clear
        RET
CKTXD0:
        SETW    NPFLG0,EXTXD            ;flag set
        RET
;
;
;       printer online command receive
;
PR_ONLN::
;
;       response to message
;
        CALL    SETSTX                  ;STX & dev. add. set
;
        MVI     A,5                     ;length set 5
        CALL    LENSET                  ;length set
;
;       control field set
;
;
        MVI     B,SS_IFR                ;I-frame set
        LDAW    NRCNT-RAM               ;load
        SLL     A
        SLL     A
        SLL     A
        SLL     A
```

```
        ORA     B,A
;
        LDAW    NSCNT-RAM               ;load
        SLL     A
        ORA     A,B
;
        INRW    NSCNT-RAM
        ANIW    NSCNT-RAM,07H           ;mask
;
        STAW    NPSND5-RAM              ;set control field
        CALL    CKCRC                   ;CRC check
;
        LDAW    S_CHAN                  ;channel high
        STAW    NPSND6-RAM              ;
        CALL    CKCRC                   ;CRC check
;
        LDAW    S_CHAN+1                ;channel low
        STAW    NPSND7-RAM              ;
        CALL    CKCRC                   ;CRC check
;
        MVI     A,N_PRES                ;TH  32H
        STAW    NPSND8-RAM              ;
        CALL    CKCRC                   ;CRC check
;
        MVI     A,R_ONLINE              ;respons to online
        STAW    NPSND9-RAM              ;
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND9+1-RAM            ;CRC set
;
        LDAW    CRCL-RAM                ;get generated CRC L
        STAW    NPSND9+2-RAM            ;CRC set
;
        MVIW    TXCNT-RAM,11            ;Tx data counter set
        MVIW    SVRXD-RAM,0             ;Tx data loop counter set
;
        MVIW    NPMOD-RAM,RSP           ;RSP  set
;
        MVIW    NPTSK-RAM,N_NPEND       ;end task number set
;
        RET
;
;
;       request status command receive
;
PR_RQST::
;
;       response to message
;
        CALL    SETSTX                  ;STX & dev. add. set
;
        MVI     A,10                    ;length set 10
        CALL    LENSET                  ;length set
;
;       control field set
;
;
        MVI     B,SS_IFR                ;I-frame set
        LDAW    NRCNT-RAM               ;load
```

```
        SLL     A
        SLL     A
        SLL     A
        SLL     A
        ORA     B,A
;
        LDAW    NSCNT-RAM               ;load
        SLL     A
        ORA     A,B
;
        INRW    NSCNT-RAM
        ANIW    NSCNT-RAM,07H           ;mask
;
        STAW    NPSND5-RAM              ;set control field
        CALL    CKCRC                   ;CRC check
;
        LDAW    S_CHAN                  ;channel high
        STAW    NPSND6-RAM              ;
        CALL    CKCRC                   ;CRC check
;
        LDAW    S_CHAN+1                ;channel low
        STAW    NPSND7-RAM              ;
        CALL    CKCRC                   ;CRC check
;
        MVI     A,N_PRES                ;TH  32H
        STAW    NPSND8-RAM              ;
        CALL    CKCRC                   ;CRC check
;
        MVI     A,R_RQST                ;respons to request status
        STAW    NPSND9-RAM              ;
        CALL    CKCRC                   ;CRC check
;
        CALL    MKST0                   ;make status data 0
;
;
        MVI     A,00                    ;dummy data
        STAW    NPSND9+1-RAM            ;
        CALL    CKCRC                   ;CRC check
;
        CALL    MKST1                   ;make status data 1
;
        STAW    NPSND9+2-RAM            ;
        CALL    CKCRC                   ;CRC check
;
        CALL    MKST2                   ;make status data 2
;
        STAW    NPSND9+3-RAM            ;
        CALL    CKCRC                   ;CRC check
;
        CALL    MKST3                   ;make status data 3
;
        STAW    NPSND9+4-RAM            ;
        CALL    CKCRC                   ;CRC check
;
        CALL    MKST4                   ;make status data 4
;
        STAW    NPSND9+5-RAM            ;
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND9+6-RAM            ;CRC set
```

```
;
        LDAW    CRCL-RAM            ;get generated CRC L
        STAW    NPSND9+7-RAM        ;CRC set
;
        MVIW    TXCNT-RAM,16        ;Tx data counter set
        MVIW    SVRXD-RAM,0         ;Tx data loop counter set
;
        MVIW    NPMOD-RAM,RSP       ;RSP  set
;
        MVIW    NPTSK-RAM,N_NPEND   ;end task number set
;
        RET
;
;       request current configration command receive
;
PR_RQCC::
;
;       response to message
;
        CALL    SETSTX              ;STX & dev. add. set
;
        MVI     A,12                ;length set 12
        CALL    LENSET              ;length set
;
;       control field set
;
;
        MVI     B,SS_IFR            ;I-frame set
        LDAW    NRCNT-RAM           ;load
        SLL     A
        SLL     A
        SLL     A
        SLL     A
        ORA     B,A
;
        LDAW    NSCNT-RAM           ;load
        SLL     A
        ORA     A,B
;
        INRW    NSCNT-RAM
        ANIW    NSCNT-RAM,07H       ;mask
;
        STAW    NPSND5-RAM          ;set control field
        CALL    CKCRC               ;CRC check
;
        LDAW    S_CHAN              ;channel high
        STAW    NPSND6-RAM          ;
        CALL    CKCRC               ;CRC check
;
        LDAW    S_CHAN+1            ;channel low
        STAW    NPSND7-RAM          ;
        CALL    CKCRC               ;CRC check
;
        MVI     A,N_PRES            ;TH  32H
        STAW    NPSND8-RAM          ;
        CALL    CKCRC               ;CRC check
;
        MVI     A,R_RQCC            ;respons to request current configuration
        STAW    NPSND9-RAM          ;
        CALL    CKCRC               ;CRC check
;
        CALL    MKCC0               ;make current configuration data 0
;
        STAW    NPSND9+1-RAM        ;
        CALL    CKCRC               ;CRC check
;
```

```
        CALL    MKCC1                   ;make current configuration data 1
;
        STAW    NPSND9+2-RAM            ;
        CALL    CKCRC                   ;CRC check
;
        CALL    MKCC2                   ;make current configuration data 2
;
        STAW    NPSND9+3-RAM            ;
        CALL    CKCRC                   ;CRC check
;
        CALL    MKCC3                   ;make current configuration data 3
;
        STAW    NPSND9+4-RAM            ;
        CALL    CKCRC                   ;CRC check
;
        CALL    MKCC4                   ;make current configuration data 4
;
        STAW    NPSND9+5-RAM            ;
        CALL    CKCRC                   ;CRC check
;
        CALL    MKCC5                   ;make current configuration data 5
;
        STAW    NPSND9+6-RAM            ;
        CALL    CKCRC                   ;CRC check
;
        CALL    MKCC6                   ;make current configuration data 6
;
        STAW    NPSND9+7-RAM            ;
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND9+8-RAM            ;CRC set
;
        LDAW    CRCL-RAM                ;get generated CRC L
        STAW    NPSND9+9-RAM            ;CRC set
;
        MVIW    TXCNT-RAM,18            ;Tx data counter set
        MVIW    SVRXD-RAM,0             ;Tx data loop counter set
;
        MVIW    NPMOD-RAM,RSP           ;RSP  set
;
        MVIW    NPTSK-RAM,N_NPEND       ;end task number set
;
        RET
;
;       request supported features command receive
;
PR_RQSF::
;
;       response to message
;
        CALL    SETSTX                  ;STX & dev. add. set
;
        MVI     A,35                    ;length set 35
        CALL    LENSET                  ;length set
;
;       control field set
;
;
        MVI     B,SS_IFR                ;I-frame set
        LDAW    NRCNT-RAM               ;load
        SLL     A
```

```
        SLL     A
        SLL     A
        SLL     A
        ORA     B,A
;
        LDAW    NSCNT-RAM           ;load
        SLL     A
        ORA     A,B
;
        INRW    NSCNT-RAM
        ANIW    NSCNT-RAM,07H       ;mask
;
        STAW    NPSND5-RAM          ;set control field
        CALL    CKCRC               ;CRC check
;
        LDAW    S_CHAN              ;channel high
        STAW    NPSND6-RAM          ;
        CALL    CKCRC               ;CRC check
;
        LDAW    S_CHAN+1            ;channel low
        STAW    NPSND7-RAM          ;
        CALL    CKCRC               ;CRC check
;
        MVI     A,N_PRES            ;TH  32H
        STAW    NPSND8-RAM          ;
        CALL    CKCRC               ;CRC check
;
        MVI     A,R_RQSF            ;respons to request supported features
        STAW    NPSND9-RAM          ;
        CALL    CKCRC               ;CRC check
;
        CALL    MKSF0               ;make request supported featured data 0
;
        STAW    NPSND9+1-RAM        ;
        CALL    CKCRC               ;CRC check
;
        CALL    MKSF1               ;make request supported featured data 1
;
        STAW    NPSND9+2-RAM        ;
        CALL    CKCRC               ;CRC check
;
        CALL    MKSF2               ;make request supported featured data 2
;
        STAW    NPSND9+3-RAM        ;

        CALL    CKCRC               ;CRC check
;
        CALL    MKSF3               ;make request supported featured data 3
;
        STAW    NPSND9+4-RAM        ;
        CALL    CKCRC               ;CRC check
;
        CALL    MKSF4               ;make request supported featured data 4
;
        STAW    NPSND9+5-RAM        ;
        CALL    CKCRC               ;CRC check
;
        CALL    MKSF5               ;make request supported featured data 5
;
        STAW    NPSND9+6-RAM        ;
        CALL    CKCRC               ;CRC check
;
        CALL    MKSF6               ;make request supported featured data 6
;
        STAW    NPSND9+7-RAM        ;
        CALL    CKCRC               ;CRC check
;
        CALL    MKSF7               ;make request supported featured data 7
```

```
;
        STAW    NPSND9+8-RAM        ;
        CALL    CKCRC               ;CRC check
;
        CALL    MKSF8               ;make request supported featured data 8
;
        STAW    NPSND9+9-RAM        ;
        CALL    CKCRC               ;CRC check
;
        CALL    MKSF9               ;make request supported featured data 9
;
        STAW    NPSND9+10-RAM       ;
        CALL    CKCRC               ;CRC check
;
        CALL    MKSF10              ;make request supported featured data 10;
        STAW    NPSND9+11-RAM       ;
        CALL    CKCRC               ;CRC check
;
        MVI     A,'B'               ;
        STAW    NPSND9+12-RAM       ;
        CALL    CKCRC               ;CRC check
;
        MVI     A,'A'               ;
        STAW    NPSND9+13-RAM       ;
        CALL    CKCRC               ;CRC check
;
        MVI     A,'_'               ;
        STAW    NPSND9+14-RAM       ;
        CALL    CKCRC               ;CRC check
;
        MVI     A,'2'               ;
        STAW    NPSND9+15-RAM       ;
        CALL    CKCRC               ;CRC check
;
        MVI     A,'0'               ;
        STAW    NPSND9+16-RAM       ;
        CALL    CKCRC               ;CRC check
;
        MVI     A,'0'               ;
        STAW    NPSND9+17-RAM       ;
        CALL    CKCRC               ;CRC check
;
        MVI     A,'0'               ;
        STAW    NPSND9+18-RAM       ;
        CALL    CKCRC               ;CRC check
;
        MVI     A,'N'               ;
        STAW    NPSND9+19-RAM       ;
        CALL    CKCRC               ;CRC check
;
        MVI     A,' '               ;
        STAW    NPSND9+20-RAM       ;
        CALL    CKCRC               ;CRC check
;
        MVI     A,' '               ;
        STAW    NPSND9+21-RAM       ;
        CALL    CKCRC               ;CRC check
;
        MVI     A,' '               ;
        STAW    NPSND9+22-RAM       ;
        CALL    CKCRC               ;CRC check
;
        MVI     A,VER1              ;
        STAW    NPSND9+23-RAM       ;
        CALL    CKCRC               ;CRC check
;
        MVI     A,'.'               ;
```

```
        STAW    NPSND9+24-RAM           ;
        CALL    CKCRC                   ;CRC check
;
        MVI     A,VER2                  ;
        STAW    NPSND9+25-RAM           ;
        CALL    CKCRC                   ;CRC check
;
        MVI     A,VER3                  ;
        STAW    NPSND9+26-RAM           ;
        CALL    CKCRC                   ;CRC check
;
        MVI     A,00                    ;dummy data
        STAW    NPSND9+27-RAM           ;
        CALL    CKCRC                   ;CRC check
;
        MVI     A,00                    ;dummy data
        STAW    NPSND9+28-RAM           ;
        CALL    CKCRC                   ;CRC check
;
        MVI     A,00                    ;dummy data
        STAW    NPSND9+29-RAM           ;
        CALL    CKCRC                   ;CRC check
;
        MVI     A,00                    ;dummy data
        STAW    NPSND9+30-RAM           ;
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND9+31-RAM           ;CRC set
;
        LDAW    CRCL-RAM                ;get generated CRC L
        STAW    NPSND9+32-RAM           ;CRC set
;
        MVIW    TXCNT-RAM,41            ;Tx data counter set
        MVIW    SVRXD-RAM,0             ;Tx data loop counter set
;
        MVIW    NPMOD-RAM,RSP           ;RSP  set
;
        MVIW    NPTSK-RAM,N_NPEND       ;end task number set
;
        RET
;
;       self test command receive
;
PR_RQSLT:
;
;       self check routine
;
        CALL    SELFCK##                ;
;
;       response to message
;
        CALL    SETSTX                  ;STX & dev. add. set
;
        MVI     A,5                     ;length set 5
        CALL    LENSET                  ;length set
;
;       control field set
;
;
```

```
        MVI     B,SS_IFR                ;I-frame set
        LDAW    NRCNT-RAM               ;load
        SLL     A
        SLL     A
        SLL     A
        SLL     A
        ORA     B,A
;
        LDAW    NSCNT-RAM               ;load
        SLL     A
        ORA     A,B
;
        INRW    NSCNT-RAM
        ANIW    NSCNT-RAM,07H           ;mask
;
        STAW    NPSND5-RAM              ;set control field
        CALL    CKCRC                   ;CRC check
;
        LDAW    S_CHAN                  ;channel high
        STAW    NPSND6-RAM              ;
        CALL    CKCRC                   ;CRC check
;
        LDAW    S_CHAN+1                ;channel low
        STAW    NPSND7-RAM              ;
        CALL    CKCRC                   ;CRC check
;
        MVI     A,N_PRES                ;TH  32H
        STAW    NPSND8-RAM              ;
        CALL    CKCRC                   ;CRC check
;
        MVI     A,R_RQSLT               ;respons to self test
        STAW    NPSND9-RAM              ;
        CALL    CKCRC                   ;CRC check
;
        MVI     A,00
        CALL    CKCRC                   ;
;
        MVI     A,00
        CALL    CKCRC                   ;last 16 bit check
;
        LDAW    CRCH-RAM                ;get generated CRC H
        STAW    NPSND9+1-RAM            ;CRC set
;
        LDAW    CRCL-RAM                ;get generated CRC L
        STAW    NPSND9+2-RAM            ;CRC set
;
        MVIW    TXCNT-RAM,11            ;Tx data counter set
        MVIW    SVRXD-RAM,0             ;Tx data loop counter set
;
        MVIW    NPMOD-RAM,RSP           ;RSP  set
;
        MVIW    NPTSK-RAM,N_NPEND       ;end task number set
;
        RET
;
;       reset command receive
;
PR_RQRT:
;
        CALL    ESCAT##                 ;ESC @ command routine
;
        MVIW    TXCNT-RAM,0
        MVIW    SVRXD-RAM,0             ;Tx data loop counter set
;
        MVIW    NPMOD-RAM,RSP           ;RSP  set
;
```

```
        MVIW    NPTSK-RAM,N_NPEND       ;end task number set
;
        RET
;
;
;
;       MVIW    NSCNT-RAM,0             ;reset   kill !
;
;       MVIW    NRCNT-RAM,0             ;reset
;
;       MVIW    TXOKC-RAM,0             ;reset
;       MVIW    PSEQC-RAM,0             ;reset
;       MVIW    SEQPCT-RAM,0            ;reset
;       MVIW    PASSP-RAM,0             ;reset
;       MVIW    SEQPTR-RAM,0            ;reset
;       MVIW    SEQPTR+1-RAM,0          ;reset
;
;       MVIW    NPMOD-RAM,NRM           ;NRM (normal response mode) set
;
;       MVIW    NPTSK-RAM,N_NPEND       ;end task number set
;
;       RESW    NPFLG0,F_BIND           ;cancel communication
;
;       RET
;
;
;
;       MKST0
;
MKST0:
        MVI     A,0                     ;clear
;
;
        LHLD    S_IB_CNT                ;buffer counter load
        LXI     EA,10
        DLT     EA,H                    ;if empty
        JRE     MKST01                  ;then
;
        LXI     EA,90
        DLT     EA,H                    ;if 90 character left
        JRE     MKST02                  ;then

        LXI     EA,BUFVAL/2
        DLT     EA,H                    ;if empty
        JRE     MKST03                  ;then
                                        ;else full
;
        MVI     A,0FH
        JRE     MKST05
MKST01:
        MVI     A,00H
        JRE     MKST05
MKST02:
        MVI     A,0EH
        JRE     MKST05
MKST03:
        MVI     A,08H
;
MKST05:
        OFFIW   PMOD3-RAM,ONL           ;if online
        ORI     A,20H                   ;bit on
        ORI     A,80H                   ;set power up status
        RET
;
;
;       MKST1
;
MKST1:
```

```
        MVI     A,0                     ;clear
;
        OFFIW   PRTFL1-RAM,VHIH
        ORI     A,E_O_V                 ;over voltage
        OFFIW   PRTFL1-RAM,VHIL
        ORI     A,E_O_V                 ;over voltage
        OFFIW   PRTFL1-RAM,VLOW
        ORI     A,E_L_V                 ;low  voltage
        OFFIW   PRTFL1-RAM,MVERR
        ORI     A,E_HEAD_JAM            ;head jum error
        OFFIW   PRTFL1-RAM,PEERR
        ORI     A,E_P_OUT               ;paper out error
        OFFIW   PRTFL1-RAM,COVER
        ORI     A,E_COVER               ;paper cover error
;
        RET
;
;       MKST2
;
MKST2:
        LDAW    NPERCT-RAM              ;MAC error counter
        MVIW    NPERCT-RAM,0            ;clear
        RET
;
;       MKST3
;
MKST3:
        LDED    CRPOS                   ;carriadge position
        DMOV    EA,D
        MVI     A,6
        DIV     A                       ;/6  (adjust 1/120")
        DSLR    EA
        DSLR    EA
        DSLR    EA
        DSLR    EA
        MOV     A,EAL
        RET
;
;
;       MKST4
;
MKST4:
        MVI     A,0                     ;clear
;
        OFFIW   PRTFL2-RAM,PRTING       ;if printing now
        ORI     A,02H                   ;form feed bit on
        RET
;
;
;
;
;       MKCC0
;
MKCC0:
        OFFIW   PMOD1-RAM,NLQ           ;if NLQ mode
        JRE     MKCC01                  ;then
        OFFIW   PMOD0-RAM,ENLA          ;if enlarged mode
        JRE     MKCC02                  ;then
        OFFIW   PMOD0-RAM,CONP          ;if compressed mode
        JRE     MKCC03                  ;then
        OFFIW   PMOD0-RAM,EMPH          ;if emphasised mode
        JRE     MKCC04                  ;then
        OFFIW   PMOD0-RAM,DOBL          ;if double strike mode
        JRE     MKCC05                  ;then
                                        ;else
;
        MVI     A,00                    ;normal set
```

```
        RET
;
MKCC01:
        MVI     A,01H                   ;NLQ
        RET
MKCC02:
        MVI     A,02H                   ;double width
        RET
MKCC03:
        MVI     A,03H                   ;compressed
        RET
MKCC04:
        MVI     A,04H                   ;emphasised
        RET
MKCC05:
        MVI     A,05H                   ;double strike
        RET
;
;
;
;
;       MKCC1
;
MKCC1:
        MVI     A,0                     ;clear
;
        OFFIW   PMOD0-RAM,PCAELT        ;if eliet mode
        ORI     A,01H                   ;then bit on
        OFFIW   PMOD1-RAM,SUPS          ;if super script mode
        ORI     A,08H                   ;then bit on
        OFFIW   PMOD1-RAM,SUBS          ;if sub script mode
        ORI     A,04H                   ;then bit on
        OFFIW   PMOD0-RAM,ITAL          ;if italic mode
        ORI     A,10H                   ;then bit on
        RET
;
;
;
;       MKCC2
;
MKCC2:
        MVI     A,HIGH IBVAL            ;
        RET
;
;
;       MKCC3
;
MKCC3:
        MVI     A,LOW IBVAL             ;
        RET
;
;       MKCC4
;
MKCC4:
        LDAW    INTLTR-RAM              ;international character code
        RET
;
;       MKCC5
;
MKCC5:
        LHLD    PMXVAL                  ;page length
        DMOV    EA,H
        MVI     A,216                   ;/216
        DIV     A
        MOV     A,EAL
        RET
```

```
;
;
;
;         MKCC6
;
MKCC6:
          LHLD      LFDVAL                  ;line feed val
          DMOV      EA,H
          LXI       D,36
          DNE       EA,D                    ;if 1/6
          JRE       MKCC61                  ;then
          LXI       D,27
          DNE       EA,D                    ;if 1/8
          JRE       MKCC62                  ;then
          LXI       D,21
          DNE       EA,D                    ;if 7/72
          JRE       MKCC63                  ;then
;                                           ;else n/216
          MVI       A,4
          RET
MKCC61:
          MVI       A,0
          RET
MKCC62:
          MVI       A,1
          RET
MKCC63:
          MVI       A,2
          RET
;
;         MKSF0
;
MKSF0:
          MVI       A,03FH                  ;
          RET
;
;         MKSF1
;
MKSF1:
          MVI       A,007H                  ;
          RET
;
;         MKSF2
;
MKSF2:
          MVI       A,03BH                  ;
          RET
;
;         MKSF3
;
MKSF3:
          MVI       A,HIGH IBVAL            ;
          RET
;
;
;         MKSF4
;
MKSF4:
          MVI       A,LOW IBVAL             ;
          RET
;
;         MKSF5
;
MKSF5:
          MVI       A,000H                  ;
          RET
```

```
;
;       MKSF6
;
MKSF6:
        MVI     A,07FH                  ;
        RET
;
;       MKSF7
;
MKSF7:
        MVI     A,0FFH                  ;
        RET
;
;       MKSF8
;
MKSF8:
        MVI     A,223                   ;
        RET
;
;       MKSF9
;
MKSF9:
        MVI     A,0F3H                  ;
        RET
;
;       MKSF10
;
MKSF10:
        MVI     A,01FH                  ;
        RET
;
;
;
;
;serial i/f interrupt
;
;
RCVS::                                  ;receive data interrupt routine
                                        ; for serial i/f

        PUSH    V
        PUSH    H
        PUSH    EA
        ;
        MOV     A,PA                    ;save PA port data
        PUSH    V
        SETPA   RAMSEL                  ;RAM i/o select
        ;
        OFFIW   DPSW-RAM,NPCP           ;if NPCP mode
        JRE     NPRX                    ;then
;
;       SETPB   DTR+RTS                 ;reset DTR & RTS
;
        ONIW    DPSW-RAM,XONXOF         ;if protocal = xonxoff
        JMP     RCVS10                  ;else (DTR,RTS control)
        ;
        *6/15
;       MOV     A,RXB                   ;read
;
        ONIW    DPSW-RAM,PARIT          ;if parity check mode
        JRE     RCVS06                  ;else
        SKIT    ER                      ;if error
        JRE     RCVS06                  ;else
;
;*6/15  MOV     A,RXB                   ;dummy read
;
        MVI     A,' '                   ;set default data
```

```
        JRE     RCVS061
        ;
RCVS06:
;
;*6/15   MOV    A,RXB                        ;load receive data
;
RCVS061:
        LHLD    IB_CNT                       ;load stored data quantity
        LXI     EA,IBVAL-SMAGN-SIMGN0        ;(in buffer value)-(save margin)
                                             ; -(serial i/f margine)
        DGT     EA,H                         ;if store data < store buffer capacity
        JMP     RCVS04                       ;else (equal or over)
        ;
RCVS05:
        LHLD    IW_PTR
        STAX    H+                           ;store data & renew pointer
        LXI     EA,IN_BUF+IBVAL              ;in buffer end point
        DNE     EA,H                         ;if buffer end
        LXI     H,IN_BUF                     ;then   renew pointer
        SHLD    IW_PTR
        ;
        LHLD    IB_CNT                       ;load redeive data counter
        INX     H                            ;renew
        SHLD    IB_CNT
RCVS07: DMOV    EA,H
        LXI     H,IBVAL-SMAGN-SIMGN0         ;(in buffer value)-(save margin)
                                             ; -(serial i/f margine 0)
        DLT     EA,H                         ;if store data < store buffer capacity
        JMP     RCVS03                       ;else   (equal or over )
        ONIW    PMOD3-RAM,ONL                ;if online mode
        JMP     RCVS03                       ;else   off line
        DCRW    SIBCNT-RAM                   ;if receive data = 3 byte
        JMP     RCVS02                       ;else
RCVS01:
RCVS011:SKIT    FST                          ;if tx ready
        JR      RCVS011                      ;else
        ;
        MVI     A,11H                        ;XON code
        MOV     TXB,A                        ;TX xon code
        MVIW    SIBCNT-RAM,02H               ;reset serial i/f byte counter
        RESW    PMOD2,BSYF##                 ;set i/f busy flag for xon/xoff
;
;
RCVS02:
        ;
        POP     V
        MOV     PA,A                         ;return PA port
        POP     EA
        POP     H
        POP     V
        EI
        RETI
;
RCVS03:
RCVS031:SKIT    FST                          ;if tx ready
        JR      RCVS031                      ;else
        MVI     A,13H                        ;xoff code
        MOV     TXB,A                        ;tx xoff code
        MVIW    SIBCNT-RAM,02H               ;reset serial i/f byte counter
        SETW    PMOD2,BSYF##                 ;reset i/f busy flag for xon/xoff
        JR      RCVS02
;
;
;
RCVS04:
        LXI     EA,IBVAL-SMAGN
        DLT     EA,H                         ;if store data >= store buffer capacity
        JMP     RCVS05                       ;else
```

```
        JR      RCVS03
        ;
        ;                               ;reverse protocal
RCVS10:
;       *6/15
        MOV     A,RXB                   ;read

;       ONIW    DPSW-RAM,PARIT          ;if parity check mode
        JRE     RCVS13                  ;else
        SKIT    ER                      ;if error
        JRE     RCVS13                  ;else
        ;
;
;*6/15  MOV     A,RXB                   ;dummy read
;
        MVI     A,' '                   ;set default data
        JR      RCVS131
        ;
RCVS13:
;
;*6/15  MOV     A,RXB                   ;load receive data
;
RCVS131:
        LHLD    IB_CNT                  ;load receive data quantity
        LXI     EA,IBVAL-SMAGN-SIMGN1   ;(in buffer value)-(save margin)
                                        ; -(serial i/f margine 1)
        DGT     EA,H                    ;if stored data < buffer capacity
        JMP     RCVS15                  ;else   >=
        ;
RCVS12:
        LHLD    IW_PTR
        STAX    H+                      ;store data & renew coutner
        LXI     EA,IN_BUF+IBVAL         ;buffer end point
        DNE     EA,H                    ;if buffer end
        LXI     H,IN_BUF                ;then   renew pointer
        SHLD    IW_PTR
        ;
        LHLD    IB_CNT
        INX     H
        SHLD    IB_CNT                  ;renew data counter
RCVS14: DMOV    EA,H
        LXI     H,IBVAL-SMAGN-SIMGN1    ;(in buffer value)-(save margin)
                                        ; -(serial i/f margine 0)
        DLT     EA,H                    ;if stored data < store buffer capacity
        JMP     RCVS11                  ;else   (equal or over)
        ONIW    PMOD3-RAM,ONL           ;if online mode
        JMP     RCVS11                  ;else   off line
;
        RESPB   DTR+RTS                 ;set DTR & RTS
;
;
        JMP     RCVS02
        ;
RCVS15:
        SETPB   DTR+RTS                 ;reset DTR & RTS
        ;
        LXI     EA,IBVAL-SMAGN          ;if store data >= store buffer capacity
        DLT     EA,H
        JRE     RCVS12                  ;else
        JRE     RCVS02                  ;then   (over)
        ;
RCVS11:
        SETPB   DTR+RTS                 ;reset DTR & RTS
        JMP     RCVS02
;
;
;       NPRX
;
;       NPCP RX data receive routine
```

```
;
NPRX:
;
;
;       test    3 line  ;*
;
;       MOV     A,SMH                   ;check Tx interrupt
;       OFFI    A,SMHTXE                ;if Tx mode
;       JR      NPTX00                  ;then
;
;       *6/15
        MOV     A,RXB                   ;read
;
        SKNIT   ER                      ;if error occur(parity,framing,overrun)
        JR      NRX_ER                  ;then
;
;*6/15  MOV     A,RXB                   ;get receive data
;
;       STAW    SVRXD-RAM               ;save data
;       SETW    NPFLG0,RXDEX            ;receive flsg set
;
        LHLD    M_IW_PTR
        STAX    H+                      ;store data & renew coutner
        LXI     EA,IN_BUF+IBVAL         ;buffer end point
        DNE     EA,H                    ;if buffer end
        LXI     H,IN_BUF                ;then   renew pointer
        SHLD    M_IW_PTR
        ;
        LHLD    M_IB_CNT
        INX     H
        SHLD    M_IB_CNT                ;renew data counter
;
        JMP     RCVS02
;
NRX_ER:
;
;*6/15  MOV     A,RXB                   ;dummy read
;
        SETW    NPFLG0,RXER             ;error flag set
        JMP     RCVS02
;
NPTX00:
        DCRW    TXCNT-RAM               ;Tx data counter decriment
        JR      NPTX10                  ;not end
                                        ;Tx end
;
        RESSMH  SMHTXE                  ;tx disable
        SETMKH  MKST                    ;TX interrupt mask set (=disable)
;
        JMP     RCVS02
;
NPTX10:
        LXI     EA,NPSND1               ;NPCP buffer top address
        LDAW    SVRXD-RAM               ;Tx data counter load
        EADD    EA,A                    ;set address
        DMOV    H,EA
        LDAX    H                       ;now Tx data load
        MOV     TXB,A                   ;TX data buffer write
        INRW    SVRXD-RAM               ;counter increment
        JMP     RCVS02
;
;
;
;
;
;
;
```

We claim as our invention:

1. In a modular printer system, a modular printer device for containing a computerized terminal for supplying data to be printed and a printer means for printing data supplied by a computerized terminal, said modular printer device comprising an open frame having first terminal module receptacle means and having second printer module receptacle means, a terminal module for releasably receiving a computerized terminal, said terminal module with a received computerized terminal being supported in said first terminal module receptacle means such that data may be supplied from a received computerized terminal to a printer means contained by said modular printer device, and being supported in said second printer module receptacle means, a printer module for receiving a printer means such that data may be supplied to a received printer means from a computerized terminal in said terminal module, and a printer unit in said printer module having a paper feed direction, and the printer unit being reversible with the printer module so as to provide a first paper feed direction in the first orientation of the printer module and so as to provide an opposite paper feed direction opposite to said first paper feed direction in the reverse orientation of the printer module.

2. In a modular printer system according to claim 1, wherein the terminal module is disposed in the first terminal module receptacle means in a first orientation relative to the open frame, to orient a computerized terminal in a first orientation relative to said open frame when mounted in said terminal module, and auxiliary means for mounting a computerized terminal disposed on said open frame and oriented for mounting a computerized terminal so as to extend at a ninety degree angle relative to said first orientation.

3. In a modular printer system according to claim 2, said open frame having an exterior side exteriorly of the open frame, and having reception means for reception of said auxiliary means such that the auxiliary means is readily added at said exterior side of said open frame.

4. In a modular printer system according to claim 1, said first terminal module receptacle means being of configuration adapted to selectively receive one of a plurality of terminal modules of respectively different terminal receiving configurations, said terminal module being a selected one of a plurality of terminal modules of respectively different terminal receiving configurations and including terminal electrical connector means disposed at one end thereof, and means mounted within said terminal module to move toward and away from said terminal electrical connector means for receiving one of a plurality of computerized terminals of different configurations there between, such that the open frame is readily adapted to receive one of a plurality of computerized terminals of respectively different configurations.

5. In a modular printer system according to claim 1, said open frame having an exterior side exteriorly of the open frame, and having reception means for reception of a carrying handle to provide for carrying of said modular printer device with one hand.

6. In a modular printer system according to claim 5, a carrying handle engaged in said reception means for one-handed transport of the printer device.

7. In a modular printer system according to claim 1, data transmission conduit means comprising a fixed connector means on said terminal module for quick release coupling with a computerized terminal and comprising cable means with a cable end connector coupled with said fixed connector means via said cable means, and said open frame accommodating coupling of the cable end connector of the cable means with the printer unit in each of said first orientation and of said reverse orientation of said printer module.

8. In a modular printer system according to claim 1, said modular printer device having mounting means accommodating fixed mounting of said device in a mobile vehicle.

9. In a modular printer system according to claim 8, said mounting means comprising a mounting plate and pivot means coupling the mounting plate with the modular printer device to accommodate tilting of the modular printer device relative to said mounting plate.

10. In a modular printer system according to claim 2, said modular printer device consisting essentially of said open frame, said terminal module, and said printer module with said printer unit therein, and a paper tray located beneath the printer unit, the paper tray holding a quantity of paper for automatic feed to the printer unit and providing a bottom closure for the open frame.

11. In a modular printer system according to claim 1, said modular printer device further comprising a carrying handle, and consisting essentially of said open frame, said terminal module, said printer module with the printer unit therein, and further a paper tray secured within the open frame to hold a quantity of paper for automatic feed to the printer unit and provide a bottom closure for the open frame, the carrying handle being secured with the open frame for one-handed transport of the device.

12. In a modular printer system according to claim 1, said open frame consisting essentially of four frame elements arranged in an open rectangular configuration and a single additional cross piece frame element subdividing the open frame, the terminal module having rectilinear margins supported by the open frame at one side of the cross piece frame element and the printer module having rectilinear margins supported by the open frame at the other side of the cross piece frame element.

13. In a modular printer system according to claim 12, a rectilinear paper tray for containing a paper supply for feed to said printer unit in the printer module, said paper tray mating with the open frame to provide a bottom closure therefor.

14. In a modular printer system according to claim 13, said printer module comprising means for pivotally supporting said printer unit in the printer module, said printer unit being pivotal to expose said paper tray for replenishing the paper supply therein.

15. In a modular printer system according to claim 1, said terminal module having an upwardly offset margin resting on the open frame and downwardly extending side walls extending downwardly from the upwardly offset margin and disposed in close confronting relation to the open frame, the portions of the open frame underlying the upwardly offset margin of the terminal module and the portions of the open frame confronting the side walls of the terminal module comprising said first terminal module receptacle means of the open frame.

16. In a modular printer system according to claim 1, said printer module having an upwardly offset margin resting on the open frame and downwardly extending side walls extending downwardly from the upwardly offset margin and disposed in close confronting relation to the open frame, the portions of the open frame underlying the upwardly offset margin of the printer module and the portions of the open frame confronting the side walls of the printer module comprising said second printer module receptacle means of the open frame.

17. In a modular printer system according to claim 1, data transmission conduit means comprising coupler means for coupling with a computerized terminal in the terminal module and comprising second coupler means for coupling with said printer unit in the printer module both in a first orientation of the printer module and in a, with respect to the first orientation, reverse orientation of the printer module, and transmission conduit means connecting with the coupler means for conveying data from a computerized terminal in the terminal module to a printer unit in the printer module via the first and second coupler means irrespective of whether the printer module has its first orientation or its reverse orientation.

18. In a modular printer system according to claim 1, an alternating current module connected with the open frame, and containing an alternating current power cord for coupling with an alternating current power outlet, and said modular printer device having means for supplying power to said printer unit received by the printer module selectively from a portable battery source and from the alternating current power cord.

19. In a modular printer system according to claim 18, said alternating current module having means for releasably storing the alternating current power cord.

20. In a modular printer system according to claim 19, said alternating current module having a wall disposed in spaced relation to an exterior side of the open frame to define a recess in which the power cord is coiled.

21. In a modular printer system according to claim 20, said alternating power cord having a free with a plug connector thereon, and said alternating current module providing friction retention means for retaining the plug connector therewith to prevent inadvertent displacement of the power cord from the recess.

22. In a modular printer system according to claim 1, said open frame including guideway means external to said open frame for receiving one of a carrying handle and a second terminal module receptacle means, a carrying handle being insertible into said guideway means for use of the modular printer device as a portable printer device, and a second terminal module receptacle means being insertible into said guideway means for use of the modular printer device mounted within a vehicle, whereby the open frame is selectively usable in a fixed installation within a mobile vehicle and in a portable installation for one-handed transport.

23. In a modular printer system according to claim 22, a paper tray disposed below the printer module and mating with the open frame to provide a bottom closure therefor.

24. In a modular printer system according to claim 23, said paper tray having battery receptacle means for supplying operating power to a printer unit in said printer module.

25. In a modular printer system according to claim 1, the terminal module having a spring urged retainer for retaining a hand-held type of computerized terminal therewith.

26. In a modular printer system, a modular printer device having a printer unit capable of eighty column printing on paper automatically fed thereto from a supply of paper, said modular printer device comprising an open frame having a printer receiving means receiving said printer unit, and a paper tray module providing a paper bin of size to accommodate a substantial supply of paper for automatic feed to said printer unit as received by said printer receiving means, said paper tray module providing a bottom closure for said open frame.

27. In a modular printer system according to claim 26, said modular printer device having a terminal receiving means for accommodating different size hand-held type computerized terminals for automatic coupling to provide data communication with said printer unit as received by said printer receiving means.

28. In a modular printer system according to claim 26, said modular printer device having a terminal module secured therewith for releasably receiving a hand-held type of computerized terminal and constructed to mechanically guide a hand-held type computerized terminal into a received position where it is automatically coupled for data communication with said printer unit as received by said printer receiving means.

29. In a modular printer system according to claim 26, said modular printer device having a carrying handle secured to one side of said open frame for convenient transport thereof with one hand.

30. In a modular printer system according to claim 26, said printer receiving means comprising a printer module adapting said printer unit to the unitary modular printer device and accommodating displacement of the printer unit from its operating position so as to provide access to the paper bin for replenishment of the paper supply.

31. In a modular printer system according to claim 26, said open frame having a first section defining the first terminal module receptacle means for supporting said terminal module, therein receiving a hand-held type of computerized terminal and a second section defining the second printer module receptacle for receiving said printer unit, the second section having a separate covering enclosure for the printer unit, such that a hand-held type computerized terminal can be inserted into and removed from the first section without disturbing the covering enclosure for the printer unit.

32. In a modular printer system according to claim 31, said covering enclosure being sealed with the open frame such that the paper bin is protected from moisture during transport of the modular printer device.

33. In a modular printer system according to claim 31, a terminal module for receiving a hand-held type of computerized terminal, and being sealed with the open frame to protect the paper bin from moisture during transport of the modular printer device.

34. In a modular printer system according to claim 26, said printer receiving means mounting said printer unit selectively in a first orientation and in a reverse orientation rotated one hundred and eighty degrees relative to the first orientation.

35. In a modular printer system according to claim 26, said open frame having terminal receiving means therein adjacent the printer receiving means and constructed to mechanically guide a hand-held type of computerized terminal into a received position where it is automatically coupled for data communication with said printer unit as received by said printer receiving means.

36. In a modular printer system according to claim 26, said printer receiving means comprising mechanical guides, said printer unit being mechanically guided by said guides so as to be displaceable to a paper loading position to expose the paper bin for replenishment of the paper supply therein.

37. In a modular printer system according to claim 36, said guides including means for supporting pivotal movement of said printer unit with respect to said printer receiving means said printer unit being pivotally movable to an overcenter paper loading position where it is held by gravity until manually returned to its operating position.

38. In a modular printer system according to claim 36, said printer receiving means further including latch means for engaging and latching said printer unit, said printer unit being automatically latched in its operating position as it is returned thereto from the paper loading position.

39. In a modular printer system according to claim 36, said printer unit being automatically latched in its operating position as it is returned thereto from the paper loading position.

40. In a modular printer system according to claim 39, said printer unit being unlatched in response to limited movement from the operating position in a direction away from the paper loading position.

41. In a modular printer system according to claim 26, first optical coupler means for optical coupling with a hand-held type of computerized terminal in a terminal receiving means of the open frame, and second optical coupler means for optical coupling with a printer unit in the printer receiving means, and fiber optic transmission conduit means connecting with the optical coupler means for conveying data from a hand-held type computerized terminal in the terminal receiving means to a printer unit in the printer receiving means via the first and second optical coupler means.

42. In a modular printer system according to claim 26, alternating current connection means for coupling with an alternating current power outlet, and said modular printer device having means for supplying power to the printer unit received by the printer receiving means selectively from a portable battery source and from the alternating current connection means.

43. In a modular printer system according to claim 42, said modular printer device having means for releasably storing an alternating current power cord forming said alternating current connection means.

44. In a modular printer system according to claim 42, said alternating current connection means comprising an alternating current power cord, and a wall disposed in spaced relation to an exterior side of the open frame to define a recess in which the alternating current power cord is coiled.

45. In a modular printer system according to claim 42, said alternating current connection means comprising an alternating current power cord, and said alternating current power cord having a free end with a plug connector thereon, and said modular printer device providing friction retention means for retaining the plug connector therewith to prevent inadvertent displacement of the alternating current power cord from its stored position.

46. In a modular printer system according to claim 26, said paper tray module having power supply means therein for supplying operating power to the printer unit.

47. A modular printer device comprising:

- an open frame having rectilinear frame elements forming vertically disposed side walls and at least one crosspiece for defining within said frame at least a terminal receptacle and a printer receptacle;
- a paper tray module disposed across and assembled to said frame and defining a bottom closure, said paper tray module having means for holding a supply of paper;
- a printer module mounted within said printer receptacle, said printer module comprising a printer unit disposed above said paper tray module for receiving power therefrom;
- a terminal module mounted within said terminal receptacle, said terminal module including means for removably receiving a computerized terminal and for communicatively coupling a received terminal to said terminal module; and
- means for communicatively coupling said terminal module to said printer module, whereby a computerized terminal upon being inserted into said terminal module becomes enabled to communicate data to said printer unit.

48. A modular printer device according to claim 42, wherein said means for removably receiving a computerized terminal comprises an interior space and a cover for said interior space for temporarily retaining said terminal for data communication to said printer unit.

49. A modular printer device according to claim 47, wherein said means for removably receiving a computerized terminal comprises an interior space, a connector plug disposed at one end of said interior space, a slidable terminal retainer bracket disposed within said interior space and means for guiding and for urging a computerized terminal into engagement with said connector plug for establishing data communication with said printer unit upon insertion of a computerized terminal into said interior space.

50. A modular printer device according to claim 47, wherein said open frame is an integral unitary structure and wherein at least one of said rectilinear frame elements of said integral unitary structure includes an externally disposed means for receiving a selected one of a plurality of attachments.

51. A modular printer device according to claim 50, wherein one of a plurality of attachments is a foot member, wherein said at least one rectilinear frame element including an externally disposed means for receiving one of a plurality of attachments comprises two oppositely disposed frame members, and wherein a second one of a plurality of attachments is a handle member comprising a base member and a handle, said foot member being attached to one of said externally oppositely disposed receiving means of said rectilinear frame members and said base member of said handle member being attached to the other of the second one of the two externally oppositely disposed receiving means of said rectilinear frame members, said handle extending from said frame opposite to said foot member.

52. A modular printer device according to claim 50, wherein one of a plurality of attachments is an AC adapter module, said AC adapter module being mounted to said externally disposed receiving means and comprising a flat support surface for supporting said modular printer device with respect thereto, at least one cavity for removably storing a coiled portion of an AC power cord, a power supply circuit disposed within said modular printer device, an AC power cord having an internal end attached to the power supply and having a coiled portion adjacent an external end thereof, said coiled portion having a power plug at the external end of the AC power cord.

53. A modular printer device according to claim 52, wherein said open frame comprises at least one further rectilinear frame element including an externally disposed means for receiving one of a plurality of attachments, two frame elements of said open frame and the respective externally disposed receiving means being oppositely disposed on said open frame, and wherein at least one of said oppositely disposed frame elements including said externally disposed receiving means includes at least one aperture, said internal end of said AC power cord being routed through said aperture, and said power supply circuit being disposed within said open frame.

54. A modular printer device according to claim 53, wherein a second one of a plurality of attachments is a handle member comprising a base member and a handle, said base member of said handle member being attached to one of said receiving means disposed externally opposite from said AC power module with said handle extending from said open frame.

55. A modular printer device comprising:

an open frame having rectilinear frame elements forming vertically disposed side walls and at least one crosspiece for defining within said frame at least a terminal receptacle and a printer receptacle, said open frame being an integral unitary structure, at least one of said rectilinear frame elements of said integral unitary structure including an externally disposed means for receiving a selected one of a plurality of attachments;

a paper tray module disposed across and assembled to said frame and defining a bottom closure, said paper tray module having means for holding a supply of paper;

a printer module mounted within said printer receptacle, said printer module comprising a printer unit disposed above said paper tray module for receiving power therefrom;

a terminal module mounted to said open frame, said terminal module including means for removably receiving a computerized terminal and for communicatively coupling a received terminal to said terminal module; and means for communicatively coupling said terminal module to said printer module, whereby a computerized terminal upon being inserted into and received by said terminal module becomes enabled to communicate data to said printer unit.

56. A modular printer device according to claim 55, wherein said terminal module mounted to said open frame is mounted within said terminal receptacle.

57. A modular printer device according to claim 55, wherein said at least one frame element including said externally disposed receiving means includes at least one aperture, and wherein said terminal module mounted to said open frame is attached to said externally disposed receiving means, wherein said means for communicatively coupling said terminal module to said printer module is routed from said terminal module through said aperture to said printer module.

58. A modular printer device according to claim 57, said open frame further comprising a cover plate disposed over and covering said terminal receptacle.

59. A modular printer device according to claim 55, wherein said open frame comprises at least one further rectilinear frame element including an externally disposed means for receiving one of a plurality of attachments, two frame elements of said open frame and the respective externally disposed receiving means being oppositely disposed on the open frame, and wherein at least one of said oppositely disposed frame elements with said externally disposed receiving means includes at least one aperture.

60. A modular printer device according to claim 59, wherein one of said plurality of attachments is an AC adapter module, said AC adapter module being mounted to said externally disposed receiving means and comprising a flat support surface for supporting said modular printer device with respect thereto, at least one cavity for removably storing a coiled portion of an AC power cord, an AC power cord having a coiled portion, said coiled portion having a power plug at an external end thereof and having an internal end attached to a power supply circuit, said internal end of said AC power cord being routed through said aperture and said power supply circuit being disposed within said open frame.

61. A modular printer device according to claim 60, wherein a second one of said plurality of attachments is a handle member comprising a base member and a handle, said base member of said handle member being attached to said second one of said receiving means externally oppositely disposed with respect to said AC power module with said handle extending from said open frame.

62. A modular printer device according to claim 55, wherein said paper tray module comprises means for holding an internal power source and means electrically coupling said internal power source to said printer module for providing power to said printer module.

63. A modular printer device according to claim 55, wherein said paper tray module is a 50-sheet paper tray module.

64. A modular printer device according to claim 55, wherein said paper tray module has a depth for holding a supply of paper in excess of fifty sheets of paper.

65. In a modular printer system according to claim 55, said printer module comprising a U-shaped pivot frame for receiving said printer unit, said printer unit being pivotally mounted within said pivot frame, said U-shaped pivot frame further comprising guide channels disposed within said U-shaped pivot frame, said guide channels corresponding in alignment to guide pins attached to said printer unit for releasing said printer unit from said pivot frame in response to an angle of rotation of the printer unit with respect to said printer module.

66. A modular printer device according to claim 65, wherein said printer module comprises a cover having a paper outlet slot, said printer module cover closing said printer module receptacle, wherein said terminal module is mounted within said terminal receptacle, and wherein a sealing strip extends between said open frame and said printer module and terminal module about the perimeter of said printer receptacle and terminal receptacle.

67. A modular printer device according to claim 55, wherein said printer modular comprises a U-shaped pivot frame for receiving said printer unit, said printer receptacle comprising printer module mounting means including a vertical guide channel and an arcuate guide channel, the U-shaped pivot frame of the printer module comprising outwardly extending pivot means engaging the printer module mounting means and respective limit pin means for limiting the rotational movement of the printer module within the printer receptacle, said printer module further comprising means for latching said printer module including said printer unit in a predetermined operative position, whereupon when unlatched, the printer module is pivotable within said guide channel into an inoperative position thereby providing access to the paper tray module, the printer module mounting means and said U-shaped pivot frame further comprising means for releasing the printer module from the printer receptacle.

68. A modular printer device according to claim 67, further comprising an AC adapter module, said AC adapter module being mounted exteriorly of the open frame to the open frame, the AC adapter module comprising a flat support surface for supporting said modular printer device with respect thereto, at least one cavity for removably storing an AC power cord, said power cord having an AC plug at an external end thereof, the AC adapter module further including means for storing the AC plug in an exteriorly accessible position, the open frame having an aperture adjacent the AC adapter module and comprising means for electrically coupling an inner end through the aperture to provide electrical connection through the aperture to the printer module.

69. In a modular printer system according to claim 26, wherein the open frame has an external frame element having at least one aperture therethrough, an AC adapter module disposed externally of and adjacent said open frame, said AC adapter module including external closure walls abutting said external frame element and including means for mounting said AC adapter module to said external frame element, said closure walls defining a first chamber having an external opening and a second, externally closed off, chamber, an AC power cord having a coiled section, which coiled section is stored in said first chamber adjacent said external opening in said first chamber and having a power plug attached to an external end adjacent said coiled section, an inner section of said AC power cord extending through said second chamber, and a power supply disposed within the printer device, the inner section of said AC power cord electrically coupled to said power supply.

* * * * *

UNITED STATES PATENT AND TRADEMARK OFFICE

CERTIFICATE OF CORRECTION

PATENT NO. : 5,180,232

DATED : January 19, 1993

INVENTOR(S) : George E. Chadima, Jr., et al.

It is certified that error appears in the above-indentified patent and that said Letters Patent is hereby corrected as shown below:

The material reproduced in Columns 15 through 212 are to be marked with the following notice:

"©1989 Norand Corporation"

Signed and Sealed this

Eleventh Day of January, 1994

Attest:

BRUCE LEHMAN

*Attesting Officer* *Commissioner of Patents and Trademarks*